US010558911B2

(12) United States Patent
Hasegawa et al.

(10) Patent No.: US 10,558,911 B2
(45) Date of Patent: Feb. 11, 2020

(54) INFORMATION PROCESSING APPARATUS, INFORMATION PROCESSING METHOD, AND NON-TRANSITORY COMPUTER READABLE MEDIUM

(71) Applicant: TOKYO INSTITUTE OF TECHNOLOGY, Meguro-ku, Tokyo (JP)

(72) Inventors: Osamu Hasegawa, Tokyo (JP); Hongwei Zhang, Tokyo (JP)

(73) Assignee: SOINN INC., Tokyo (JP)

( * ) Notice: Subject to any disclaimer, the term of this patent is extended or adjusted under 35 U.S.C. 154(b) by 882 days.

(21) Appl. No.: 14/769,692

(22) PCT Filed: Jan. 27, 2014

(86) PCT No.: PCT/JP2014/000390
§ 371 (c)(1),
(2) Date: Aug. 21, 2015

(87) PCT Pub. No.: WO2014/129116
PCT Pub. Date: Aug. 28, 2014

(65) Prior Publication Data
US 2016/0004963 A1    Jan. 7, 2016

(30) Foreign Application Priority Data

Feb. 22, 2013  (JP) ................... 2013-033176

(51) Int. Cl.
*G06F 15/18*  (2006.01)
*G06N 3/08*  (2006.01)
*G06N 3/04*  (2006.01)
(52) U.S. Cl.
CPC ................. *G06N 3/08* (2013.01); *G06N 3/04* (2013.01)

(58) Field of Classification Search
CPC ............. G06N 3/04; G06N 3/08; G06N 3/088
See application file for complete search history.

(56) References Cited

U.S. PATENT DOCUMENTS 5,835,901 A * 11/1998 Duvoisin, III ......... G06K 9/627
706/19
9,143,393 B1 * 9/2015 Bird ..................... G06N 3/0436

FOREIGN PATENT DOCUMENTS

JP          5130523 B2    11/2012

OTHER PUBLICATIONS

"An Online Semi-Supervised Clustering Algorithm Based on a Self-organizing Incremental Neural Network" Kamiya et al; Proceedings of International Joint Conference on Neural Networks, Orlando, Florida, USA, Aug. 12-17, 2007 2007 IEEE.*

(Continued)

*Primary Examiner* — Luis A Sitiriche
(74) *Attorney, Agent, or Firm* — Thompson Hine LLP

(57) ABSTRACT

An information processing apparatus including inter-class node insertion means for inserting an input vector into a network as an inter-class insertion node. The apparatus further includes a winner node learning time calculation means for incrementing, when an edge is connected between a first winner node and a second winner node, learning time of a node for the first winner node by a predetermined value. The apparatus includes load balancing means for detecting, for each predetermined cycle according to the total number of input vectors, a node where the value of the learning time is relatively large and unbalanced, inserting a new node into a position near the node that has been detected and the adjacent node of the node that has been detected, reducing the learning time of the node that has been detected and the learning time of the adjacent node of the node that has been detected, deleting an edge between the node that has been detected and the adjacent node of the node that has been (Continued)

detected, connecting an edge between the node that has been newly inserted and the node that has been detected, and connecting an edge between the node that has been newly inserted and the adjacent node of the node that has been detected.

13 Claims, 25 Drawing Sheets

(56) References Cited

OTHER PUBLICATIONS

Furao, Shen et al., "An incremental network for on-line unsupervised classification and topology learning," Neural Networks 19 (2006) 90-106.
PCT, International Search Report, International Application No. PCT/JP2014/000390, dated Apr. 28, 2014.

* cited by examiner

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is the national phase entry of International Application No. PCT/JP2014/000390, filed on Jan. 27, 2014, which claims priority to Japanese Patent Application No. 2013-033176 filed on Feb. 22, 2013. The entire contents of both of these applications are incorporated by reference herein.

TECHNICAL FIELD

The present disclosure relates to an information processing apparatus, an information processing method, and a non-transitory computer readable medium that successively receive input vectors that belong to arbitrary classes and learn input distribution structures of the input vectors.

BACKGROUND ART

A method called a self-organizing neural network (SOINN: Self-Organizing Incremental Neural Network) has been proposed as a learning method for allowing neurons to grow as necessary during learning (see Non-Patent Literature 1). SOINN disclosed in Non-Patent Literature 1 has a number of advantages that it is possible to learn non-stationary inputs by autonomously managing the number of nodes and to extract a phase structure and the appropriate number of classes having complicated distribution profiles. As an application example of SOINN, in a pattern recognition, for example, it is possible to additionally learn the class of katakana characters after learning the class of hiragana characters.

Further, a method called an Enhanced SOINN (E-SOINN) disclosed in Patent Literature 1 has been proposed as a technique regarding SOINN. E-SOINN has advantages that online additional learning where learning is added as necessary is possible and the learning efficiency is high unlike batch learning. Accordingly, in E-SOINN, additional learning is possible even when the learning environment has been changed to a new environment. Another advantage of E-SOINN is that the noise tolerance for input data is high.

CITATION LIST

Patent Literature

[Patent Literature 1] Japanese Patent No. 5130523

Non Patent Literature

[Non-Patent Literature 1] F. Shen and κ. Hasegawa, "An incremental network for on-line unsupervised classification and topology learning," Neural Networks, Vol. 19, No. 1, pp. 90-106, 2006.

SUMMARY OF INVENTION

Technical Problem

There is a problem, however, in the technique disclosed in Non-Patent Literature 1 (SOINN) and the technique disclosed in Patent Literature 1 (E-SOINN) that learning results may vary according to the input order of the input data. Another problem is that, when high-dimensional data (e.g., 1000 dimensions or more) is used as input data, for example, the learning accuracy decreases. These problems will be described hereinafter in more detail.

The first problem regarding the stability is that the learning results greatly vary according to the input order of the input data. That is, when the learning is iterated by inputting input data while changing only the input order without changing the learning environment, the learning results (the number of nodes and the positions of the nodes in the network) vary.

FIG. 1 shows an experimental artificial dataset. FIGS. 2(A) and 2(B) each show learning results by the E-SOINN for a Gaussian data distribution set shown in FIG. 1. In FIGS. 2(A) and 2(B), two Gaussian distributions overlap each other regarding the distributions of the input data. FIG. 2(A) shows stationary learning results by E-SOINN after the learning is performed 500,000 times. FIG. 2(B) shows stationary learning results by E-SOINN after the learning is performed 1,000,000 times. It is clear from FIGS. 2(A) and 2(B) that these distributions generated as a result of the learning do not coincide with the input distribution shown in FIG. 1. That is, the input data shown in FIG. 1 includes two same Gaussian distributions and FIGS. 2(A) and 2(B) each show the learning results for the input data in FIG. 1. However, in each of the learning results of FIGS. 2(A) and 2(B), the number of nodes at the center of each distribution is not the same each other. Therefore, each center of the two Gaussian distributions shown in FIG. 1 does not coincide with each center of the two Gaussian distributions in FIG. 2(A) and each center of the two Gaussian distributions shown in FIG. 1 does not coincide with each center of the two Gaussian distributions in FIG. 2(B). Originally, each center of the two Gaussian distributions shown in FIG. 1 should coincide with both of each center of the two Gaussian distributions shown in FIG. 2(A) and each center of the two Gaussian distributions shown in FIG. 2(B).

Another problem regarding the stability of E-SOINN will be described. E-SOINN expresses a node density using an average value of a node accumulated point (see Paragraph 0067, Expression 12, Expression 13, etc. of Patent Literature 1). E-SOINN calculates "$p_i$", which is a point value of the node density of a node i using the following Expression (1). The calculation value in Expression (1) is given as the point value $p_i$ of the node density when the node i is a winner node, and otherwise the value 0 is given.

[Expression 1]

$$p_i = \begin{cases} \dfrac{1}{(1+\bar{d}_i)^2}, & \text{if } i \text{ is a winner,} \\ 0, & \text{if } i \text{ is not a winner,} \end{cases} \quad (1)$$

The symbol $d_i^-$ ($d_i^-$ indicates that the symbol "¯(bar)" is attached to $d_i$) in Expression (1) indicates the average distance from the node i to an adjacent node j and will be calculated using the following Expression (2). The adjacent node j means a node that is directly connected to the node i by an edge. In Expression (2), m indicates the number of adjacent nodes j of the node i, $W_i$ indicates a weight vector of the node i, and $W_j$ indicates a weight vector of the adjacent node j.

[Expression 2]

$$\bar{d}_i = \frac{1}{m}\sum_{j=1}^{m} \| W_i - W_j \| \quad (2)$$

When the node densities for the node distributions shown in FIGS. 2(A) and 2(B) are calculated using this method by E-SOINN, the node densities to be calculated are clearly incorrect. This is because, when the node densities for the node distributions are calculated, the node distribution generated prior to this calculation does not coincide with the input distribution and furthermore, due to this inconsistency with the input distribution, E-SOINN may inaccurately integrate two Gaussian distributions into one class.

Another problem regarding the stability of E-SOINN is as follows. E-SOINN tries to delete largely overlapping regions between classes. However, since the algorithm of E-SOINN is not stable, it causes an iteration of an integration and a separation of sub-clusters.

Another problem of the related art is as follows. According to the related art, the learning accuracy may decrease when the high-dimensional data is used as input data. In E-SOINN, for example, a nearest-neighbor node is searched using a Euclidean distance. When the distance is measured using the concept of the Euclidean distance, however, arbitrary two positions in the dataset of a given high-dimensional dataset converge, which causes a decrease in the accuracy of the learning result as the number of dimensions of the input data increases. That is, when the Euclidean distance is used in the high-dimensional space, the effect of the separation of the closest position and the farthest position is especially spoiled. Therefore, E-SOINN is not suitable for some clustering learning tasks such as DNA clustering or document clustering that use high-dimensional data as input vectors.

The present invention can solve the above problems and a first advantage of the present disclosure is to provide an information processing apparatus, an information processing method, and a non-transitory computer readable medium having a great stability for learning results. A second advantage of the present disclosure is to provide an information processing apparatus, an information processing method, and a non-transitory computer readable medium having a high accuracy for high-dimensional data.

An information processing apparatus according to one embodiment of the present invention has a network structure in which nodes described by multidimensional vectors and edges that connect the nodes are arranged and successively receives input vectors which belong to arbitrary classes and learns input distribution structures of the input vectors, the information processing apparatus includes: winner node search means for searching a node located at a position that is the closest to the input vector that is input as a first winner node and a node located at a position that is the second closest to the input vector that is input as a second winner node; inter-class node insertion determination means for determining whether to execute an inter-class node insertion based on a distance between the input vector and the first winner node and a distance between the input vector and the second winner node; inter-class node insertion means for generating, when it is determined in the inter-class node insertion determination means that the inter-class node insertion should be executed, an inter-class insertion node having a component that is the same as the component of the input vector as a weight vector and inserting the inter-class insertion node that has been generated into the network; winner node learning time calculation means for incrementing, when it is determined in the inter-class node insertion determination means that the inter-class node insertion should not be executed, learning time of the node for the first winner node by a predetermined value when an edge is connected between the first winner node and the second winner node; weight vector update means for updating, when it is determined in the inter-class node insertion determination means that the inter-class node insertion should not be executed, the weight vector of the first winner node and the weight vector of an adjacent node of the first winner node to make them further closer to the input vector, the adjacent node being a node that is directly connected to a node to be noted by an edge; and load balancing means for detecting, for each predetermined cycle according to the total number of input vectors, a node where the value of the learning time is relatively large and unbalanced, generating a new node having a weight vector based on the weight vector of the node that has been detected and the adjacent node of the node that has been detected and then inserting the new node into the network, reducing the learning time of the node that has been detected and the learning time of the adjacent node of the node that has been detected, deleting an edge between the node that has been detected and the adjacent node of the node that has been detected, connecting an edge between the node that has been newly inserted and the node that has been detected, and connecting an edge between the node that has been newly inserted and the adjacent node of the node that has been detected. Accordingly, it is possible to accurately describe the connection structure of the input patterns without being influenced by the input order of the input data, which means it has a stability performance higher than that of the related art.

Further, the information processing apparatus may further include: edge connection determination means for determining, when it is determined in the inter-class node insertion determination means that the inter-class node insertion should not be executed, a sub-cluster to which the first winner node belongs and a sub-cluster to which the second winner node belongs based on a sub-cluster label of the node that is given, and when the result of the determination shows that the first winner node and the second winner node belong to sub-clusters different from each other, further determining, regarding the node densities of the first winner node and the second winner node, whether at least one of a condition of the node density for the first winner node based on an average node density of the sub-cluster including the first winner node and a condition of the node density for the second winner node based on an average node density of the sub-cluster including the second winner node is satisfied; edge connection means for (1) connecting, when the result of the determination in the edge connection determination means shows that at least one of the first winner node and the second winner node does not belong to any sub-cluster or the first winner node and the second winner node belong to one sub-cluster, an edge between the first winner node and the second winner node or (2) connecting, when the result of the determination in the edge connection determination means shows that at least one of the conditions of the node densities of the first winner node and the second winner node is satisfied, an edge between the first winner node and the second winner node and not connecting, when at least one of the conditions of the node densities of the first winner node and the second winner node is not satisfied, an edge between the first winner node and the second winner node; node density calculation means for calculating, based on an average distance from a node to be noted and an adjacent node of the node to be noted, a node density of the node to be noted; and sub-cluster determination means for giving sub-cluster labels different from each other to an apex, which is a node that has a locally maximum node density, giving the sub-cluster label the same as the sub-cluster label given to the adjacent node where the node density is maximum to all the nodes to which the sub-cluster labels have not been given, generating a Voronoi region based on a reference apex having a node density larger than a predetermined threshold among the apices, and when the sub-cluster including the reference apex and the sub-cluster including apices other than the reference apex have an overlapping region and the condition of the average node density of the nodes located in the overlapping region is satisfied in the Voronoi region that has been generated, giving a sub-cluster label of the sub-cluster including the reference apex as a sub-cluster label of the sub-cluster including other apices. Accordingly, it is possible to prevent the disturbance when the mixed class is separated into different sub-clusters, whereby it is possible to make the learning results more stable.

Further, the information processing apparatus may further include an inter-node distance calculation expression including a weighted first distance calculation expression that calculates a distance between nodes based on an Euclidean distance and a weighted second distance calculation expression that calculates a distance between nodes based on a distance measure other than the Euclidean distance, in which: the information processing apparatus normalizes the first distance calculation expression using a minimum distance value and a maximum distance value based on the Euclidean distance between arbitrary two nodes in the network; the information processing apparatus normalizes the second distance calculation expression using a minimum distance value and a maximum distance value based on the other distance measure between arbitrary two nodes in the network; the information processing apparatus decreases the weight of the first distance calculation expression as the number of dimensions of the input vector increases; and the information processing apparatus calculates the distance between the input vector and the node or the distance between arbitrary two nodes in the network using the inter-node distance calculation expression. Accordingly, it is possible to obtain the benefit of the Euclidean distance in the low-dimensional space and to set the flexible distance measure according to the problem to be learned. Further, since this framework does not require a previous analysis of the input vectors, it is suitable for the online additional self-propagating learning tasks or the real-world learning tasks using a sample of limited input vectors.

Further, the second distance calculation expression may calculate the distance between the nodes based on a cosine distance. It is therefore possible to ensure a high accuracy even for high-dimensional data.

Further, the information processing apparatus may further include node density update determination means for checking whether at least one value of the minimum distance value and the maximum distance value between the two nodes based on the Euclidean distance and the minimum distance value and the maximum distance value between the two nodes based on the other distance measure has been changed, and when the at least one value has been changed, determining to update the node density, in which the node density calculation means (1) calculates each component of the vector of the distance of the first winner node from the adjacent node using each of the first distance calculation expression and the second distance calculation expression, (2) calculates a vector of a point value of the node density of the first winner node based on the vector of the distance of the first winner node that has been calculated from the adjacent node, (3) calculates a vector of an accumulated point value of the node density of the first winner node based on the vector of the point value of the node density of the first winner node that has been calculated, (4) calculates the node density of the first winner node based on the vector of the accumulated point value of the node density of the first winner node that has been calculated, (5) when the result of the determination in the node density update determination means shows that the node density should be updated, based on the minimum distance value and the maximum distance value between the two nodes based on the Euclidean distance before and after the changes and the minimum distance value and the maximum distance value between the two nodes based on the other distance measurement before and after the changes, for all the nodes that exist in the network, updates the vector of the accumulated point value of the node density of the node to be noted, and (6) re-calculates the node density of the node to be noted based on the vector of the accumulated point value of the node density of the node to be noted that has been updated. Accordingly, even when at least one value of the minimum distance value and the maximum distance value between the two nodes based on the Euclidean distance and the minimum distance value and the maximum distance value between the two nodes based on another distance measurement has been changed due to the insertion of the node, it is possible to automatically calculate the more accurate node density where these changes are reflected.

An information processing method according to an embodiment of the present invention is an information processing method in an information processing apparatus that has a network structure in which nodes described by multidimensional vectors and edges that connect the nodes are arranged and successively receives input vectors which belong to arbitrary classes and learns input distribution structures of the input vectors, the information processing method executing the steps of: by winner node search means, searching a node located at a position that is the closest to the input vector that is input as a first winner node and a node located at a position that is the second closest to the input vector that is input as a second winner node; by inter-class node insertion determination means, determining whether to execute an inter-class node insertion based on a distance between the input vector and the first winner node and a distance between the input vector and the second winner node; by inter-class node insertion means, generating, when it is determined in the inter-class node insertion determination means that the inter-class node insertion should be executed, an inter-class insertion node having a component that is the same as the component of the input vector as a weight vector and inserting the inter-class insertion node that has been generated into the network; by winner node learning time calculation means, incrementing, when it is determined in the inter-class node insertion determination means that the inter-class node insertion should not be executed, learning time of the node for the first winner node by a predetermined value when an edge is connected between the first winner node and the second winner node; by weight vector update means, updating, when it is determined in the inter-class node insertion determination means that the inter-class node insertion should not be executed, the weight vector of the first winner node and the weight vector of an adjacent node of the first winner node to make them further closer to the input vector, the adjacent node being a node that is directly connected to a node to be noted by an edge; and by load balancing means, detecting, for each predetermined cycle according to the total number of input vectors, a node where the value of the learning time is relatively large and unbalanced, generating a new node having a weight vector based on the weight vector of the node that has been detected and the adjacent node of the node that has been detected and then inserting the new node into the network, reducing the learning time of the node that has been detected and the learning time of the adjacent node of the node that has been detected, deleting an edge between the node that has been detected and the adjacent node of the node that has been detected, connecting an edge between the node that has been newly inserted and the node that has been detected, and connecting an edge between the node that has been newly inserted and the adjacent node of the node that has been detected. Accordingly, it is possible to accurately describe the connection structure of the input patterns without being influenced by the input order of the input data, which means it has a stability performance higher than that of the related art.

A non-transitory computer readable medium according to an embodiment of the present invention causes a computer to execute the above information processing. Accordingly, it is possible to accurately describe the connection structure of the input patterns without being influenced by the input order of the input data, which means it has a stability performance higher than that of the related art.

According to the present disclosure, it is possible to provide an information processing apparatus, an information processing method, and a non-transitory computer readable medium having a high stability for learning results. Further, it is possible to provide an information processing apparatus, an information processing method, and a non-transitory computer readable medium having a high accuracy even for high-dimensional data.

DESCRIPTION OF EMBODIMENTS

In order to promote better understanding of the present invention, before describing specific configurations and processing according to an embodiment of the present invention, the outline of the related art of the present disclosure (it will be hereinafter referred to as E-SOINN) will be briefly described.

Figure 3:
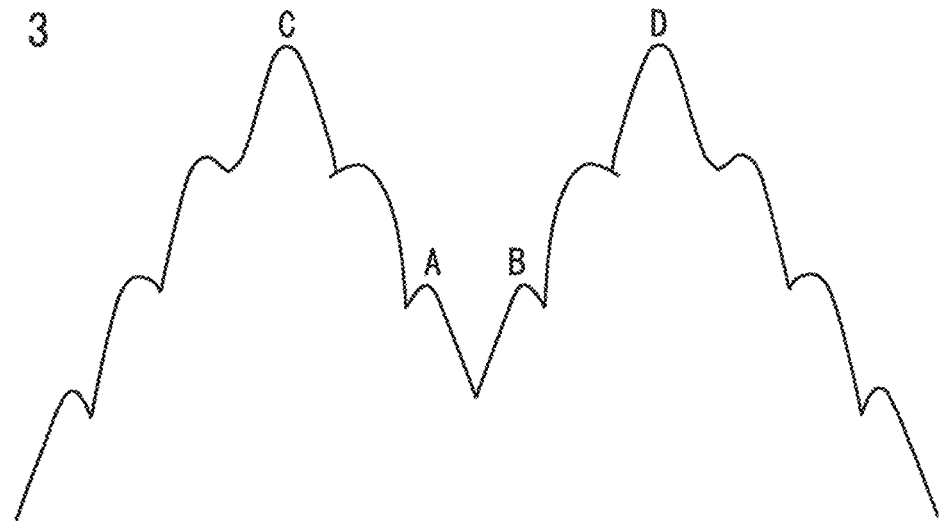
FIG. 3 is a diagram for describing a problem solved by the present disclosure.

A problem in E-SOINN is that the learning results greatly depend on the input order of the input data. Referring to FIG. 3, results of learning by E-SOINN will be described. FIG. 3 shows distributions of node densities in a network after processing by E-SOINN (it shows processing shown in S611, S607, S612 and the like of FIG. 5 of Patent Literature 1, and in particular, processing described in Paragraphs 0071 to 0079 of the specification) is executed. In this example, there is an overlapping region between sub-clusters and the distributions of the node densities have large variations.

In FIG. 3, signs A and B show two sub-clusters generated by the processing executed by E-SOINN. Note that a set of nodes connected by edges in the network is referred to as a cluster and a subset of clusters is referred to as a sub-cluster. The sub-cluster is a set of nodes to which one sub-cluster label is given. E-SOINN defines predetermined conditions (they are shown in Paragraph 0076, Expression (14), Expression (15), etc. of the specification of Patent Literature 1) to integrate the sub-cluster A with the sub-cluster B.

Figure 4:
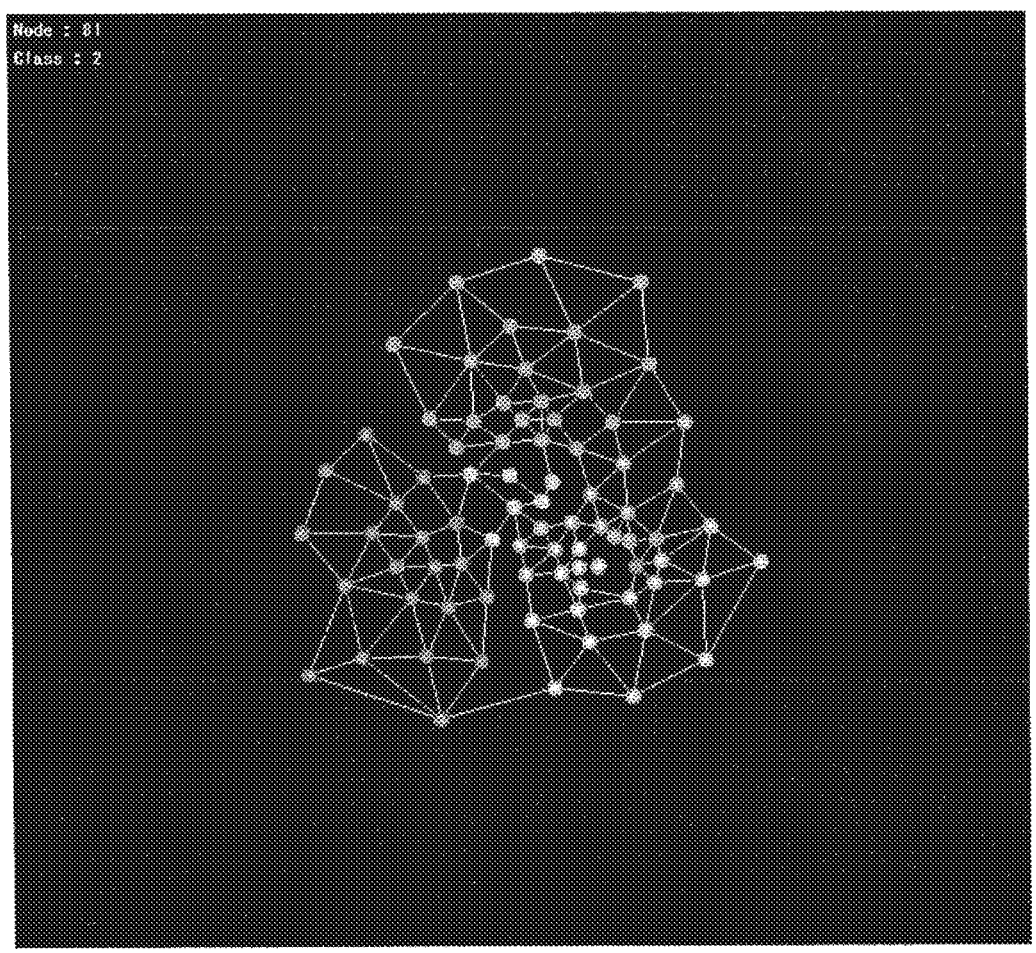
FIG. 4 is a diagram for describing a problem solved by the present disclosure.

E-SOINN satisfies the condition for integrating the sub-clusters A and B with each other quite easily under the conditions that a first winner node belongs to the sub-cluster A, a second winner node belongs to the sub-cluster B, and further (because the input data appears for the first time in the overlapping region of the sub-clusters A and B) the sub-cluster A and the sub-cluster B, and the sub-cluster C and the sub-cluster D have not integrated with each other when new input data is input to the network. Although E-SOINN tries to integrate the sub-cluster A and the sub-cluster B, the sub-cluster A should originally belong to the sub-cluster C and the sub-cluster B should originally belong to the sub-cluster D. Therefore, this problem causes an iteration of the integration and the separation of the sub-clusters. FIG. 4 shows learning results by E-SOINN for the input data having three Gaussian distributions, where the three Gaussian distributions are partially overlapped with one another and the separation and the integration of the plurality of sub-clusters are disturbed.

In the following description, regarding the technique related to the self-organizing neural network (Self-Organizing Incremental Neural Network (SOINN)), the technique according to the present disclosure will be referred to as a Load Balance Self-Organizing Incremental Neural Network (LBSOINN).

LBSOINN treats the load of the nodes in the network as the node learning time and proposes the node load balancing method using the node learning time. LBSOINN is able to further stabilize the network by the load balancing method. Therefore, LBSOINN is called Load Balance. Further, LBSOINN evades the disturbance of the network structure when the overlapping region between classes is deleted by using a sub-cluster determination method based on Voronoi Tessellation. Further, LBSOINN introduces a new distance measure suitable for performing the online additional learning of the high-dimensional data regarding a distance measure indicating similarities between the two nodes.

While the detail will be described later, experiments to confirm the effects of the present disclosure have been performed to confirm the effectiveness of LBSOINN. In the experiments, LBSOINN is applied to an example in the real world besides being applied to an artificial dataset and the effectiveness of LBSOINN in the clustering has been demonstrated. It has been confirmed from all the experimental results that LBSOINN has a stability higher than that of E-SOINN and a performance better than that of E-SOINN in the high-dimensional space.

First Embodiment

Hereinafter, with reference to the drawings, an embodiment of the present invention will be described.

Figure 20:
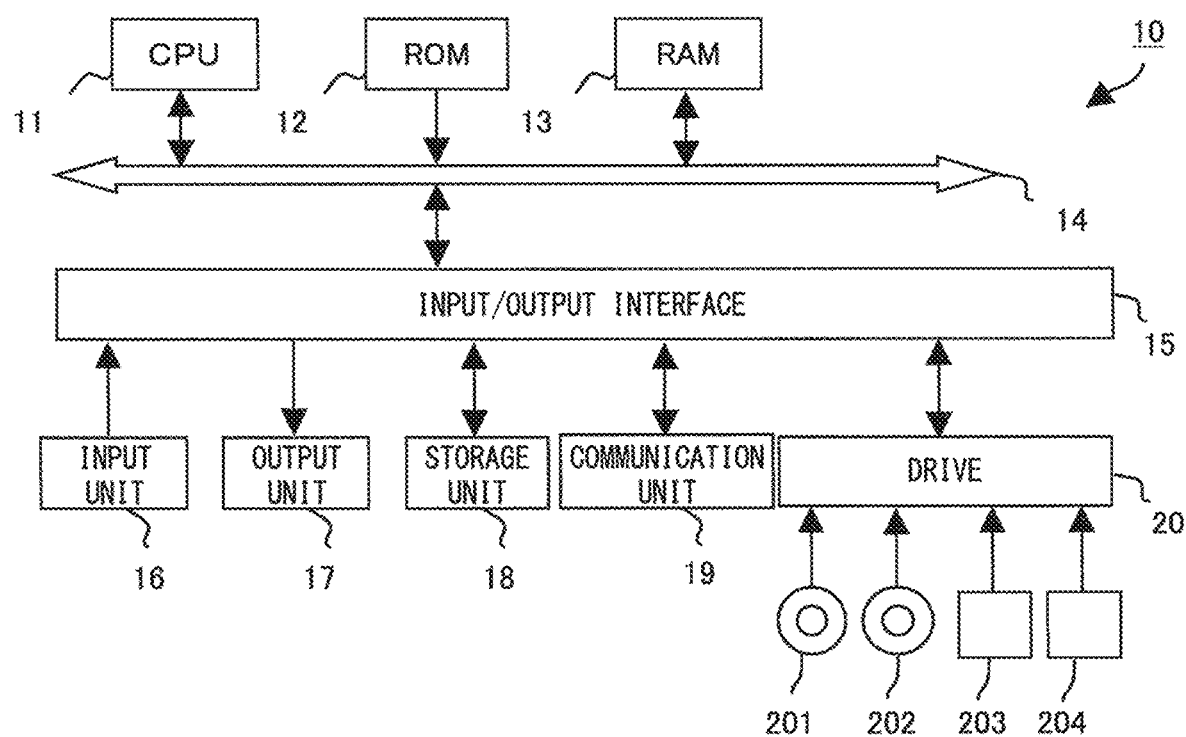
FIG. 20 is a diagram showing a configuration example to execute an information processing apparatus according to this embodiment.

FIG. 20 is a diagram showing one example of a system configuration for achieving an information processing apparatus according to a first embodiment as an example of LBSOINN. An information processing apparatus 1 can be implemented by a computer 10 such as a dedicated computer, a personal computer (PC) or the like. However, the computer is not necessarily a physically single computer, and a plurality of computers may be used to execute distributed processing. As shown in FIG. 20, the computer 10 includes a Central Processing Unit (CPU) 11, a Read Only Memory (ROM) 12, and a Random Access Memory (RAM) 13 and the CPU 11, the ROM 12, and the RAM 13 are interconnected through a bus 14. While a description of an OS software and the like to activate the computer will be omitted, a computer that constructs the information processing apparatus is naturally included.

An input/output interface 15 is also connected to the bus 14. For example, an input unit 16 (e.g., a key board, a mouse, and a sensor), an output unit 17 (e.g., a display including a CRT, an LCD or the like, a head phone, and a speaker), a storage unit 18 (e.g., a hard disk), and a communication unit 19 (e.g., a modem and a terminal adapter) are connected to the input/output interface 15.

The CPU 11 executes various processing according to various programs stored in the ROM 12 or various programs loaded to the RAM 13 from the storage unit 18, and in this embodiment, processing of each means (e.g., node density calculation means 23 or load balancing means 33 described below). The RAM 13 further stores data necessary for the CPU 11 to execute various processing.

The communication unit 19 performs communication processing via, for example, the Internet (not shown), transmits data that has been provided from the CPU 11, and outputs data that has been received from a communication partner to the CPU 11, the RAM 13, and the storage unit 18. The storage unit 18 communicates with the CPU 11, and stores and deletes information. The communication unit 19 further performs processing for communicating analog signals or digital signals with another apparatus.

A drive 20 is connected to the input/output interface 15 as needed and a magnetic disk 201, an optical disk 202, a flexible disk 203, a semiconductor memory 204 or the like is attached to the drive 20 as appropriate, and computer programs read out from them are installed in the storage unit 18 as needed.

Figure 21:
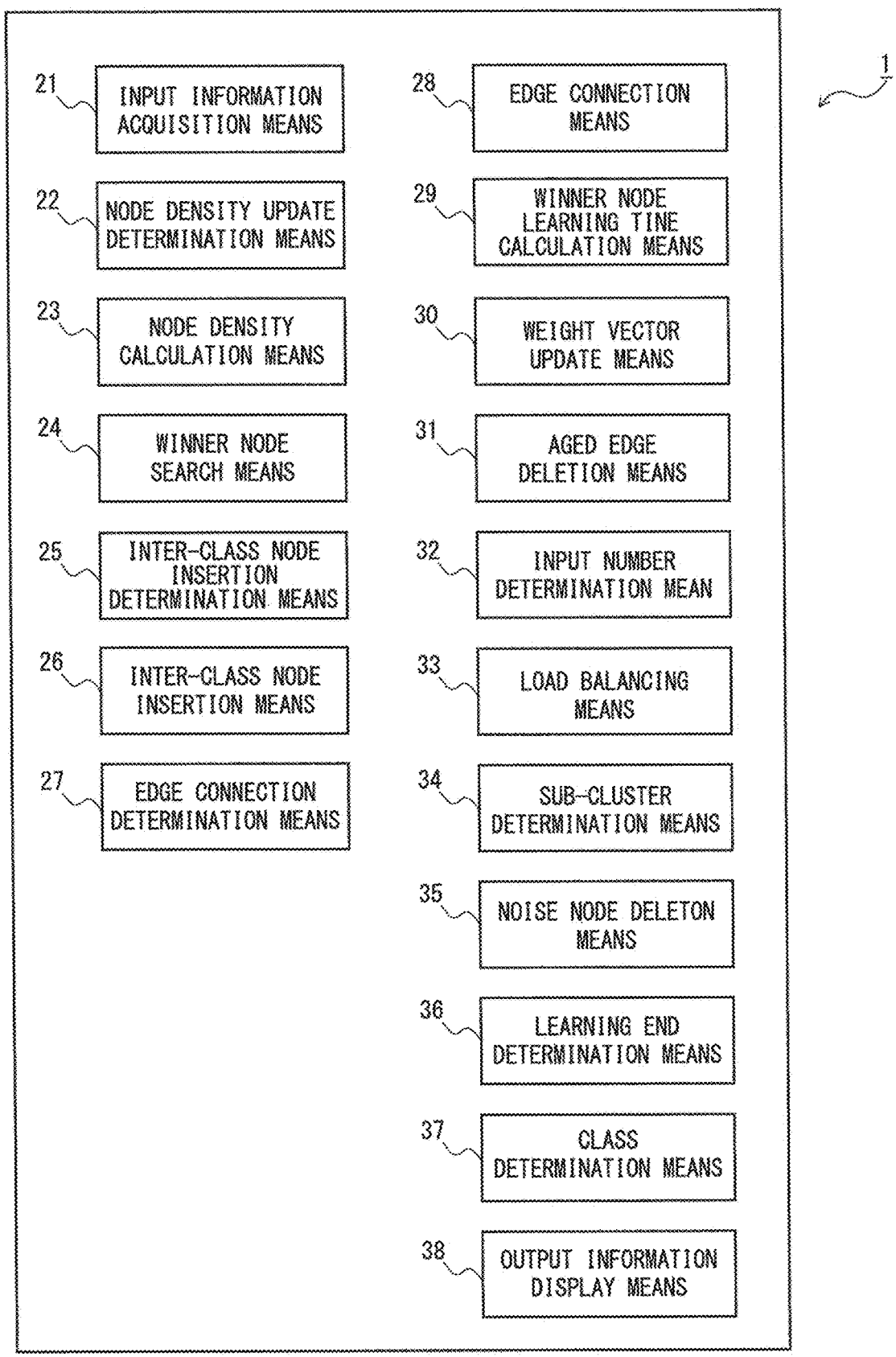
FIG. 21 is a diagram showing a functional block of the information processing apparatus according to this embodiment.

Next, main processing in the information processing apparatus 1 according to this embodiment will be described using a functional block diagram shown in FIG. 21. In terms of hardware, each processing is actually achieved by the collaboration of software and hardware resources such as the CPU 11.

The information processing apparatus 1 includes a non-hierarchical neural network in which nodes described by n-dimensional vectors are arranged and includes input information acquisition means 21, node density update determination means 22, node density calculation means 23, winner node search means 24, inter-class node insertion determination means 25, inter-class node insertion means 26, edge connection determination means 27, edge connection means 28, winner node learning time calculation means 29, weight vector update means 30, aged edge deletion means 31, input number determination means 32, load balancing means 33, sub-cluster determination means 34, noise node deletion means 35, learning end determination means 36, class determination means 37, an output information display means 38. In the following description, the details of each means will be described.

In this embodiment, the neural network included in the information processing apparatus 1 is a self-propagating neural network that receives input vectors and automatically increases the nodes arranged in the neural network based on the input vectors that are input to the neural network. Further, in the following description, it is assumed that the neural network has a nonhierarchical structure.

Since it is possible to automatically increase the nodes using the self-propagating neural network, the information processing apparatus 1 can cope with not only a stationary environment in which input vectors are given randomly from an input vector space but also a non-stationary environment in which, for example, the classes to which the input vectors belong are switched at predetermined cycles and the input vectors are randomly given from the classes after the switches. Furthermore, by employing the nonhierarchical structure, it is possible to execute additional learning without designating the timing to start learning in other layers. That is, it is possible to execute complete online additional learning.

The input information acquisition means 21 acquires n-dimensional input vectors that belong to arbitrary classes as information given to the information processing apparatus 1 as an input. The input information acquisition means 21 then stores the input vectors that has been acquired by it in a temporary storage unit (e.g., RAM 13) and successively outputs the input vectors to the neural network stored in the temporary storage unit.

The node density update determination means 22 checks, for the nodes and the minimum distance value and the maximum distance value between the nodes based on each distance measure stored in the temporary storage unit, whether at least one value of the minimum distance value and the maximum distance value between the nodes based on each distance measure has been changed, and when the at least one value has been changed, determines to update the node density and stores the results in the temporary storage unit. The details of the minimum distance value and the maximum distance value between the nodes based on each distance measure will be described later.

The node density calculation means 23 calculates, for the nodes, the minimum distance value and the maximum distance value between the nodes based on each distance measure, the vector of the average distance of a node from an adjacent node, the vector of a point value of the node density, the vector of an accumulated point value of the node density, and the node density stored in the temporary storage unit, each component of the vector of the average distance of a first winner node from the adjacent node using each of a first distance calculation expression and a second distance calculation expression, calculates the vector of the point value of the node density of the first winner node based on the vector of the distance of the first winner node that has been calculated from the adjacent node, calculates the vector of the accumulated point value of the node density of the first winner node based on the vector of the point value of the node density of the first winner node that has been calculated, calculates the node density of the first winner node based on the vector of the accumulated point value of the node density of the first winner node that has been calculated, and stores the results in the temporary storage unit. The details of the first distance calculation expression and the second distance calculation expression, and the processing for calculating the node density of the first winner node will be described later.

Further, when the node density is determined to be updated as a result of the determination by the node density update determination means 22 stored in the temporary storage unit, the node density calculation means 23 updates, for the nodes, the vector of the accumulated point value of the node density, the learning time of the nodes, and the minimum distance value and the maximum distance value between the nodes based on each distance measure stored in the temporary storage unit, based on the minimum distance value and the maximum distance value between two nodes based on the Euclidean distance before and after the changes and the minimum distance value and the maximum distance value between two nodes based on another distance measure before and after the changes, for all the nodes in the network, the vector of the accumulated point value of the node density of the node to be noted, re-calculates the node density of the node to be noted based on the vector of the accumulated point value of the node density of the node to be noted that has been updated, and stores the results in the temporary storage unit. The details of the processing for calculating the vector of the accumulated point value of the node to be noted will be described later.

The winner node search means 24 searches, for the nodes and the input vectors stored in the temporary storage unit, a node located at a position that is the closest to the input vector as the first winner node and a node located at a position that is the second closest to the input vector as the second winner node, and stores the results in the temporary storage unit. The details of the distance measure according to this embodiment will be described later.

The inter-class node insertion determination means 25 determines, for the nodes and the input vectors stored in the temporary storage unit, whether to execute inter-class node insertion based on the distance between the input vector and the first winner node and the distance between the input vector and the second winner node and stores the results in the temporary storage unit. The details of the inter-class node insertion determination processing according to this embodiment will be described later.

The inter-class node insertion means 26 assumes that the input vector stored in the temporary storage unit is a node that is to be newly added to the network according to a result of the determination by the inter-class node insertion determination means 25 stored in the temporary storage unit, generates an inter-class insertion node having a component the same as that of the input vector as a weight vector, inserts the inter-class insertion node that has been generated into the network, and stores the results in the temporary storage unit.

The edge connection determination means 27 determines, for the nodes and the sub-cluster labels of the nodes stored in the temporary storage unit, each sub-cluster to which the first winner node and the second winner node belong according to the result of the determination by the inter-class node insertion determination means 25 stored in the temporary storage unit based on the sub-cluster labels of the nodes and stores the results in the temporary storage unit. The sub-cluster label of the node indicates the sub-cluster to which the node belongs. The cluster means a set of nodes connected by edges for the nodes included in a mixed class, and the sub-cluster indicates a subset of clusters including nodes to which one sub-cluster label is given.

Further, when the first winner node and the second winner node belong to the sub-clusters different from each other as a result of the determination stored in the temporary storage unit, the edge connection determination means 27 further determines, for the nodes, the node density, and the sub-cluster labels of the nodes stored in the temporary storage unit, whether the node densities of the first winner node and the second winner node satisfy at least one of the condition of the node density of the first winner node based on the average node density of the sub-cluster including the first winner node and the condition of the node density of the second winner node based on the average node density of the sub-cluster including the second winner node, and stores the results in the temporary storage unit. The details of the edge connection determination processing by the edge connection determination means 27 will be described later.

When at least one of the first winner node and the second winner node does not belong to any sub-cluster or the first winner node and the second winner node belong to one sub-cluster as a result of the determination by the edge connection determination means 27 stored in the temporary storage unit, an edge connection means 28 connects, for the nodes and the edges between the nodes stored in the temporary storage unit, the edge between the first winner node and the second winner node and stores the results in the temporary storage unit.

Further, when at least one of the conditions of the node densities of the first winner node and the second winner node is satisfied as a result of the determination by the edge connection determination means 27 stored in the temporary storage unit, the edge connection means 28 connects, for the nodes and the edges between the nodes stored in the temporary storage unit, an edge between the first winner node and the second winner node and stores the results in the temporary storage unit.

Further, when at least one of the conditions of the node densities of the first winner node and the second winner node is not satisfied as a result of the determination by the edge connection determination means 27 stored in the temporary storage unit, the edge connection means 28 does not connect, for the nodes and the edges between the nodes stored in the temporary storage unit, an edge between the first winner node and the second winner node (when there is an edge between the first winner node and the second winner node, this edge is deleted), and stores the results in the temporary storage unit. The details of the winner node connection processing by the edge connection means 28 will be described later.

The winner node learning time calculation means 29 increments, for the nodes and the learning time of the nodes stored in the temporary storage unit, the learning time of the first winner node by a predetermined value and stores the results in the temporary storage unit. In this embodiment, the details of the learning time of the nodes will be described later.

The weight vector update means 30 updates, for the nodes and the weight vectors of the nodes stored in the temporary storage unit, using a node that is directly connected to the node to be noted by an edge as an adjacent node, each of the weight vector of the first winner node and the weight vector of the adjacent node of the first winner node to make them closer to the input vector and stores the results in the temporary storage unit.

The aged edge deletion means 31 increments, for the nodes, the edges between the nodes, and the ages of the edges stored in the temporary storage unit, the ages of all the edges directly connected to the first winner node by a predetermined value and stores the results in the temporary storage unit. Further, the aged edge deletion means 31 deletes, for the edges stored in the temporary storage unit, the edges having ages above a predetermined threshold that has been set in advance and stored in the temporary storage unit and stores the results in the temporary storage unit.

The input number determination means 32 determines, for the total number of given input vectors stored in the temporary storage unit, whether the total number of given input vectors is a multiple of a predetermined unit number that has been set in advance and stored in the temporary storage unit and stores the results in the temporary storage unit.

The load balancing means 33 detects, for the nodes, the edges between the nodes, the sub-cluster labels of the nodes, the weight vectors of the nodes, and the learning time of the nodes stored in the temporary storage unit, at predetermined cycles according to the total number of input vectors, a node where the value of the learning time is relatively large and unbalanced, generates a new node having a weight vector based on the weight vector of the node that has been detected and the adjacent node of the node that has been detected to insert the new node into the network, decrements the learning time of the node that has been detected and the learning time of the adjacent node of the node that has been detected, deletes the edges between the node that has been detected and the adjacent node of the node that has been detected, connects an edge between the node that has been newly inserted and the node that has been detected, connects an edge between the node that has been newly inserted and the adjacent node of the node that has been detected, and stores the results in the temporary storage unit. The details of the processing for balancing the load of the nodes by the load balancing means 33 will be described later.

The sub-cluster determination means 34 gives, for the nodes, the edges between the nodes, the sub-cluster labels of the nodes, the node density, and Voronoi regions stored in the temporary storage unit, sub-cluster labels different from each other to an apex, which is a node that has a locally maximum node density, gives the sub-cluster label the same as the sub-cluster label given to the adjacent node where the node density is maximum to all the nodes to which the sub-cluster labels have not been given, generates a Voronoi region based on a reference apex having a node density larger than a predetermined threshold among the apices, and when the sub-cluster including the reference apex and the sub-cluster including apices other than the reference apex have an overlapping region and the condition of the average node density of the nodes located in the overlapping region is satisfied in the Voronoi region that has been generated, gives a sub-cluster label of the sub-cluster including the reference apex as a sub-cluster label of the sub-cluster including other apices, and stores the results in the temporary storage unit. The details of the processing by the sub-cluster determination means 34 will be described later.

The noise node deletion means 35 deletes, for the nodes, the node density, the edges between the nodes, and the number of adjacent nodes stored in the temporary storage unit, the node to be noted based on the number of adjacent nodes of the node to be noted and the node density and stores the results in the temporary storage unit.

The learning end determination means 36 determines whether to end the learning processing by the information processing apparatus 1.

The class determination means 37 determines, for the nodes, the edges between the nodes, and the classes of the nodes stored in the temporary storage unit, the class to which the node belongs based on the edges generated between the nodes and stores the results in the temporary storage unit.

The output information display means 38 outputs, for the nodes and the classes of the nodes stored in the temporary storage unit, the number of classes to which the nodes belong and the prototype vector of each class.

Next, the characteristic configurations and processing of the information processing apparatus 1 according to this embodiment will be described. In the following description, <1: Processing for Balancing Load between Nodes>, <2: Processing for Determining Sub-clusters>, <3: New Framework of Combination of Distance Measures>, <4: Definition of Similarity Threshold>, <5: Definition of New Node Density and Processing for Calculating New Node Density>, and <6: Edge Connection Determination Processing and Edge Connection Processing> will be described in this order.

<1: Processing for Balancing Load Between Nodes>

Figure 2A:
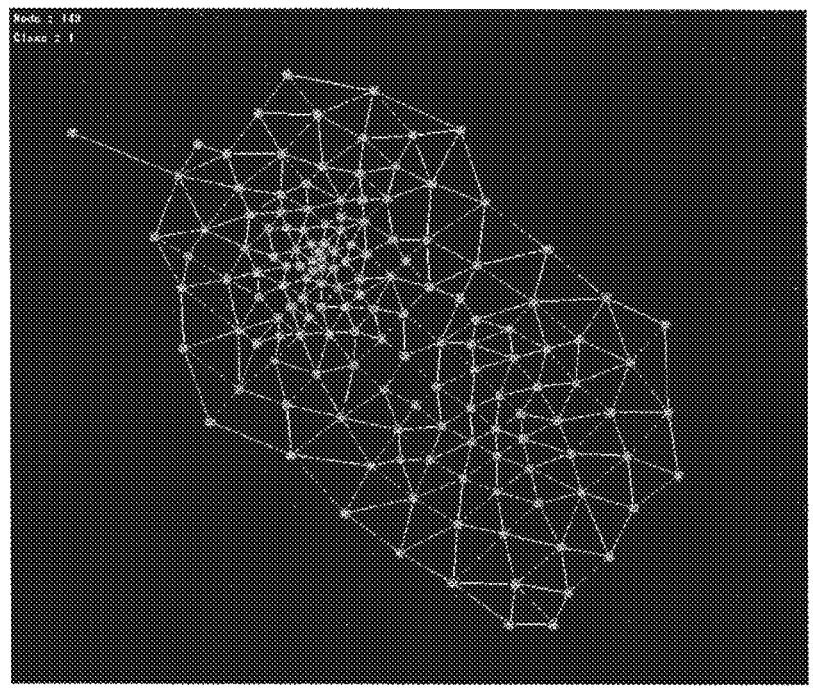
FIG. 2A is a diagram for describing a problem solved by the present disclosure.
Figure 2B:
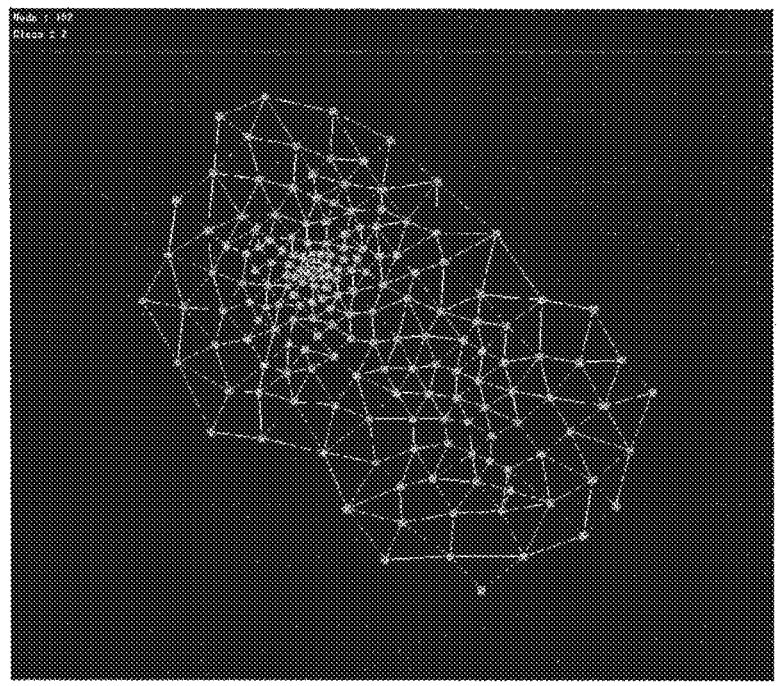
FIG. 2B is a diagram for describing a problem solved by the present disclosure.

E-SOINN determines whether to insert an inter-class node, which is a new input vector, in the network simply using only the determination by a similarity threshold of the first winner or the second winner. Therefore, if the connection structure of the nodes has already been constructed when network learning is to be newly started, it is difficult to insert the new node in the network. Since the connection structure of the nodes that has already been constructed is greatly influenced by the input order of the input data, the learning results of E-SOINN are not stable. Further, as shown in FIG. 2, this defect causes a low accuracy for the input data when the node density is to be calculated.

In order to accurately represent the connection structure of the nodes, it is important to prepare a sufficient number of nodes, which is known well. When the number of nodes is not sufficiently large in some regions of the network, the value of the learning time of the nodes in these regions is large and unbalanced. In this embodiment, this situation is defined to be a state in which the load of the nodes is unbalanced. In this embodiment, processing for balancing the load between the nodes shown below will be introduced in order to solve the load imbalances.

<1-1: Processing for Balancing Load Between Nodes (S101 to S107)>

When the total number of inputs of the input vectors is an integral multiple of a predetermined unit number (λ), the load balancing means 33 detects, for the nodes, the edges between the nodes, the sub-cluster labels of the nodes, the weight vectors of the nodes, the learning time of the nodes, and the node density stored in the temporary storage unit, a node where the value of the learning time is relatively large and unbalanced compared to the average learning time of the sub-cluster to which the node belongs (node where the load is imbalanced), inserts a new node between the node that has been detected and the adjacent node, decreases the learning time of the node that has been detected and the adjacent node, and stores the results in the temporary storage unit. The load balancing means 33 thus balances the load of the nodes that is unbalanced. In the following description, the processing for balancing the load of the nodes will be described in detail. The details of the learning time of the nodes and the node density will be described later.

S101: The load balancing means 33 searches, for the nodes, the sub-cluster labels of the nodes, and the learning time of the nodes stored in the temporary storage unit, the node having a relatively large learning time of the node in each sub-cluster based on the learning time of the nodes, and stores the results in the temporary storage unit. The load balancing means 33 searches, for example, a node q having the maximum learning time of the nodes in each sub-cluster and stores the results in the temporary storage unit. Further, the load balancing means 33 determines, for the nodes and the learning time of the nodes stored in the temporary storage unit, whether the learning time of the node q that has been detected is relatively large and unbalanced and stores the results in the temporary storage unit. The load balancing means 33 determines, for a learning time $M_q$ of the node q and an average learning time $M_{cq}^{average}$ of the sub-cluster to which the node q belongs, for example, whether $M_q > 3 M_{cq}^{average}$ is satisfied and stores the results in the temporary storage unit. The load balancing means 33 calculates the average learning time $M_{cq}^{average}$ of the sub-cluster to which the node q belongs by calculating the average of the learning time of all the nodes included in the sub-cluster to which the node q belongs and stores the results in the temporary storage unit. When $M_q > 3 M_{cq}^{average}$ is established as a result of the determination stored in the temporary storage unit, the load balancing means 33 adds a new node as described below. On the other hand, when $M_q > 3 M_{cq}^{average}$ is not established, no node is added.

S102: The load balancing means 33 determines, for the nodes and the learning time of the nodes stored in the temporary storage unit, an adjacent node f having the maximum learning time, for example, among the adjacent nodes of the node q based on the learning time of the nodes, and stores the results in the temporary storage unit. The load balancing means 33 determines, for example, the adjacent node f that satisfies the following expression stored in the temporary storage unit and stores the results in the temporary storage unit. The symbol $N_g$ indicates a set of adjacent nodes of the node q.

[Expression 3]
$$f = \arg \max_{c \in N_q} M_c \quad (3)$$

S103: The load balancing means 33 generates, for the nodes stored in the temporary storage unit, a new node r to add the new node r to the network and stores the results in the temporary storage unit. Further, the load balancing means 33 interpolates and calculates, for the nodes and the weight vectors of the nodes stored in the temporary storage unit, a weight vector $W_r$ of a node r using a weight vector $W_q$ of the node q and a weight vector $W_f$ of the adjacent node f and stores the results in the temporary storage unit. The load balancing means 33 executes, for example, operation and calculation processing shown by the following expression stored in the temporary storage unit and stores the results in the temporary storage unit.

[Expression 4]
$$A = A \cup \{r\}, W_r = (W_q + W_f)/2.0 \quad (4)$$

S104: The load balancing means 33 interpolates and calculates, for the nodes and the learning time of the nodes stored in the temporary storage unit, a learning time $M_r$ of the node r using the learning time $M_g$ of the node q and a learning time $M_f$ of the adjacent node f and stores the results in the temporary storage unit. The load balancing means 33 executes, for example, the calculation processing shown by the following expression stored in the temporary storage unit and stores the results in the temporary storage unit. The symbol d indicates the number of dimensions of the input vector.

[Expression 5]
$$M_r = \frac{1}{d}(M_q + M_f) \quad (5)$$

S105: The load balancing means 33 decrements, for the nodes and the learning time of the nodes stored in the temporary storage unit, each of the learning time $M_g$ of the node q and the learning time $M_f$ of the adjacent node f by a predetermined rate and stores the results in the temporary storage unit. For example, the load balancing means 33 executes the calculation processing shown in the following expression stored in the temporary storage unit and stores the results in the temporary storage unit. The symbol d indicates the number of dimensions of the input vector.

[Expression 6]

$$M_q = \left(1 - \frac{1}{2d}\right)M_q, \; M_f = \left(1 - \frac{1}{2d}\right)M_f \quad (6)$$

S106: The load balancing means 33 interpolates and calculates, for the nodes and the node density stored in the temporary storage unit, a density $h_r$ of the node r using a density $h_q$ of the node q and a density $h_f$ of the adjacent node f and stores the results in the temporary storage unit. For example, the load balancing means 33 executes the calculation processing shown in the following expression stored in the temporary storage unit and stores the results in the temporary storage unit.

[Expression 7]

$$h_r = \frac{1}{d}(h_q + h_f) \quad (7)$$

S107: The load balancing means 33 generates, for the nodes and the edges between the nodes stored in the temporary storage unit, an edge that connects the new node r and the node q and an edge that connects the new node r and the adjacent node f, deletes an edge that originally exists between the node q and the adjacent node f, and stores the results in the temporary storage unit. For example, the load balancing means 33 executes the operations shown in the following Expressions (8) and (9) stored in the temporary storage unit and stores the results in the temporary storage unit. The symbol C indicates an edge set and (r,q) indicates, for example, the edge that connects the node r and the node q.

[Expression 8]

$$C = C \cup \{(r,q),(r,f)\} \quad (8)$$

[Expression 9]

$$C = C \setminus \{(q,f)\} \quad (9)$$

As described above, the information processing apparatus 1 employs the average learning time of the sub-cluster to which the node belongs as a reference level and applies it to the task of the additional learning of whether to newly insert a node into the network. Therefore, the knowledge obtained by the previous learning result (network including nodes and the connection structure of the nodes) does not give any influence on the input vector that is to be newly input. According to this processing, the processing for generating the node connection structure by the information processing apparatus 1 is different from that in E-SOINN.

The information processing apparatus 1 executes, regarding whether to newly insert an input vector into the network, besides the inter-class node insertion processing for inserting nodes using the similarity threshold of the first winner or the second winner, load balancing processing for detecting a node where the load is imbalanced (that is, the node where the learning time is large and unbalanced) and inserting a new node into a position close to the node that has been detected. It is therefore possible to balance the load of the nodes in the network. When both the new node insertion shown in the above S101 to S107 and the node insertion shown in S507 described below belong to the inter-class insertion, the number of nodes in the network can be sufficiently large in the information processing apparatus 1, whereby it is possible to accurately reflect the density distribution of the input data. Accordingly, it is possible to accurately describe the connection structure of the input patterns without being influenced by the input order of the input data, which means that the information processing apparatus 1 has a stability higher than that in background art.

<2: Processing for Determining Sub-Clusters>

When the number of input vectors to be input is an integral multiple of the predetermined unit number (λ), besides the load balancing processing described above, the sub-cluster determination means 34 executes, for the nodes, the edges between the nodes, the sub-cluster labels of the nodes, the node density, and the Voronoi regions stored in the temporary storage unit, processing for determining the sub-cluster based on Voronoi Tessellation and stores the results in the temporary storage unit. The processing for determining the sub-cluster is processing for giving the sub-cluster label to a node in the network to determine the sub-cluster to which this node belongs.

As described above, the processing by E-SOINN causes the iteration of the integration and the separation of the sub-clusters. This is because there are a large number of sub-clusters in the network after the execution of the processing by E-SOINN (it corresponds to the processing of S611 in FIG. 5 of Patent Literature 1, and in particular, the processing described in Paragraph 0071 of the specification.) and further sub-clusters located at the outer periphery of the true sub-cluster are easily integrated by the processing by E-SOINN (it corresponds to the processing of S607, S612 and the like in FIG. 5 of Patent Literature 1, and in particular, the processing described in Paragraphs 0072 to 0079 of the specification). The information processing apparatus 1 deals with the problem of E-SOINN by introducing sub-cluster determination processing for the purpose of integrating the sub-clusters as shown below.

In this embodiment, in order to promote better understanding of the following processing, a term "tuber" is used in place of the term "sub-cluster". As will be described below, in this embodiment, the term "tuber" is used to describe the set including the node that has a locally maximum node density and a node that is connected to the node that has a locally maximum node density by an edge. While the term "tuber" normally means a swollen part of a mountain, the term "tuber" is used in this embodiment to express the rise of the node density in consideration of the level of the node density of the nodes included in each sub-cluster regarding the plurality of sub-clusters included in one class. For example, in FIG. 5, each of A, B, C, and D indicates a tuber. A and C belong to one class, and B and D belong to another class.

Figure 5:
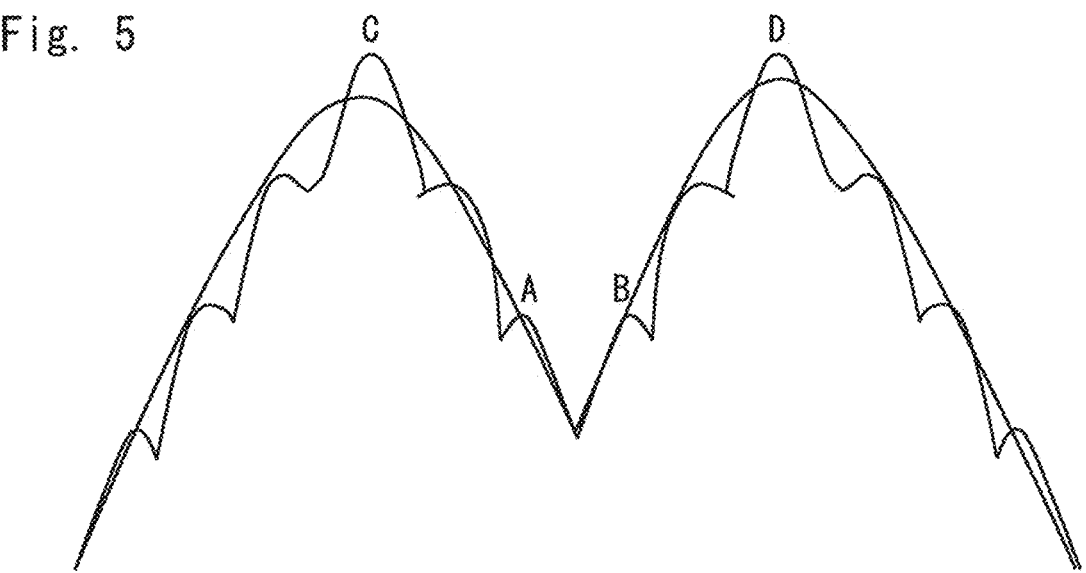
FIG. 5 is a diagram for describing sub-cluster determination processing according to this embodiment.

As will be described later, in this embodiment, the sub-cluster determination processing is executed from the tuber where the node density is high to the tuber where the node density is low in each Voronoi region. In FIG. 5, when the sub-cluster determination processing is started from the tuber A, for example, the tuber B is easily integrated with the tuber A, which causes a network disturbance. Further, the sub-cluster determination processing of the tuber needs to be accurately stopped to prevent the integration with another tuber. Further, in FIG. 5, in the sub-cluster determination processing of the tuber C, for example, it is required not to integrate the tuber C with the tuber B.

The processing for determining the tuber will be described below. This processing is also called a Separate and Downhill smooth algorithm (SDSA). In the following processing, the node that has a locally maximum node density is called the apex of the tuber. In other words, the apex of the tuber means a node that has the maximum node density among the nodes included in the corresponding tuber.

<2-1: Processing for Determining Sub-Clusters (S201 to S205, S301 to S305)>

S201: The sub-cluster determination means 34 searches, for the nodes and the node density stored in the temporary storage unit, a node that has the locally maximum node density among all the nodes in the mixed class, adds the node that has been searched to a node set LM as the apex of the tuber, and stores the results in the temporary storage unit. The sub-cluster determination means 34 gives, for the nodes and the sub-cluster labels of the nodes (tuber labels) stored in the temporary storage unit, tuber labels different from each other to all the respective apices that have been searched, and stores the results in the temporary storage unit.

S202: The sub-cluster determination means 34 gives, for the nodes, the edges that connect the nodes, and the sub-cluster labels of the nodes (tuber labels) stored in the temporary storage unit, the tuber label the same as the label which has been given to the adjacent node having the maximum node density to all the nodes to which the tuber labels have not been given in S201. That is, in S201, tuber labels different from each other are given to the respective apices. Then, in S202, the tuber label of the node having the maximum node density among the adjacent nodes of the node is given to each of all the nodes other than the apex. In this way, the tuber label is given to all the nodes and a set of nodes to which the same tuber label is given is treated as a tuber (sub-cluster), whereby the mixed class is separated into a plurality of tubers (sub-clusters). When the node to be noted and the adjacent node of the node to be noted have tuber labels different from each other, the node to be noted and the adjacent node of the node to be noted may be located in the overlapping region of the distributions.

S203: The sub-cluster determination means 34 searches, for the nodes and the node density stored in the temporary storage unit, a node whose density is larger than β in the node set LM of the apices, adds the node that has been searched to a node set K, and stores the results in the temporary storage unit. For example, the sub-cluster determination means 34 calculates the value β by executing the calculation processing shown in the following Expression stored in the temporary storage unit, and stores the results in the temporary storage unit. The symbol γ indicates a parameter (1<γ<2) that has been determined and set in advance as appropriate by a user, $h_{mean}$ indicates the average value of the density of the nodes of all the apices included in the set of apices LM, and $h_{max}$ indicates the maximum node density among the node densities of the apices included in the node set LM.

[Expression 10]

$$\beta = \min\left(\gamma^2 h_{mean}, \frac{1}{\gamma} h_{max}\right) \quad (10)$$

Figure 6:
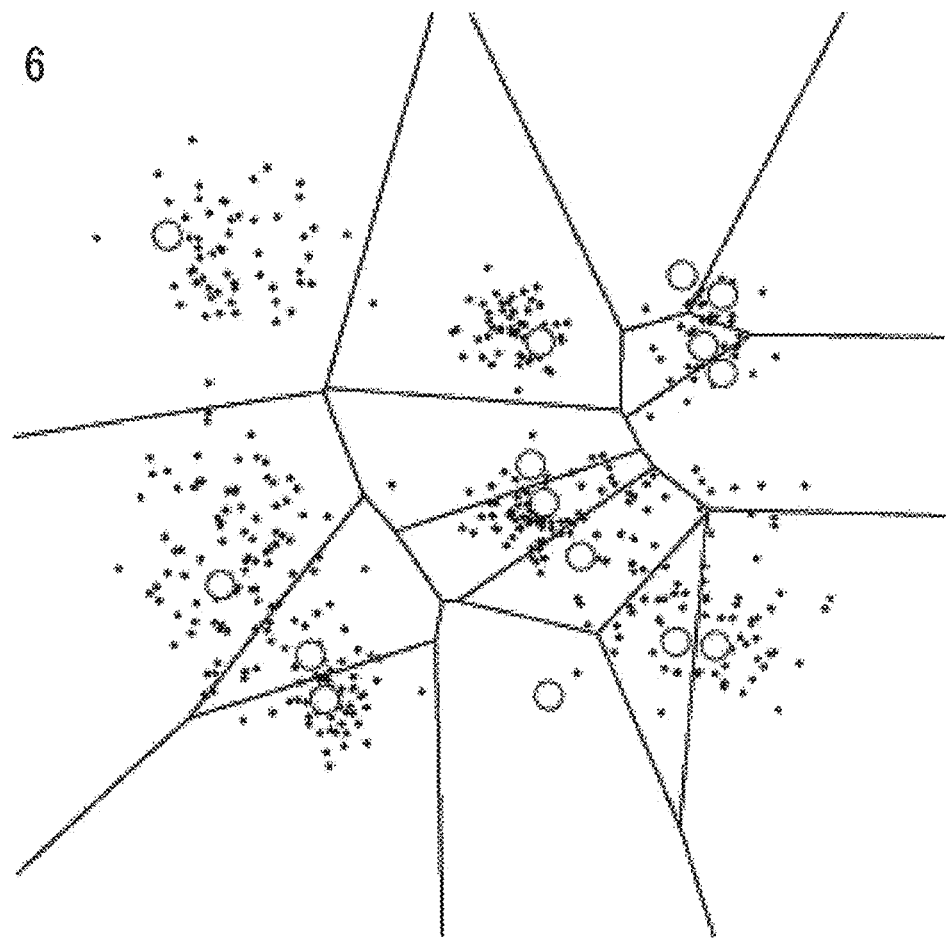
FIG. 6 is a diagram for describing one example of Voronoi regions according to this embodiment.

S204: The sub-cluster determination means 34 generates, for the nodes, the weight vectors of the nodes, and the Voronoi regions stored in the temporary storage unit, Voronoi regions for the node set LM of the apices (see FIG. 6) based on the node set K and stores the results in the temporary storage unit. The sub-cluster determination means 34 executes, for example, the operation shown in the following Expression (11) stored in the temporary storage unit and stores the results in the temporary storage unit. In the processing for generating the Voronoi region shown in Expression (11), a Voronoi region $V_i$ corresponds to a seed, which is a node $K_i$ included in the node set K. That is, the node $K_i$ included in the node set K is the i-th seed in the Voronoi region $V_i$. In this way, in the processing shown in S201 to 204, the node set LM includes all the apices and the node set K includes apices having node densities higher than β among all the apices. The node set K is then used as the seed of the Voronoi region. In FIG. 6, for example, such a seed is shown by ◯ (white circle).

[Expression 11]

$$V_i = \left\{c \in LM \mid i = \arg\min_{j \in K} D(c, j)\right\} \quad (11)$$

Note that the Voronoi region is a basic knowledge in the fields of the artificial intelligence and mathematics (see, for example, http://en.m.wikipedia.org/wiki/Voronoi_diagram), and known Voronoi region generation processing can be executed as the aforementioned Voronoi region generation processing. Therefore, the detailed descriptions will be omitted here.

S205: The sub-cluster determination means 34 executes, for the nodes, the edges between the nodes, the node density, the sub-cluster labels of the nodes (tuber labels), and the Voronoi regions stored in the temporary storage unit, processing shown in the following S301 to S305, determines the sub-cluster by performing the integration of the sub-clusters in all the Voronoi regions generated in S204, and stores the results in the temporary storage unit. To "determine the sub-cluster in the Voronoi region" means processing for integrating, when the tuber included in each Voronoi region satisfies a predetermined condition regarding the node density, the tuber label of each tuber into the tuber label of the node $K_i$. The predetermined condition means, for example, one of Expressions (12) and (13) described below is satisfied.

S301: The sub-cluster determination means 34 determines, for the nodes, the sub-cluster labels of the nodes (tuber labels), and the Voronoi regions stored in the temporary storage unit, based on the tuber labels added to the nodes, in one Voronoi region $V_i$, whether the tuber ($K_i$) of the node $K_i$ included in the Voronoi region $V_i$ and the tuber (j) including the node j have an overlapping region and stores the results in the temporary storage unit. In the following description, for the sake of easier understanding, the tuber to which the node $K_i$ belongs is denoted by a tuber ($K_i$), the tuber label given to the node $K_i$ is denoted by a tuber label ($K_i$), a tuber to which the node j belongs is denoted by a tuber (j), and the tuber label given to the node j is denoted by a tuber label (j). Further, the node j here means the node included in the set of apices LM in the Voronoi region $V_i$.

The sub-cluster determination means 34 determines whether the tuber ($K_i$) of the node $K_i$ and the tuber (j) including the node j has an overlapping region by, for example, the following processing. The sub-cluster determination means 34 determines, for the nodes, the edges between the nodes, and the sub-cluster labels of the nodes (tuber labels) stored in the temporary storage unit, based on the edges between the nodes included in the network and the tuber labels added to the nodes, whether there is an edge where the tuber label of the node in one end is the tuber label (10 and the tuber label in the other node is the tuber label (j), and when there is an edge that satisfies the condition as a result of the determination, determines that the tuber ($K_i$) of the node $K_i$ and the tuber (j) including the node j have an overlapping region and stores the results in the temporary storage unit.

S302: When the result of the determination stored in the temporary storage unit shows that the tuber ($K_i$) of the node $K_i$ and the tuber (j) including the node j has an overlapping region, the sub-cluster determination means 34 adds the node j to a node set $O_{Ki}$. The node set $O_{Ki}$ is a set to store the tuber (j) which may be integrated into the tuber ($K_i$) of the node $K_i$ when the tuber ($K_i$) of the node $K_i$ and the tuber (j) including the node j have an overlapping region. When the tuber ($K_i$) of the node $K_i$ and the tuber (j) including the node j do not have an overlapping region, the sub-cluster determination means 34 goes to the processing of S301, where processing of another Voronoi region $V_i$ is carried out.

S303: The sub-cluster determination means 34 determines, for the node set $O_{Ki}$ stored in the temporary storage unit, whether the node set $O_{Ki}$ is an empty set and stores the results in the temporary storage unit. When the node set $O_{Ki}$ is an empty set as a result of the determination stored in the temporary storage unit, the sub-cluster determination means 34 goes to the processing of S301, where processing of another Voronoi region $V_i$ is carried out. When the node set $O_{Ki}$ is not an empty set, the sub-cluster determination means 34 goes to the processing of S304.

S304: The sub-cluster determination means 34 determines, for each node j included in the node set $O_{Ki}$, for example, whether any one of the following Expression (12) and Expression (13) stored in the temporary storage unit is satisfied and stores the results in the temporary storage unit. When the result of the determination stored in the temporary storage unit shows that one of the following Expressions (12) and (13) is satisfied, the sub-cluster determination means 34 gives the tuber label ($K_i$) of the node $K_i$ as the tuber label of the node j∈$O_{Ki}$. That is, the sub-cluster determination means 34 integrates the tuber (j) to which the node j belongs into the tuber ($K_i$) to which the node $K_i$ belongs by changing the tuber label (j) of the node j to the tuber label ($K_i$) of the node $K_i$.

[Expression 12]

$$mean_{OR} > \left(\theta^{\frac{h_{K_i}}{mean_{k_i}}} - 1\right) mean_{K_i} \quad (12)$$

[Expression 13]

$$mean_{OR} > \left(\theta^{\frac{h_j}{mean_j}} - 1\right) mean_j \quad (13)$$

In Expressions (12) and (13), $h_{Ki}$ indicates the node density of the node $K_i$. The symbol $mean_{Ki}$ indicates the average node density of the node densities of the nodes included in the tuber ($K_i$)(nodes included in the network). The symbol $h_j$ is the node density of the node j. The symbol mean indicates the average node density of the node densities of the nodes included in the tuber (j) (nodes included in the network).

Figure 23:
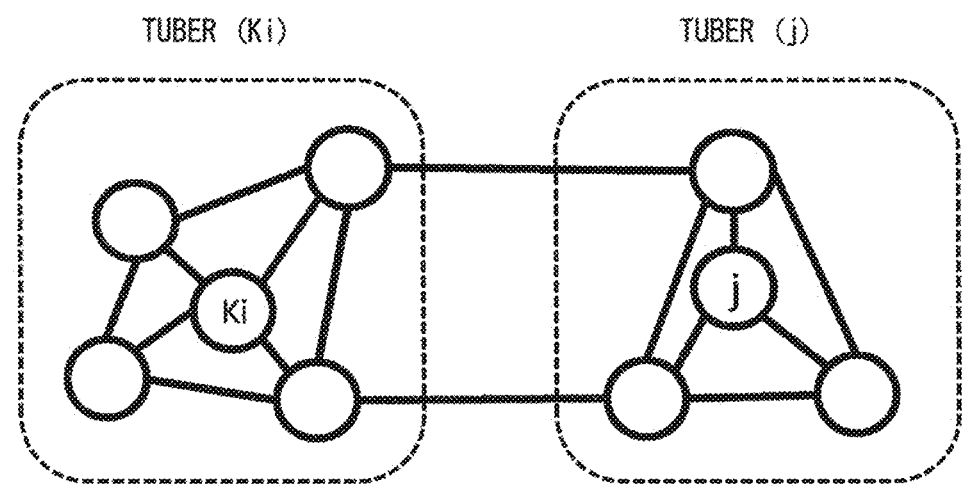
FIG. 23 is a diagram for describing nodes located in an overlapping region of sub-clusters according to this embodiment.

Now, the definition of $mean_{OR}$ will be described. For the tuber (j) of the node j included in the node set $O_{Ki}$, when the tuber ($K_i$) and the tuber (j) have an overlapping region, there is an edge that connects the node which is the tuber label ($K_i$) and the node which is the tuber label (j). Each node that is directly connected by this edge is referred to as a node located in the overlapping region of the tuber ($K_i$) and the tuber (j). The symbol $mean_{OR}$ indicates the average node density of the node densities of such nodes. In the case shown in FIG. 23, for example, the tuber ($K_i$) and the tuber (j) are connected by two edges and these tubers have an overlapping region. The nodes connected by these edges includes two nodes of the tuber ($K_i$) and two nodes of the tuber (j) and these four nodes are located in the overlapping region of the tuber ($K_i$) and the tuber (j). The symbol $mean_{OR}$ calculates the average of the node densities of these four nodes.

Further, θ indicates the parameter that has been determined and set in advance as appropriate by a user and the value of θ is defined within the range of [1,2]. Further, θ is the parameter of the element of the tolerance degree and is used to determine to which extent the difference between the tuber ($K_i$) and the tuber (j) should be tolerated in one class. The tolerance degree decreases as θ increases.

S305: The sub-cluster determination means 34 sets the node set $O_{Ki}$ stored in the temporary storage unit to the empty set, goes to the processing of Step S301, and again starts the processing of Step S301 and the following processing.

The processing of S301 to S305 will be described with reference to FIGS. 24(A), 24(B), and 24(C).

Figure 24A:
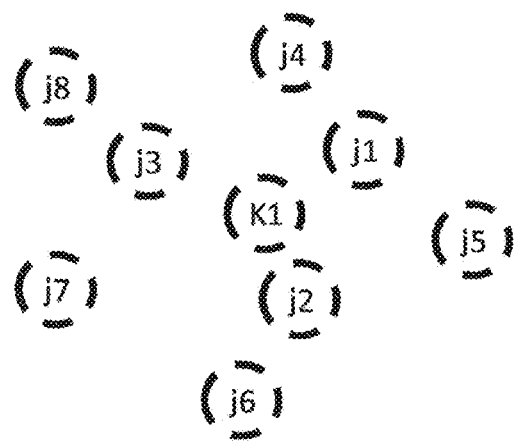
FIG. 24A is a diagram for describing a state of sub-cluster integration processing according to this embodiment.
Figure 24B:
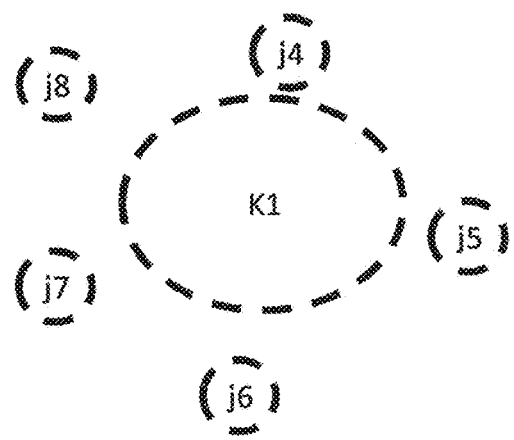
FIG. 24B is a diagram for describing a state of sub-cluster integration processing according to this embodiment.
Figure 24C:
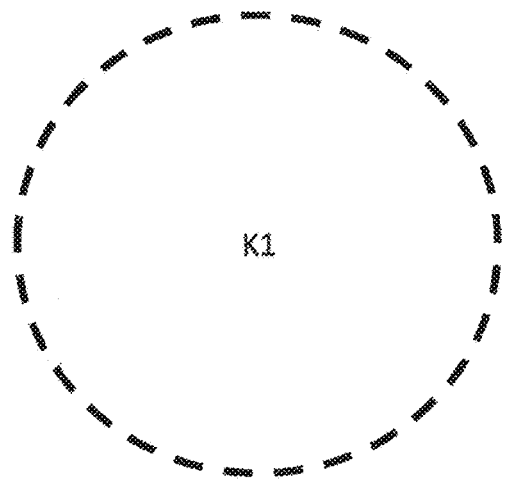
FIG. 24C is a diagram for describing a state of sub-cluster integration processing according to this embodiment.

As shown in FIG. 24(A), the Voronoi region $V_1$ includes a tuber (K1), a tuber (j1), a tuber (j2), a tuber (j3), a tuber (j4), a tuber (j5), a tuber (j6), a tuber (j7), and a tuber (j8). In FIG. 24(A), each tuber is shown using a dashed open circle. Each node and the edges between the nodes are not shown.

The sub-cluster determination means 34 determines in S301 whether the tuber (K1) and the tuber (j1) have an overlapping region, . . . , whether the tuber K1 and the tuber j8 have an overlapping region. When it is determined in S302 that the tuber (K1) and the tuber (j1) have an overlapping region, the sub-cluster determination means 34 adds the node j1 of the tuber (j1) to the set $O_{K1}$. When it is determined in S302 that the tuber (K1) and the tuber (j2) have an overlapping region, the sub-cluster determination means 34 adds the node j2 of the tuber (j2) to the set $O_{K1}$. When it is determined in S302 that the tuber (K1) and the tuber (j3) have an overlapping region, the sub-cluster determination means 34 adds the node j3 of the tuber (j3) to $O_{K1}$. As a result, the set $O_{K1}$ includes nodes j1, j2, and j3.

Next, the sub-cluster determination means 34 goes to S304 since the set $O_{K1}$ is not the empty set in S303. The sub-cluster determination means 34 determines in S304 whether Expression (12) or (13) is established for the tuber (j1) to which the node j1 belongs. When the expression is established, the sub-cluster determination means 34 adds the tuber label (K1) of the node K1 as the tuber label of the node j1. Further, the sub-cluster determination means 34 determines in S304 whether Expression (12) or (13) is established for the tuber (j2) to which the node j2 belongs. When the expression is established, the sub-cluster determination means 34 adds the tuber label (K1) of the node K1 as the tuber label of the node j2. Further, the sub-cluster determination means 34 determines in S304 whether Expression (12) or (13) is established for the tuber (j3) to which the node j3 belongs. When the expression is established, the sub-cluster determination means 34 adds the tuber label (K1) of the node K1 as the tuber label of the node j3. The state of each tuber based on the tuber label as a result of the processing is shown in FIG. 24(B).

Next, the sub-cluster determination means 34 sets the set $O_{K1}$ to the empty set in S305, and then goes to Step 301. The sub-cluster determination means 34 determines in S301 whether the tuber (K1) and the tuber (j4) have an overlapping region, . . . , whether the tuber (K1) and the tuber (j8) have an overlapping region. When all these tubers (j4) to (j8) have an overlapping region with the tuber (K1) in S302, the sub-cluster determination means 34 adds the nodes j4 to j8 of the tubers (j4) to (j8) to the set $O_{K1}$. As a result, the set $O_{K1}$ includes the nodes j4 to j8. The sub-cluster determination means 34 determines in S304 after S303 whether Expression (13) or (13) is established for the tubers (j4) to (j8) to which the nodes j4 to j8 belong, respectively. When the expression is established, the sub-cluster determination means 34 adds the tuber label (K1) of the node K1 as the tuber label of the nodes j4 to j8. The state of each tuber based on the tuber label as a result of the processing is shown in FIG. 24(C). In this way, the sub-cluster determination means 34 iterates the integration of other tubers based on the tuber to which the apex which is the seed of the Voronoi region belongs in each Voronoi region.

The sub-cluster determination processing should be started from the tuber having a high node density to a tuber having a low node density. Therefore, the object of Expression (10) is to search the boarder β of the node density and then determine how high the density of the boarder β is. The tuber having a node density higher than that of the boarder β is prone to become the center of the corresponding sub-cluster. Therefore, the node of this kind of tuber is added to the node set K of the apices. In this embodiment, only the node that has the locally maximum node density among the nodes included in the tuber is added to the node set K, whereby the memory is saved. Further, all the other tubers having a node density lower than that of the boarder β become the elements of the corresponding Voronoi region in the node set K.

The sub-cluster determination processing is then started from the element in the node set K (node $K_i$). In addition, the sub-cluster determination processing is performed only between the tubers in one Voronoi region. Since the tubers that might belong to the sub-clusters different from each other should not be integrated with each other, it is quite important to perform the sub-cluster determination processing only on the tubers in the same Voronoi region. In order to achieve this object, in this embodiment, processing shown in S301 to S305 is executed.

The sub-cluster determination processing shown in S301 to S305 starts from the tuber at the center of each Voronoi region. The sub-cluster determination processing shown in S301 to S305 are iterate processing, and the tuber at the center of the Voronoi region integrates the tuber having an overlapping region when there is an overlapping region between the tubers and the above predetermined condition regarding the node density is satisfied. In each iterate processing, some tubers that had not have an overlapping region first may have an overlapping region at the last iterate processing. The processing shown in S301 to S305 is processing that is quite similar to the processing for descending a mountain in directions different from each other.

FIG. 5 conceptually shows a distribution having a variation generated by E-SOINN and a distribution generated by the information processing apparatus 1 in which the sub-clusters are integrated with each other. According to the processing of S201 to S205 and S301 to S305 in this embodiment, it is clearly possible to prevent the disturbance when the mixed class is separated into different sub-clusters. In other words, it can be said that the information processing apparatus 1 is more stable than E-SOINN.

<3: New Framework of Combination of Distance Measures>

E-SOINN searches a nearest-neighbor node (node located in the closest distance) using the Euclidean distance. However, when the input data is high dimensional, the distance seems to be concentrated and all the distances between data elements seem to be quite similar when the Euclidean distance is used (see Non-Patent Literature: Verleysen, M., Francois, D., "The Concentration of Fractional Distances", IEEE Trans. on Knowledge and Data Engineering 19(7), 873-886 (2007)). This phenomenon is called the "curse of dimensionality". Various methods have been proposed to overcome the curse of dimensionality.

For example, in order to solve the similarity search problem by using a higher-order approximation, a Locality Sensitive Hashing (LSH) method has been widely used (see Non-Patent Literature: Aristides Gionis, Piotr Indyk, Rajeev Motwani, "Similarity Search in High Dimensions via Hashing", Proceedings of the 25th International Conference on Very Large Data Bases, p. 518-529, Sep. 7-10, 1999, and Non-Patent Literature: M. Datar, N. Immorlica, P. Indyk, and V. S. Mirrokni, "Locality-sensitive hashing scheme based on p-stable distributions", in Proc. Symposium on Computational Geometry, 2004, pp. 253-262). However, there is a large limitation in the LSH that it consumes a large amount of memory (see Non-Patent Literature: Xiaoguang Gu, Yongdong Zhang, Lei Zhang, Dongming Zhang and Jintao Li, "An improved method of locality sensitive hashing for indexing large-scale and high-dimensional features," in Press, Signal Processing, 2012.), and the LSH cannot be used for the online additional learning tasks. Further, a content-based similar search method includes a method in which a related feedback algorithm is given and the optimal norm is selected. However, this method cannot be used for the online additional learning tasks (see Non-Patent Literature: Verleysen, M., Francois, D., "The Concentration of Fractional Distances", IEEE Trans. on Knowledge and Data Engineering 19(7), 873-886 (2007)).

When the dimension of the input data is low, the distance based on the Euclidean distance is effective. Some distance measures (e.g., cosine distance, Manhattan distance, fractional distance) have been proposed as the distance measures that are effective when the input data is high dimensional. However, in the online additional learning environment, it is impossible to obtain the sample data in advance. In other words, it is impossible to analyze the number of dimensions of the input vector in advance and determine which distance measure is effective. Therefore, in this embodiment, a framework of the combination of the distance measures is proposed and the Euclidean distance and another distance measure that is effective in the high-dimensional space are integrated with each other. It is therefore possible to overcome the "curse of dimensionality". The framework of the combination of the distance measures is suitable for the online self-propagating additional learning tasks.

The distance calculation expression which is a framework of the combination of the distance measures according to this embodiment is shown, for example, in the following Expression (14). D(p,q) indicates the distance between the node p and the node q. The symbol d indicates the number of dimensions of the input vector and n indicates the number of distance measures. The symbol 11 is a parameter that has been determined and set in advance as appropriate by a user. The symbol 11 may be a value that has been determined in advance as appropriate through an experiment and has been set by the user. Alternatively, a function that uses the number of dimensions of the input vector as a variable may be set in the information processing apparatus 1 and the information processing apparatus 1 may calculate and set an appropriate value according to the number of dimensions of the input data using this function.

The distance calculation expression shown in Expression (14) includes a first term part and a second term part. The first term part is one example of the first distance calculation expression that calculates the distance between the nodes based on the Euclidean distance. The second term part is one example of a plurality of distance calculation expressions that calculate the distance between the nodes based on the distance measure different from the Euclidean distance. Each of the first term part and the second term part is weighted, and these weights are set according to the parameters η and d. As will be described below, the weight of the first distance calculation expression is set to decrease as the number of dimensions d of the input vector increases.

The symbol $EU_{pq}$ indicates the distance between the node p and the node q based on the Euclidean distance and is calculated by Expression (15). The symbols $EU_{min}$ and $EU_{max}$ respectively indicate the minimum Euclidean distance and the maximum Euclidean distance between arbitrary two nodes in the network. The value of $EU_{max}$ is kept to increase without decrease, which means that the value of $EU_{max}$ is the maximum Euclidean distance that has ever appeared in the learning process. As long as the learning phase continues, the value of $EU_{min}$ is kept to decrease without increase, which means that the value of $EU_{min}$ is the minimum Euclidean distance that has ever appeared in the learning process.

The symbols $D_i^{pq}$, $D_i^{min}$, and $D_i^{max}$ relate to the i-th distance measure. The symbol $D_i^{pq}$ indicates the distance between the node p and the node q based on the i-th distance measure. The symbols $D_i^{min}$ and $D_i^{max}$ respectively indicate the minimum distance value and the maximum distance value based on the i-th distance measure between arbitrary two nodes in the network. That is, the symbols $D_i^{pq}$, $D_i^{min}$, and $D_i^{max}$ respectively have the same meanings as those of $EU_{pq}$, $EU_{min}$, and $EU_{max}$.

Each distance between each distance measure has scales different from each other. Therefore, in order to integrate the distance calculation expression based on each distance measure into one distance calculation expression, the distance between the two nodes is normalized as shown in Expression (14) using the minimum distance value and the maximum distance value between the two nodes based on each distance measure.

Further, in Expression (14), as the number of dimensions of the input vector increases, a proportion of the value by the distance calculation expression based on the Euclidean distance to the value of the inter-node distance calculation expression shown in Expression (14) decreases and in accordance therewith the proportion of the value by the distance calculation expression based on another distance measure increases.

Therefore, according to the framework shown by the inter-node distance calculation expression, it is possible to obtain the advantage of the Euclidean distance in the low-dimensional space and to further apply the information processing apparatus 1 to the learning tasks in the high-dimensional space. Further, since this framework does not require a previous analysis of the input vector, it is suitable for the online additional self-propagating learning tasks or the real-world learning tasks using a sample of limited input vectors.

[Expression 14]

$$D(p, q) = \frac{1}{\eta^d} \frac{EU_{pq} - EU_{min}}{1 + EU_{max} - EU_{min}} + \sum_{i=1}^{n} \frac{1}{n}\left(1 - \frac{1}{\eta^d}\right) \frac{D_i^{pq} - D_i^{min}}{1 + D_i^{max} - D_i^{min}} \quad (14)$$

[Expression 15]

$$EU_{pq} = \| W_p - W_q \| \quad (15)$$

As will be described later, in the experiments for the information processing apparatus 1 according to this embodiment, a cosine distance is employed as one example of other distance measures and the cosine distance is integrated into the Euclidean distance. The definition of the cosine distance will be shown in the following Expression. The symbol θ denotes the angle between the weight vector $W_p$ and the weight vector $W_q$.

[Expression 16]

$$CO_{pq} = 1 - \cos\theta = 1 - \frac{W_p \cdot W_q}{\| W_p \| \, \| W_q \|} \quad (16)$$

In this embodiment, the combination of the distance measures shown in Expression (14) is re-defined as follows using Expression (16). The information processing apparatus 1 calculates the distance between the node p and the node q using, for example, a new distance measure shown in Expression (17) and stores the results in the temporary storage unit.

[Expression 17]

$$D(p, q) = \frac{1}{\eta^d} \frac{EU_{pq} - EU_{min}}{1 + EU_{max} - EU_{min}} + \left(1 - \frac{1}{\eta^d}\right) \frac{CO_{pq} - CO_{min}}{1 + CO_{max} - CO_{min}} \quad (17)$$

<4: Definition of Similarity Threshold>

When there is an adjacent node of the node to be noted for the nodes and the similarity threshold of the node stored in the temporary storage unit, the inter-class node insertion determination means 25 calculates the distance to a node among the adjacent nodes in which the distance from the node to be noted is maximum as a similarity threshold and stores the results in the temporary storage unit. On the other hand, when there is no adjacent node, the inter-class node insertion determination means 25 calculates the distance to a node in which the distance from the node to be noted is the smallest as a similarity threshold and stores the results in the temporary storage unit. Specifically, the inter-class node insertion determination means 25 calculates the similarity threshold of the node to be noted as follows, for example, and stores the results in the temporary storage unit. The inter-class node insertion determination means 25 sets a similarity threshold $T_i$ of the node i that has been inserted into the network for the first time and stored in the temporary storage unit to be a sufficiently large value that is determined in advance and stores the results in the temporary storage unit.

The inter-class node insertion determination means 25 determines, for the nodes stored in the temporary storage unit, whether the node i has an adjacent node when the node i becomes the first winner node or the second winner node and stores the results in the temporary storage unit.

When the result of the determination stored in the temporary storage unit shows that the node i has an adjacent node, the inter-class node insertion determination means 25 sets, for the nodes and the similarity threshold stored in the temporary storage unit, the similarity threshold $T_i$ to be the maximum distance to the adjacent node and stores the results in the temporary storage unit. That is, the inter-class node insertion determination means 25 calculates, for the node i, the similarity threshold $T_i$ based on the following Expression (18) stored in the temporary storage unit and stores the results in the temporary storage unit. The symbol j indicates the node included in an adjacent node set $N_i$ of the node i stored in the temporary storage unit and $D(i,j)$ indicates the distance between the node i and the node j calculated using Expression (17).

[Expression 18]

$$T_i = \max_{j \in N_i} D(i, j) \quad (18)$$

When the result of the determination stored in the temporary storage unit shows that the node i does not include an adjacent node, the inter-class node insertion determination means 25 calculates the distance from the node i to each of the nodes other than the node i and sets the minimum distance among the calculated distances as the similarity threshold $T_i$. That is, the inter-class node insertion determination means 25 calculates, for the node i, the similarity threshold $T_i$ based on the following Expression (19) stored in the temporary storage unit and stores the results in the temporary storage unit.

[Expression 19]

$$T_i = \min_{j \in N_i \setminus \{i\}} D(i, j) \quad (19)$$

<5: Definition of New Node Density and Processing for Calculating New Node Density>

The node density calculation means 23 calculates the node density of the node to be noted based on the average distance of the node from the adjacent node. The vector $\vec{d_i}$ of the average distance of the node i from the adjacent node j can be calculated, for example, as shown in Expression (20) below. The variable $\vec{d_i}$ indicates that the symbol "→(right arrow)" is attached to the top of the variable $d_i$. Further, in the following description, the symbol "→(right arrow)" indicates a vector. The number of elements of the vector coincides with the number of distance measures to be used. In this embodiment, two distance measures are used, as will be described below, which means that the number of elements of the vector is two.

[Expression 20]

$$\vec{d_i} = \frac{1}{m} \Sigma_{j=1}^{m} D(i, j) \quad (20)$$

In this embodiment, as described above, a new framework of the combination of the distance measures is proposed and the distance between two nodes is normalized to use a distance measure other than the Euclidean distance in addition to the Euclidean distance. Therefore, in this embodiment, as will be described below, instead of directly employing the above Expression (20) to calculate the node density, the vector $\vec{d_i}$ of the average distance of the node i from the adjacent node j is calculated using the following Expression (23). Further, in this embodiment, since the minimum distance value and the maximum distance value ($EU_{max}$, $EU_{min}$, $D_i^{max}$, $D_i^{min}$) between the nodes used to normalize each distance measure are changed when a new input vector is input to the network, this point will also be considered.

In the information processing apparatus 1, a new framework of the distance measures is employed. Therefore, when the average distance of the new node i from the adjacent node is calculated based on Expression (20), the value of $EU_{max}$ or $D_i^{max}$ may be sufficiently large compared to $EU_{max}$ or $D_i^{max}$ used to calculate the average accumulated point value of another node that had been inserted before (it is assumed here, however, that $EU_{min}$ and $D_i^{min}$ do not change). In other words, while the average distance of the other node that had been inserted before from the adjacent node is calculated and the average distance of the new node from the adjacent node is calculated, the normalization is carried out in scales different from each other.

The information processing apparatus 1 deals with the aforementioned problem by introducing a new definition of the node density and calculation processing of the node density in this embodiment. The basic idea is to re-calculate and update, when at least one of the minimum distance value and the maximum distance value between the nodes based on each distance measure ($EU_{max}$, $EU_{min}$, $D_i^{max}$, $D_i^{min}$) is changed, the accumulated point value of the node density of all the nodes in the network. It will be described hereinafter in detail.

First, the new definition of the node density will be described. For the node i, the vector $\vec{d_i}$ of the average distance of the node i from the adjacent node j will be newly defined as shown below.

[Expression 21]

$$\vec{d_i} = \frac{1}{m} \Sigma_{j=1}^{m} \left( \frac{1}{\eta^d} \frac{EU_{ij} - EU_{min}}{1 + EU_{max} - EU_{min}}, \right.$$
$$\left. \frac{1}{n}\left(1 - \frac{1}{\eta^d}\right) \frac{D_1^{ij} - D_1^{min}}{1 + D_1^{max} - D_1^{min}}, \cdots, \frac{1}{n}\left(1 - \frac{1}{\eta^d}\right) \frac{D_n^{ij} - D_n^{min}}{1 + D_n^{max} - D_n^{min}} \right) \quad (21)$$

By modifying Expression (21), the following Expression (22) is obtained.

[Expression 22]

-continued $$\vec{d}_i = \qquad (22)$$

$$\left(\frac{1}{\eta^d}\frac{1}{m}\Sigma_{j=1}^m \frac{EU_{ij} - EU_{min}}{1 + EU_{max} - EU_{min}}, \frac{1}{n}\left(1 - \frac{1}{\eta^d}\right)\frac{1}{m}\Sigma_{j=1}^m \frac{D_1^{ij} - D_1^{min}}{1 + D_1^{max} - D_1^{min}}, \right.$$
$$\left. \cdots, \frac{1}{n}\left(1 - \frac{1}{\eta^d}\right)\frac{1}{m}\Sigma_{j=1}^m \frac{D_n^{ij} - D_n^{min}}{1 + D_n^{max} - D_n^{min}}\right)$$

Last, by simplifying Expression (22), the vector $\vec{d}_i$ of the average distance of the node i from the adjacent node j can be expressed as shown in the following Expression. The node density calculation means 23 calculates, for the nodes, the minimum distance value and the maximum distance value between the nodes based on each distance measure, and the vector of the average distance of the node from the adjacent node stored in the temporary storage unit, the vector of the average distance of the node to be noted from the adjacent node based on the distance of the node to be noted from the adjacent node based on each distance measure and the minimum distance value and the maximum distance value between the nodes based on each distance measure and stores the results in the temporary storage unit. The node density calculation means 23 calculates the vector $\vec{d}_i$ of the average distance of the node to be noted i from the adjacent node j using, for example, the following Expression (23) stored in the temporary storage unit and stores the results in the temporary storage unit.

[Expression 23]

$$\vec{d}_i = \left(\frac{1}{\eta^d}\overline{NEU_i}, \frac{1}{n}\left(1 - \frac{1}{\eta^d}\right)\overline{ND_1^i}, \cdots, \frac{1}{n}\left(1 - \frac{1}{\eta^d}\right)\overline{ND_n^i}\right) \qquad (23)$$

Each element in the vector $\vec{d}_i$ of the average distance of the node to be noted i from the adjacent node j shown in the above Expression (23) is larger than 0 and smaller than 1. Therefore, the vector $\vec{p}_i$ of the point value of the node density will be newly defined as shown in the following Expression (24). The node density calculation means 23 calculates, for the nodes, the vector of the average distance of the node from the adjacent node, and the vector of the point value of the node density stored in the temporary storage unit, the value according to the vector of the average distance of the node from the adjacent node as the vector of the point value of the node density only when the node to be noted is the first winner and stores the results in the temporary storage unit. The node density calculation means 23 executes the calculation processing shown in, for example, the following Expression (24) stored in the temporary storage unit, calculates the vector $\vec{p}_i$ of the point value of the node density, and stores the results in the temporary storage unit.

[Expression 24]

$$\vec{p}_i = \begin{cases} \vec{1} - \vec{d}_i & \text{if node } i \text{ is winner} \\ 0 & \text{if node } i \text{ is not a winner} \end{cases} \qquad (24)$$

Regarding the definition of "the vector $\vec{p}_i$ of the point value of the node density" shown in Expression (24), when the average distance of the node i from the adjacent node is large and the number of nodes in this region is small, the definition of the point value of the node density becomes different from the definition of E-SOINN. In such a case, the information processing apparatus 1 gives a small "vector $\vec{p}_i$ of the point value of the node density" is given to the node i ("small" means that the total value of the elements of the vector $\vec{p}_i$ of the point value of the node density is small). On the other hand, when the average distance of the node i from the adjacent node is small, this means that the number of nodes in this region is large and the node density in this region is high. Therefore, the information processing apparatus 1 gives a large "vector $\vec{p}_i$ of the point value of the node density" to the node i ("large" means that the total value of the elements of the vector $\vec{p}_i$ of the point value of the node density is large).

In the iteration of the process in which one input vector is input and the learning is performed once, only when the node i is the winner node as shown in Expression (24), the information processing apparatus 1 calculates only "the vector $\vec{p}_i$ of the point value of the node density" for the node i. In this iteration, "the vector $\vec{p}_i$ of the point value of the node density" of the nodes other than the winner node is not calculated and all the values are zero. In the information processing apparatus 1, the definition of the vector $\vec{p}_i$ of the point value of the node density is different from that in E-SOINN. Since Expression (24) is a linear function, when at least one value of the minimum distance value and the maximum distance value ($EU_{max}$, $EU_{min}$, $D_i^{max}$, $D_i^{min}$) between the nodes based on each distance measure has been changed, the node density can be easily re-calculated.

The node density calculation means 25 accumulates and sums up, for the nodes and the vector of the point value of the node density stored in the temporary storage unit, the vector $\vec{p}_i$ of the point value of the node density of the first winner node i regarding λ and m to calculate the vector $\vec{s}_i$ of the accumulated point value of the node density of the first winner node i and stores the results in the temporary storage unit. The node density calculation means 25 executes, for example, calculation processing shown in the following Expression (25) stored in the temporary storage unit and stores the results in the temporary storage unit. It is assumed here that the learning section until when the total number of input vectors that are successively given reaches LT is one learning section. Further, this learning section is divided into a plurality of unit learning sections every time the total number of input vectors reaches a predetermined unit number (λ). The number of learning sections is denoted by m (m=LT/λ).

[Expression 25]

$$\vec{s}_i = \Sigma_{j=1}^m (\Sigma_{k=1}^\lambda \vec{p}_i) \qquad (25)$$

The node density calculation means 25 then inputs, for the nodes and the vector of the accumulated point value of the node density stored in the temporary storage unit, the vector $\vec{s}_i$ of the accumulated point value of the node density of the node i to a predetermined function f, divides it by the unit input number N, and stores the result of the division in the temporary storage unit as the node density $h_i$ of the node i. In this embodiment, the average value $h_i$ for each unit input number N is defined as the node density of the node i. Therefore, the node density calculation means 25 executes, for example, the calculation processing shown in the following Expression (26) stored in the temporary storage unit, calculates the node density, and stores the results in the temporary storage unit. The symbol $f(\vec{X})$ is a function to calculate the total value of the elements of the vector $\vec{X}$. The unit input number N is calculated as the number of the unit learning sections when the element of the vector $s_i^{\rightarrow}$ of the accumulated point value of the node density is larger than zero among m unit learning sections. The definition of N is the same as that in E-SOINN (see Paragraph 0067 of Patent Literature 1).

[Expression 26]

$$h_i = \frac{1}{N} f(\vec{s}_i) \quad (26)$$

Next, processing for updating the node density will be described. The node density update determination means 22 checks, for the nodes and the minimum distance value and the maximum distance value between the nodes based on each distance measure stored in the temporary storage unit, whether at least one value of the minimum distance value and the maximum distance value between the nodes based on each distance measure ($EU_{max}$, $EU_{min}$, $D_i^{max}$, $D_i^{min}$) has been changed. When at least one value has been changed, the node density update determination means 22 determines that the node density should be updated and stores the results in the temporary storage unit.

When the result of the determination stored in the temporary storage unit shows that the node density should be updated, the node density calculation means 25 re-calculates and updates, for the nodes, the vector of the accumulated point value of the node density, the learning time of the nodes, and the minimum distance value and the maximum distance value between the nodes based on each distance measure stored in the temporary storage unit, the vector $s_i^{\rightarrow}$ of the accumulated point value of the node density of the node i as shown below for all the nodes in the network based on the vector of the accumulated point value of the node density, the learning time of the nodes, and the minimum distance value and the maximum distance value between the nodes based on each distance measure, re-calculates the node density $h_i$ of the node i using the vector $s_i^{\rightarrow}$ of the accumulated point value of the node density of the node i that has been updated, and stores the results in the temporary storage unit. The node density calculation means 25 calculates the vector $s_i^{\rightarrow}$ of the accumulated point value of the node density of the node i in the network by executing, for example, the calculation processing shown in the following Expressions (27) to (30) stored in the temporary storage unit, assigns the vector $s_i^{\rightarrow}$ of the accumulated point value of the node density of the node i that has been calculated into Expression (26) to re-calculate the node density $h_i$ of the node i, and stores the results in the temporary storage unit. In this way, the node density calculation means 25 re-calculates and updates the node density $h_i$ of the node i and the vector $s_i^{\rightarrow}$ of the accumulated point value of the node density of the node i.

[Expression 27]

$$\vec{s}_i = \vec{k} \cdot (\vec{s}_i - \vec{M}_i) - M_i \vec{b} + \vec{M}_i \quad (27)$$

In Expression (27), $M_i$ denotes the learning time of the node i. The vector $M_i^{\rightarrow}$ of the learning time of the node i is expressed as the following Expression (28).

[Expression 28]

$$\vec{M} = (M_I, M_I, \ldots, M_I) \quad (28)$$

The node density calculation means 25 calculates the vectors $k^{\rightarrow}$ and $b^{\rightarrow}$ in Expression (27) by executing, for example, the calculation processing shown in the following Expressions (29) and (30) stored in the temporary storage unit and stores the results in the temporary storage unit. The symbols $EU'_{max}$, $EU'_{max}(D_i^{min})'$, and $(D_i^{min})'$ are new values after the changes of the minimum distance value and the maximum distance value between the nodes based on each distance measure. Meanwhile, the symbols $EU_{max}$, $EU_{min}$, $D_i^{max}$, and $D_i^{min}$ are values before the change. The values before the changes are values before the changes of the values of $EU_{max}$, $EU_{min}$, $D_i^{max}$, and $D_i^{min}$ as a result of the change in the distance between nodes in the network during the learning processing, and are described directly using $EU_{max}$, $EU_{min}$, $D_i^{max}$, and $D_i^{min}$. On the other hand, the new values after the changes mean the values after the changes when the values of $EU'_{max}$, $EU'_{min}$, $(D_i^{max})'$, and $(D_i^{min})'$ have been changed. The new values after the changes are expressed using $EU'_{max}$, $EU'_{min}$, $(D_i^{max})'$, and $(D_i^{min})'$ in order to differentiate them from the previous values.

[Expression 29]

$$\vec{k} = \left( \frac{1 + EU_{max} - EU_{min}}{1 + EU'_{max} - EU'_{min}}, \frac{1 + D_1^{max} - D_1^{min}}{1 + (D_1^{max})' - (D_1^{min})'}, \ldots, \frac{1 + D_n^{max} - D_1^{min}}{1 + (D_n^{max})' - (D_n^{min})'} \right) \quad (29)$$

[Expression 30]

$$\vec{b} = \left( \frac{1}{\eta^d} \frac{EU_{min} - EU'_{min}}{1 + EU'_{max} - EU'_{min}}, \frac{1}{n}\left(1 - \frac{1}{\eta^d}\right) \frac{D_1^{min} - (D_1^{min})'}{1 + (D_1^{max})' - (D_1^{min})'}, \ldots, \frac{1}{n}\left(1 - \frac{1}{\eta^d}\right) \frac{D_n^{min} - (D_n^{min})'}{1 + (D_n^{max})' - (D_n^{min})'} \right) \quad (30)$$

<6: Edge Connection Determination Processing and Edge Connection Processing (Winner Node Connection Processing)>

In E-SOINN, a parameter a is used in edge connection determination processing and edge connection processing between winner nodes (these processing correspond to the processing of S606 and S607 in FIG. 5 of Patent Literature 1, and in particular, processing in Paragraphs 0072 to 0079 of the specification). This parameter a is defined using a predetermined threshold function (see Paragraph 0078 of Patent Literature 1). This predetermined threshold function requires several integers such as 2.0, 3.0, 0.0, 0.5, and 1.0 and these integer values need to be adjusted in order to obtain good learning results in the actual application processing. It is not easy for a user, however, to perform such an adjustment task. In the information processing apparatus 1, a soft function as shown below is proposed and the predetermined threshold function, which is a piecewise function, is replaced by the soft function.

The edge connection determination means 27 determines, according to the determination result by the inter-class node insertion determination means 25 stored in the temporary storage unit, for the nodes, the sub-cluster labels of the nodes, and the node density stored in the temporary storage unit, whether to connect the edge between the first winner node and the second winner node based on the sub-cluster label to which the first winner node and the second winner node belong and the condition of the node density for the first winner node and the second winner node and stores the results in the temporary storage unit.

The edge connection means 28 performs processing for generating and deleting the edge between the first winner node and the second winner node according to the determination result stored in the temporary storage unit and stores the results in the temporary storage unit.

The edge connection determination means 27 determines whether to connect the edge as shown below, for example, and stores the results in the temporary storage unit. The edge connection means 28 performs processing for generating and deleting the edge as shown below, for example, and stores the results in the temporary storage unit.

<Edge Connection Determination Processing and Winner Node Connection Processing: S401 to S405>

S401: The edge connection determination means 27 determines, for the nodes and the sub-cluster label (tuber label) of the node stored in the temporary storage unit, each sub-cluster to which the first winner node and the second winner node belong based on the sub-cluster label (tuber label) of the node and stores the results in the temporary storage unit.

S402: When the result of the determination stored in the temporary storage unit shows that at least one of the first winner node and the second winner node does not belong to any sub-cluster or the first winner node and the second winner node belong to one sub-cluster, the edge connection means 28 connects, for the nodes and the edges between the nodes stored in the temporary storage unit, the nodes by generating edges between the first winner node and the second winner node and stores the results in the temporary storage unit.

S403: When the result of the determination in S401 stored in the temporary storage unit shows that the first winner node and the second winner node belong to sub-clusters different from each other (e.g., when the first winner node belongs to the sub-cluster A and the second winner node belongs to the sub-cluster B), the edge connection determination means 27 determines, for the nodes and the node density stored in the temporary storage unit, regarding the node densities of the first winner node and the second winner node, whether at least one of the condition of the node density for the first winner node based on the average node density of the sub-cluster including the first winner node and the condition of the node density for the second winner node based on an average node density of the sub-cluster including the second winner node is satisfied, and stores the results in the temporary storage unit.

S404: When the result of the determination in S403 stored in the temporary storage unit shows that it is required to connect the edge, the edge connection means 28 generates, for the nodes and the edges between the nodes stored in the temporary storage unit, an edge between the first winner node and the second winner node and connects the nodes. The sub-clusters A and B are thus integrated.

S405: When the result of the determination in S403 stored in the temporary storage unit shows that it is not required to connect the edge, the first winner node and the second winner node are not connected by the edge for the nodes and the edges between the nodes stored in the temporary storage unit. When the nodes have been already not connected by the edge, the edge connection means 28 deletes, for the nodes and the edges between the nodes stored in the temporary storage unit, the edge between the first winner node and the second winner node stored in the temporary storage unit and stores the results in the temporary storage unit.

The determination processing by the edge connection determination means 27 in S403 will be described in detail.

The edge connection determination means 27 determines that the edges are to be connected between the first winner node and the second winner node when, for example, at least one of the following Expression (31) and Expression (32) is satisfied. Otherwise, the edge connection determination means 27 determines that the edges are not to be connected between the first winner node and the second winner node and stores the results in the temporary storage unit.

[Expression 31]

$$\min(h_{winner}, h_{secondwinner}) > \left(\theta^{\frac{h_A}{mean_A}} - 1\right) mean_A \quad (31)$$

[Expression 32]

$$\min(h_{winner}, h_{secondwinner}) > \left(\theta^{\frac{h_B}{mean_B}} - 1\right) mean_B \quad (32)$$

In Expressions (31) and (32), $h_{winner}$ indicates the node density of the first winner node and $h_{secondwinner}$ indicates the node density of the second winner node. The symbol $\min(h_{winner}, h_{secondwinner})$ indicates the minimum node density of the node density $h_{winner}$ of the first winner node and the node density $h_{secondwinner}$ of the second winner node. The symbol $h_A$ indicates the node density of the node having the maximum node density among the nodes included in the sub-cluster A and the symbol $mean_A$ indicates the average node density of the sub-cluster A calculated from all the nodes included in the sub-cluster A. The symbol $h_B$ indicates the node density of the node having the maximum node density among the nodes included in the sub-cluster B and the symbol $mean_B$ indicates the average node density of the sub-cluster B calculated from all the nodes included in the sub-cluster B. The symbol $\theta$ is the parameter the same as that used in Expression (12).

The condition of the node density for the first winner node shown in Expression (31) is the condition to determine whether the minimum node density of the node density of the first winner node and the node density of the second winner node is larger than a threshold calculated according to a proportion of the maximum node density $h_A$ to the average node density $mean_A$ of the sub-cluster A based on the average node density $mean_A$ of the sub-cluster A including the first winner node. Further, the condition of the node density for the second winner node shown in Expression (32) is the condition to determine whether the minimum node density of the node density of the first winner node and the node density of the second winner node is larger than a threshold calculated according to a proportion of the maximum node density $h_B$ to the average node density $mean_B$ of the sub-cluster B based on the average node density $mean_B$ of the sub-cluster B including the second winner node.

<Whole Processing Flow: S501 to S519>

Figure 22:
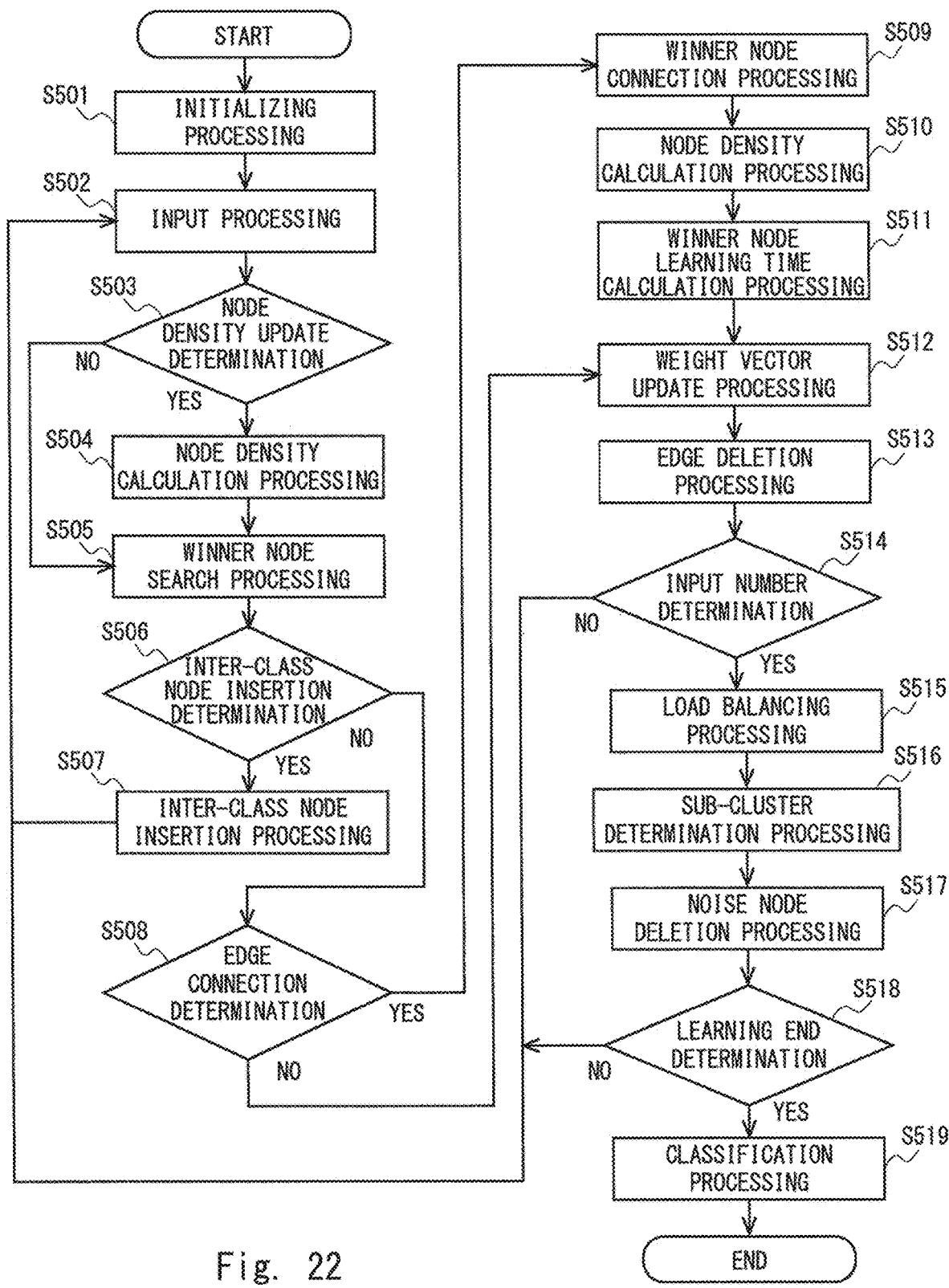
FIG. 22 is a flowchart showing the outline of learning processing by the information processing apparatus according to this embodiment.

Next, with reference to the flowchart shown in FIG. 22, the whole processing flow in the information processing apparatus according to this embodiment will be described. FIG. 22 is a flowchart showing the outline of the learning processing by the information processing apparatus according to this embodiment.

S501: The input information acquisition means 21 randomly acquires two input vectors, initializes a node set A as a set including only the two nodes corresponding thereto, and stores the results in the temporary storage unit. Further, the input information acquisition means 21 initializes an edge set C ⊂ A×A as an empty set and stores the results in the temporary storage unit.

S502: The input information acquisition means 21 receives a new input vector $\varepsilon \in R^n$ and stores the results in the temporary storage unit.

S503: The node density update determination means 22 checks, for the nodes and the minimum distance value and the maximum distance value between nodes based on each distance measure stored in the temporary storage unit, whether at least one value of the minimum distance value and the maximum distance value ($EU_{max}$, $EU_{min}$, $D_i^{max}$, $D_i^{min}$) between the nodes based on each distance measure has been changed, determines that the node density should be updated when at least one value has been changed, and stores the results in the temporary storage unit. The minimum distance value and the maximum distance value ($EU_{max}$, $EU_{min}$, $D_i^{max}$, $D_i^{min}$) between the nodes based on each distance measure are set to 0 in advance as initial values at the time of the start of the learning.

S504: When it is determined that the node density should be updated as a result of the determination stored in the temporary storage unit, the node density calculation means 23 re-calculates and updates, for the nodes, the vector of the accumulated point value of the node density, the learning time of the nodes, and the minimum distance value and the maximum distance value between the nodes based on each distance measure stored in the temporary storage unit, the vector $\vec{s_i}$ of the accumulated point value of the node density of the node i∈A included in the node set A based on the vector of the accumulated point value of the node density, the learning time of the nodes, and the minimum distance value and the maximum distance value between the nodes based on each distance measure, re-calculates the node density $h_i$ of the node i using the vector $\vec{s_i}$ of the accumulated point value of the node density of the node i that has been updated, and stores the results in the temporary storage unit. The node density calculation means 23 re-calculates and updates the node density $h_i$ of the node i and the vector $\vec{s_i}$ of the accumulated point value of the node density of the node i by executing, for example, the calculation processing shown in the above Expressions (27) to (30) and (26) stored in the temporary storage unit.

When it is determined that the node density should not be updated as a result of the determination stored in the temporary storage unit, the information processing apparatus 1 performs processing of S505 without performing the processing by the node density calculation means 23 in S504.

S505: The winner node search means 24 searches, for the nodes and the input vectors stored in the temporary storage unit, a first winner node $a_1$ that is the closest to the input vector ε and a second winner node $a_2$ that is the second closest to the input vector ε and stores the results in the temporary storage unit. The winner node search means 24 executes, as the search processing shown in $a_1 = \min_{a \in A} D(ε, a)$ and $a_2 = \min_{a \in A \setminus \{a1\}} D(ε, a)$, for example, and stores the results in the temporary storage unit. The winner node search means 24 calculates the distance $D(ε,a)$ between the input vector ε and the node a using a new distance measure shown in the above Expression (17) and stores the results in the temporary storage unit.

S506: The inter-class node insertion determination means 25 determines, for the input vectors and the nodes stored in the temporary storage unit and the similarity threshold of the node, whether the distance between the input vector ε and the first winner node $a_1$ is larger than a similarity threshold $T_{a1}$ of the first winner node $a_1$ and whether the distance between the input vector ε and the second winner node $a_2$ is larger than a similarity threshold $T_{a2}$ of the second winner node $a_2$, and stores the results in the temporary storage unit. The inter-class node insertion determination means 25 calculates the similarity threshold $T_{a1}$ of the first winner node $a_1$ or the similarity threshold $T_{a2}$ of the second winner node $a_2$ using the above Expression (18) or Expression (19), and stores the results in the temporary storage unit. Further, when the distance between the input vector ε and the first winner node $a_1$ is larger than the similarity threshold $T_{a1}$ of the first winner node $a_1$ or the distance between the input vector ε and the second winner node $a_2$ is larger than the similarity threshold $T_{a2}$ of the second winner node $a_2$, the inter-class node insertion determination means 25 determines that the inter-class node insertion should be executed. Otherwise, the inter-class node insertion determination means 25 determines that the inter-class node insertion should not be executed and stores the results in the temporary storage unit.

S507: When it is determined as the result of the determination in S506 stored in the temporary storage unit that the inter-class node insertion should be executed, the inter-class node insertion means 26 generates, for the nodes and the input vectors stored in the temporary storage unit, since the input vector ε is a new node to the network, an inter-class insertion node having a component that is the same as that of the input vector ε as a weight vector, adds the inter-class insertion node that has been generated to the node set A, and stores the results in the temporary storage unit. The information processing apparatus 1 then proceeds to S502, where the input vector is input again.

S508: On the other hand, when it is determined as the result of the determination in S506 stored in the temporary storage unit that the inter-class node insertion should not be executed, the edge connection determination means 27 determines, for the nodes and the sub-cluster labels of the nodes stored in the temporary storage unit, each sub-cluster to which the first winner node $a_1$ and the second winner node $a_2$ belong based on the sub-cluster labels of the nodes, and stores the results in the temporary storage unit. The edge connection determination means 27 carries out, for example, edge connection determination processing shown in S401 stated above.

Further, when it is determined as the result of the determination in S508 stored in the temporary storage unit that the first winner node and the second winner node belong to sub-clusters different from each other, the edge connection determination means 27 determines, for the nodes and the node density stored in the temporary storage unit, whether the node densities of the first winner node $a_1$ and the second winner node $a_2$ satisfy at least one of the condition of the node density for the first winner node based on the average node density of the sub-cluster including the first winner node $a_1$ and the condition of the node density for the second winner node based on the average node density of the sub-cluster including the second winner node $a_2$ and stores the results in the temporary storage unit. For example, the edge connection determination means 27 performs the edge connection determination processing as shown in the above S403.

S509: When it is determined as the result of the determination in S508 stored in the temporary storage unit that at least one of the first winner node and the second winner node does not belong to any sub-cluster or the first winner node and the second winner node belong to one sub-cluster, the edge connection means 28 connects, for the nodes and the edges between the nodes stored in the temporary storage unit, the edge between the first winner node $a_1$ and the second winner node $a_2$ and stores the results in the temporary storage unit. The edge connection means 28 performs, for example, winner node connection processing shown in S402 stated above. The edge connection means 28 sets, for the edges and the ages of the edges stored in the temporary storage unit, the age of the edge that has been newly generated and when an edge has already been generated between the nodes, the age of the edge to 0 and stores the results in the temporary storage unit.

Further, when at least one of the conditions of the node densities for the first winner node and the second winner node is satisfied as a result of the determination in S508 stored in the temporary storage unit, the edge connection means 28 connects, for the nodes and the edges between the nodes stored in the temporary storage unit, the edge between the first winner node $a_1$ and the second winner node $a_2$ and stores the results in the temporary storage unit. The edge connection means 28 performs, for example, winner node connection processing shown in S404 stated above.

When at least one of the conditions of the node densities for the first winner node and the second winner node is not satisfied as a result of the determination in S508 stored in the temporary storage unit, the edge connection means 28 does not connect, for the nodes and the edges between the nodes stored in the temporary storage unit, an edge between the first winner node and the second winner node (when there is an edge between the first winner node and the second winner node, this edge is deleted), and stores the results in the temporary storage unit. The edge connection means 28 performs winner node connection processing shown in the above S405, for example.

S510: The node density calculation means 23 calculates, for the nodes, the minimum distance value and the maximum distance value between the nodes based on each distance measure, the vector of the average distance of the node from the adjacent node, the vector of the point value of the node density, the vector of the accumulated point value of the node density, and the node density stored in the temporary storage unit, the vector $\vec{d_i}$ of the average distance of the node i, which is the first winner node $a_1$, from the adjacent node based on the distance of the node i from the adjacent node based on each distance measure and the minimum distance value and the maximum distance value between nodes based on each distance measure, calculates the vector $\vec{p_i}$ of the point value of the node density of the first winner node $a_1$ based on the vector $\vec{d_i}$ of the average distance from the adjacent node that has been calculated, calculates the vector $\vec{s_i}$ of the accumulated point value of the node density based on the vector $\vec{p_i}$ of the point value of the node density of the first winner node $a_1$ that has been calculated, calculates the node density $h_i$ of the first winner node $a_1$ based on the vector $\vec{s_i}$ of the accumulated point value of the node density of the first winner node $a_1$ that has been calculated, and stores the results in the temporary storage unit. The node density calculation means 23 calculates the node density $h_i$ of the node i and the vector $\vec{s_i}$ of the accumulated point value of the node density of the node i by executing, for example, the calculation processing shown in the above Expressions (24) to (26) stored in the temporary storage unit.

S511: The winner node learning time calculation means 29 increments a learning time $M_{a1}$ of the first winner node $a_1$ stored in the temporary storage unit by a predetermined value and stores the results in the temporary storage unit. The winner node learning time calculation means 29 increments the learning time $M_{a1}$ of the first winner node $a_1$ by one by executing, for example, processing of $M_{a1}(t+1)=M_{a1}(t)+1$ and stores the results in the temporary storage unit.

S512: The weight vector update means 30 updates, for the nodes and the weight vectors of the nodes stored in the temporary storage unit, the weight vector of the first winner node $a_1$ and the weight vector of the adjacent node to make them closer to the input vector ε and stores the results in the temporary storage unit. The weight vector update means 30 calculates an update amount $\Delta W_{a1}$ for a weight vector $W_{a1}$ of the first winner node $a_1$ and an update amount $\Delta W_j$ for a weight vector $W_{s1}$ of the adjacent node j of the first winner node $a_1$ using, for example, the following Expressions (33) and (34), adds the update amount $\Delta W_{a1}$ to the weight vector $W_{a1}$ of the first winner node $a_1$ and adds the update amount $\Delta W_j$ to the weight vector $W_{s1}$ of the adjacent node j, and stores the results in the temporary storage unit. In Expressions (33) and (34), $M_{s1}$ indicates the learning time of the first winner node $a_1$. The method for changing the weight vectors here is similar to that in E-SOINN (see Paragraph 0063 of Patent Literature 1).

[Expression 33]
$$\Delta W_{a_1} = \frac{1}{M_{a_1}}(\varepsilon - W_{a_1}) \qquad (33)$$

[Expression 34]
$$\Delta W_j = \frac{1}{100 M_{a_1}}(\varepsilon - W_j) \qquad (34)$$

S513: The aged edge deletion means 31 increments, for the nodes, the edges between the nodes, and the ages of the edges stored in the temporary storage unit, the ages of all the edges directly connected to the first winner node $a_1$ by a predetermined value and stores the results in the temporary storage unit. The aged edge deletion means 31 increments, for example, the ages of all the edges directly connected to the first winner node $a_1$ by 1 and stores the results in the temporary storage unit. The aged edge deletion means 31 deletes, for the edges stored in the temporary storage unit, the edges having the ages above a predetermined threshold $age_{max}$ set in advance and stored in the temporary storage unit and stores the results in the temporary storage unit. The parameter $age_{max}$ may be an appropriate value calculated in advance by an experiment and is stored in the temporary storage unit.

S514: The input number determination means 32 determines, for the total number of given input vectors ε stored in the temporary storage unit, whether the total number of input vectors ε that have been input is a multiple of a predetermined unit number (λ) set in advance and stored in the temporary storage unit and stores the results in the temporary storage unit. When the result of the determination stored in the temporary storage unit shows that the total number of input vectors is not the predetermined unit number, the processing goes back to S502, where the next input vector ε is processed. When the total number of input vectors ε is equal to the predetermined unit number, the processing of S515 and the following processing are executed. The parameter λ is an appropriate value calculated in advance by an experiment and is stored in the temporary storage unit.

The processing shown in S515 to S517 is executed every time the total number of input vectors input to the information processing apparatus 1 becomes equal to a predetermined unit number. That is, when the unit learning section until when the total number of input vectors becomes the predetermined number (λ) is assumed as one cycle, the processing shown in S515 to S517 is regularly executed at predetermined cycles according to the total number of input vectors.

S515: The load balancing means 33 detects, for the nodes, the edges between the nodes, the sub-cluster labels of the nodes, the weight vectors of the nodes, the learning time of the nodes, and the node density stored in the temporary storage unit, the node where the value of the learning time is relatively large and unbalanced based on the learning time of the nodes, inserts a new node between the node that has been detected and the adjacent node, and adds the new node to the node set A. The load balancing means 33 reduces the learning time of the node that has been detected and that of the adjacent node and stores the results in the temporary storage unit. The load balancing means 33 executes, for example, the load balancing processing between nodes shown in the above S101 to S107 and stores the results in the temporary storage unit. The load balancing means 33 thus balances the load of the nodes that is unbalanced.

S516: The sub-cluster determination means 34 searches, for the nodes, the edges between the nodes, the node density, and the sub-cluster labels of the nodes stored in the temporary storage unit, a node that has a locally maximum node density as an apex from among the nodes included in the node set A, gives sub-cluster labels (tuber labels) different from each other to the apex that has been searched, gives the sub-cluster label (tuber label) the same as the adjacent node where the node density is maximum to all the nodes to which the sub-cluster labels (tuber labels) have not been given, and stores the results in the temporary storage unit. Further, the sub-cluster determination means 34 generates, for the nodes, the edges between the nodes, and the node density stored in the temporary storage unit, the Voronoi region based on the reference apex where the node density is larger than a predetermined threshold among the apices and stores the results in the temporary storage unit. Further, the sub-cluster determination means 34 gives, for the nodes, the edges between the nodes, the node density, and the Voronoi regions stored in the temporary storage unit, when the sub-cluster including the reference apex and the sub-cluster including apices other than the reference apex have an overlapping region and the condition of the average node density of the nodes located in the overlapping region is satisfied in the Voronoi region that has been generated, the sub-cluster label of the sub-cluster including the reference apex as the sub-cluster label of the sub-cluster including other apices, and stores the results in the temporary storage unit. The sub-cluster determination means 34 executes the sub-cluster determination processing shown in the above S201 to S205 and S301 to S305 stated above, for example, and stores the results in the temporary storage unit.

S517: The noise node deletion means 35 deletes, for all the nodes a included in the node set A stored in the temporary storage unit, the node that has been regarded as the noise node and stores the results in the temporary storage unit. The noise node deletion means 35 executes, for the nodes, the edges between the nodes, the number of adjacent nodes, and the node density stored in the temporary storage unit, processing shown in S601 to S604 below, for example, deletes the node to be noted based on the number of adjacent nodes of the node a to be noted and the node density, and stores the results in the temporary storage unit.

S601: The noise node deletion means 35 calculates, for the nodes, the edges between the nodes, and the number of adjacent nodes stored in the temporary storage unit, the number of adjacent nodes of the node a to be noted and stores the results in the temporary storage unit. The noise node deletion means 35 executes one of the processing S602 to S604 according to the number of adjacent nodes stored in the temporary storage unit. The parameters $c_1$ and $c_2$ used in the following processing are appropriate values set in advance and are stored in the temporary storage unit.

S602: When the number of adjacent nodes stored in the temporary storage unit is 2, the noise node deletion means 35 determines whether Expression (35) stored in the temporary storage unit is satisfied, for example, and stores the results in the temporary storage unit. The symbol $h_a$ indicates the node density of the node a and $N_A$ indicates the number of nodes included in the node set A. When the determination result stored in the temporary storage unit satisfies Expression (35), the noise node deletion means 35 deletes the corresponding node a from among the nodes stored in the temporary storage unit and stores the results in the temporary storage unit.

[Expression 35]

$$h_a < c_1 \sum_{j=1}^{N_A} \frac{h_j}{N_A} \qquad (35)$$

S603: When the number of adjacent nodes stored in the temporary storage unit is 1, the noise node deletion means 35 determines whether the node density $h_a$ of the node a satisfies, for example, Expression (36) stored in the temporary storage unit and stores the results in the temporary storage unit. When the determination result stored in the temporary storage unit satisfies Expression (36), the noise node deletion means 35 deletes the corresponding node a from among the nodes stored in the temporary storage unit and stores the results in the temporary storage unit.

[Expression 36]

$$h_a < c_2 \sum_{j=1}^{N_A} \frac{h_j}{N_A} \qquad (36)$$

S604: When the number of adjacent nodes stored in the temporary storage unit is 0 (case in which no adjacent node is included), the noise node deletion means 35 deletes the corresponding node a from among the nodes stored in the temporary storage unit and stores the results in the temporary storage unit.

S518: The learning end determination means 36 determines whether to end the learning processing by the information processing apparatus 1. For example, the learning end determination means 36 determines, for the total number of given input vectors ε stored in the temporary storage unit, whether the total number of given input vectors ε is a multiple of the predetermined number LT set in advance and stored in the temporary storage unit and stores the results in the temporary storage unit. When the result of the determination stored in the temporary storage unit shows that the total number of input vectors is not a multiple of LT, the process goes back to S502, where the next input vector ε is processed. On the other hand, when the total number of input vectors ε is a multiple of LT, the following processing is executed. The method of the learning end determination is not limited to the above method and the user may give an instruction to end the learning.

S519: The class determination means 37 determines, for the nodes, the edges between the nodes, and the classes of the nodes stored in the temporary storage unit, the class to which each node belongs based on the edge generated between the nodes and stores the results in the temporary storage unit. The output information display means 38 outputs, for the nodes and the classes of the nodes stored in the temporary storage unit, the number of classes to which the nodes belong and the prototype vector of each class. After the above processing is completed, the learning is stopped.

The class determination means 37 executes, for the nodes, the edges between the nodes, and the classes of the nodes stored in the temporary storage unit, processing shown in the following S701 to S704, for example, to determine the class to which each node belongs and stores the results in the temporary storage unit.

S701: This processing makes, for the nodes and the classes of the nodes stored in the temporary storage unit, all the nodes not belong to any class, and stores the results in the temporary storage unit.

S702: This processing randomly selects, for the nodes and the classes of the nodes stored in the temporary storage unit, the node i from the nodes that do not belong to any class and gives a new class label to the node i, and stores the results in the temporary storage unit.

S703: This processing searches, for the nodes, the edges between the nodes, and the classes of the nodes stored in the temporary storage unit, the nodes that have been connected to the node i by a "path", gives the class label the same as the node i to the nodes that have been searched, and stores the results in the temporary storage unit.

S704: For the nodes and the classes of the nodes stored in the temporary storage unit, when there is a node that does not belong to any class, the processing goes to S702 and the processing is continued until when the class label has been given to all the nodes.

That the "arbitrary two nodes a and b are connected by the "path"" in S703 means that that two nodes are connected through some edges between the node a and the node b. That is, when there are successive edges, for the node a, the node b, and the node $x_i$ (i=1, 2, ..., n) included in the node set A, $(a,x_1)$ indicating the edge between the node a and the node $x_1$, $(x_1,x_2)$ indicating the edge between the node $x_1$ and the node $x_2$, ..., $(x_n,b)$ indicating the edge between the node $x_n$ and the node b, this situation is called that the node a and the node b are connected by the path.

<Experimental Results>

Figure 1:
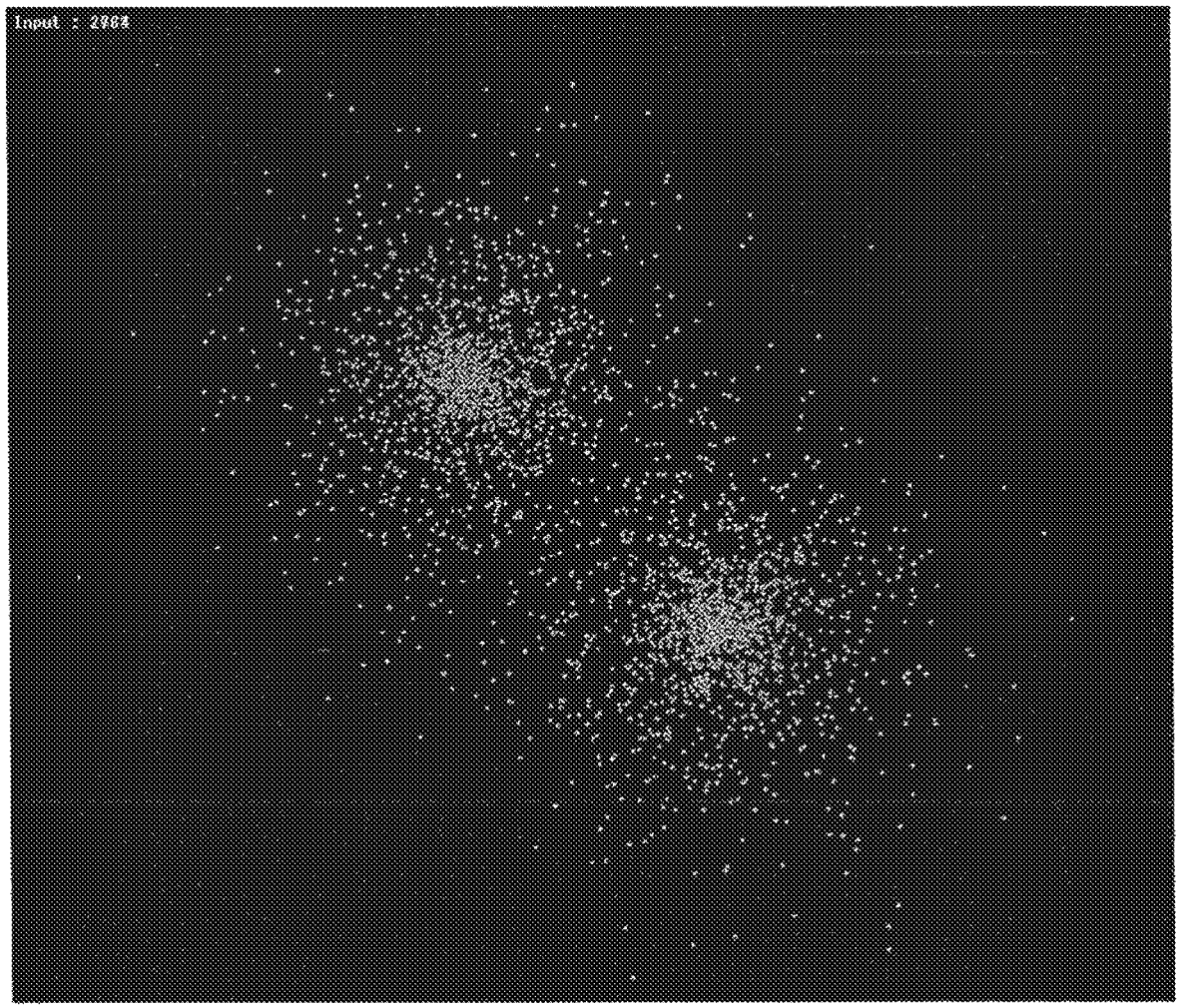
FIG. 1 is a diagram for describing a problem solved by the present disclosure.

Next, in order to confirm the effectiveness of the information processing apparatus 1 according to this embodiment, experiments are conducted using three artificial datasets and three real world datasets. In order to compare the information processing apparatus 1 (LBSOINN) with E-SOINN, the same dataset has been selected in some experiments. Further, one artificial dataset I (FIG. 1) is applied to the information processing apparatus 1 (LBSOINN) and E-SOINN to compare the learning time of the nodes, and the node density regarding the connection structure between the nodes is estimated using a kernel density estimation (KDE).

Figure 7:
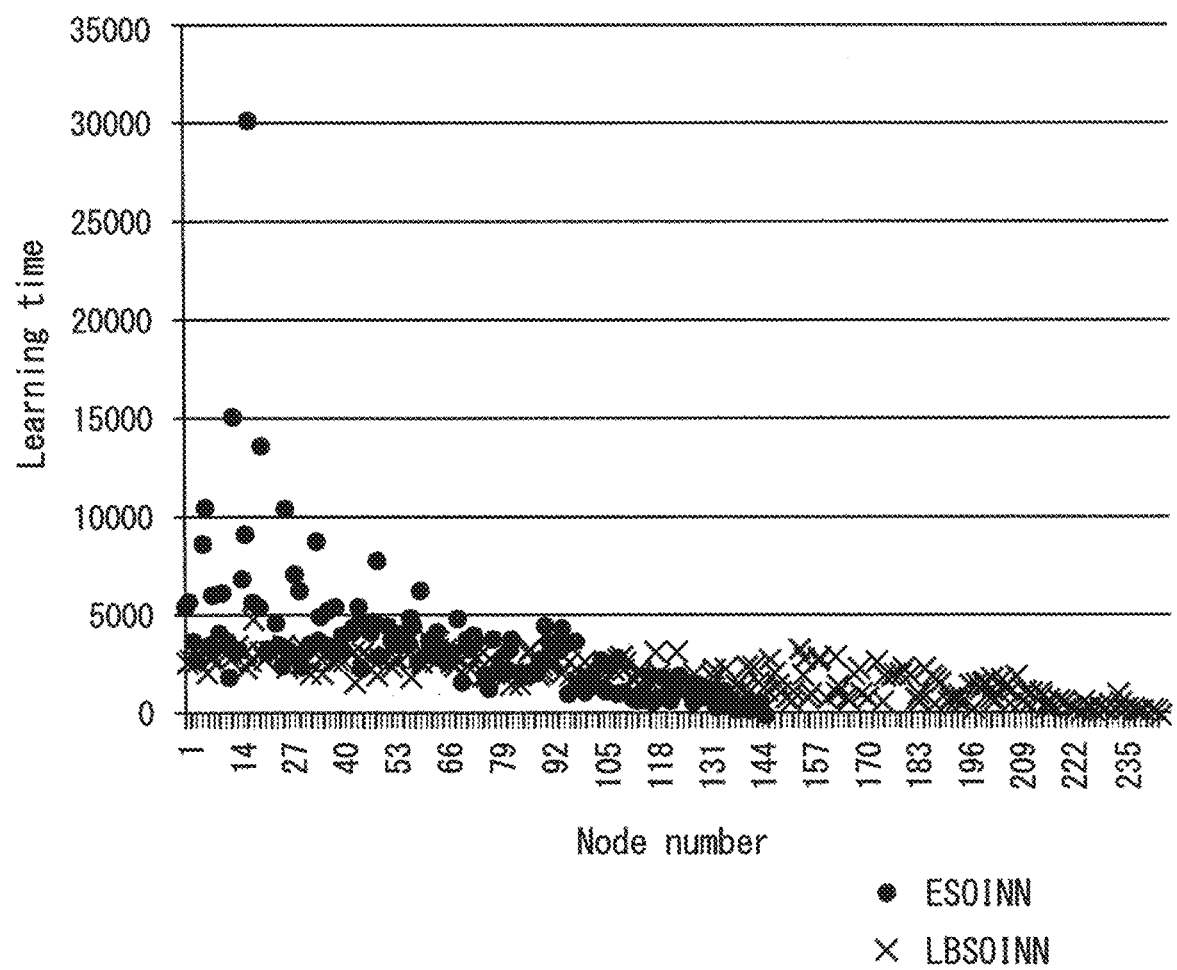
FIG. 7 is a graph showing distributions of learning time in LBSOINN and E-SOINN.

FIG. 7 shows the learning time of the nodes in E-SOINN and the information processing apparatus 1 (LBSOINN). In FIG. 7, the vertical axis indicates the learning time of the nodes and the horizontal axis indicates the number of nodes. The number of nodes by E-SOINN is not sufficient in some regions of the network and the learning time of the nodes in these regions is long and unbalanced. Meanwhile, it is shown that the distributions of the learning time of the nodes in the information processing apparatus 1 (LBSOINN) are balanced unlike the learning time of the nodes in E-SOINN.

Figure 8:
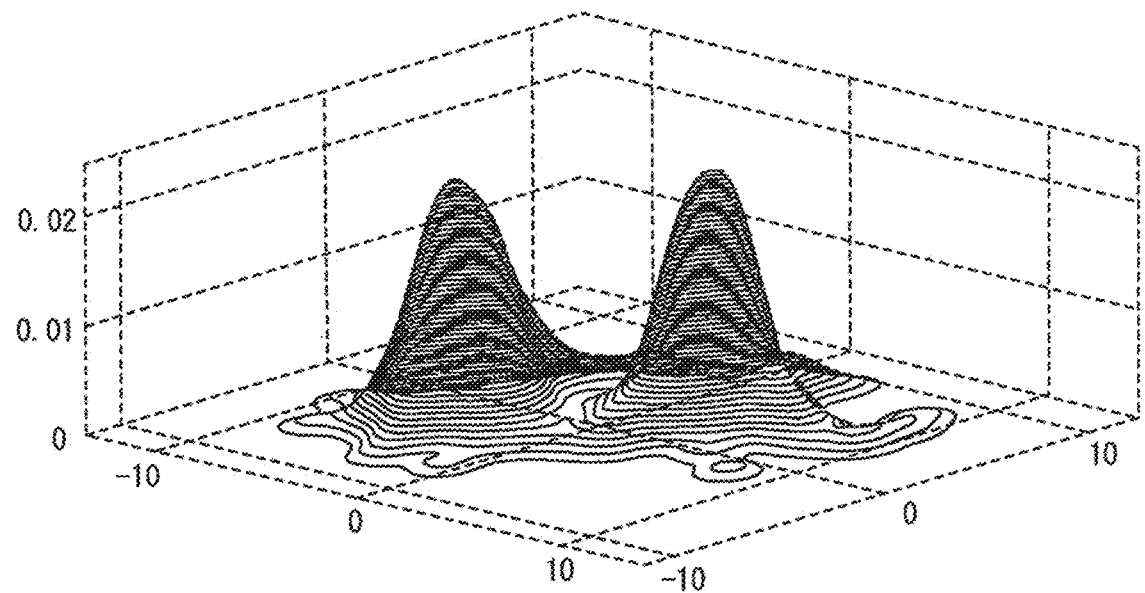
FIG. 8 is a graph showing distributions of node densities for an artificial dataset I.
Figure 9:
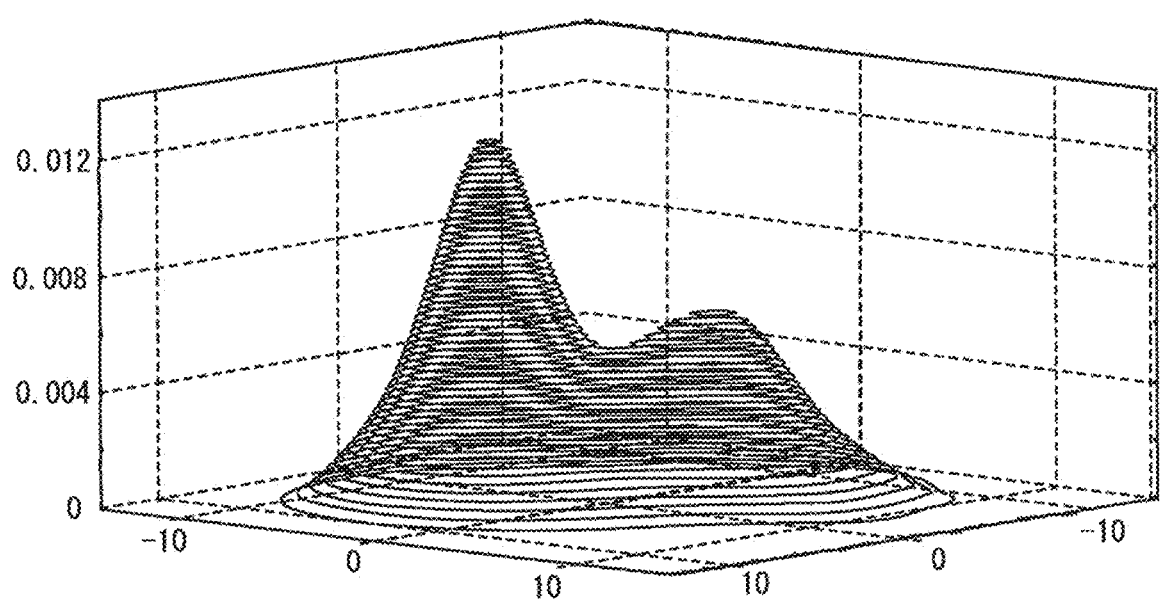
FIG. 9 is a graph showing experimental results of E-SOINN for the artificial dataset I.
Figure 10:
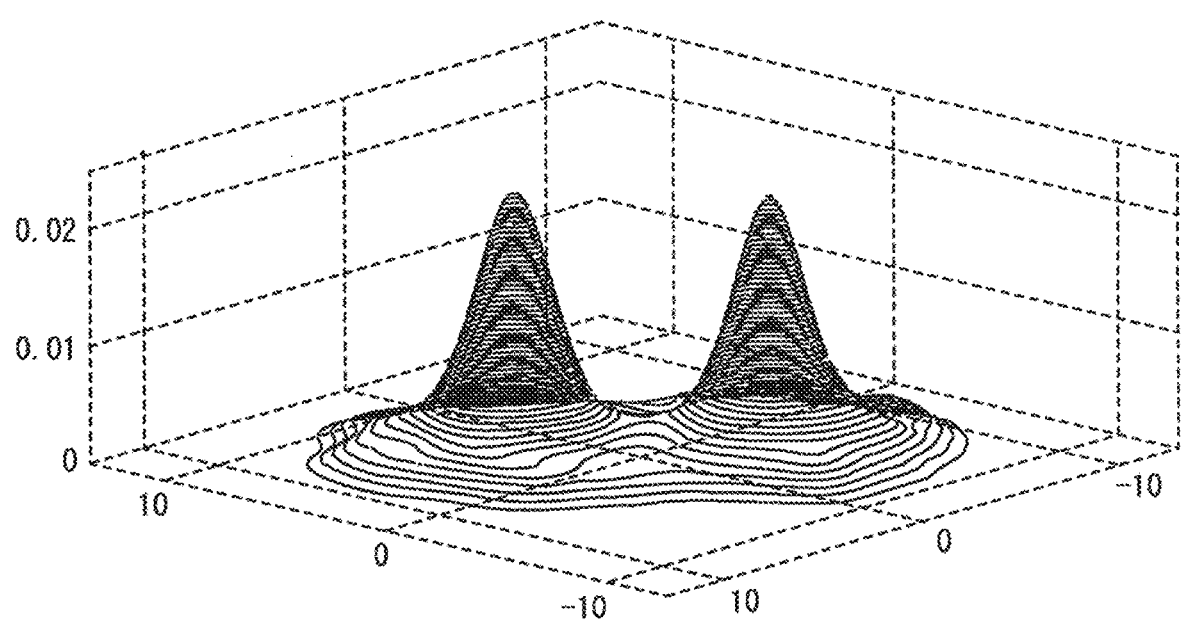
FIG. 10 is a graph showing experimental results of LBSOINN for the artificial dataset I.

FIG. 8 shows the distributions of the node densities in the artificial dataset I. FIG. 9 shows estimation results of the node densities in E-SOINN and FIG. 10 shows estimation results of the node densities in the information processing apparatus 1 (LBSOINN). In FIGS. 8, 9, and 10, the x axis and the y axis indicate the two-dimensional space in which the nodes are arranged, and the z axis indicates the node density. It is clear that E-SOINN does not obtain a sufficiently high accuracy for the input pattern. However, since the overlapping region between the classes is searched using the node density in E-SOINN, it is quite important to accurately express the connection structure of the input patterns. Meanwhile, as shown in FIG. 10, the connection structure of the input patterns can be accurately described in the information processing apparatus 1 (LBSOINN), which means that the information processing apparatus 1 (LBSOINN) has a stability higher than that of E-SOINN.

Figure 11:
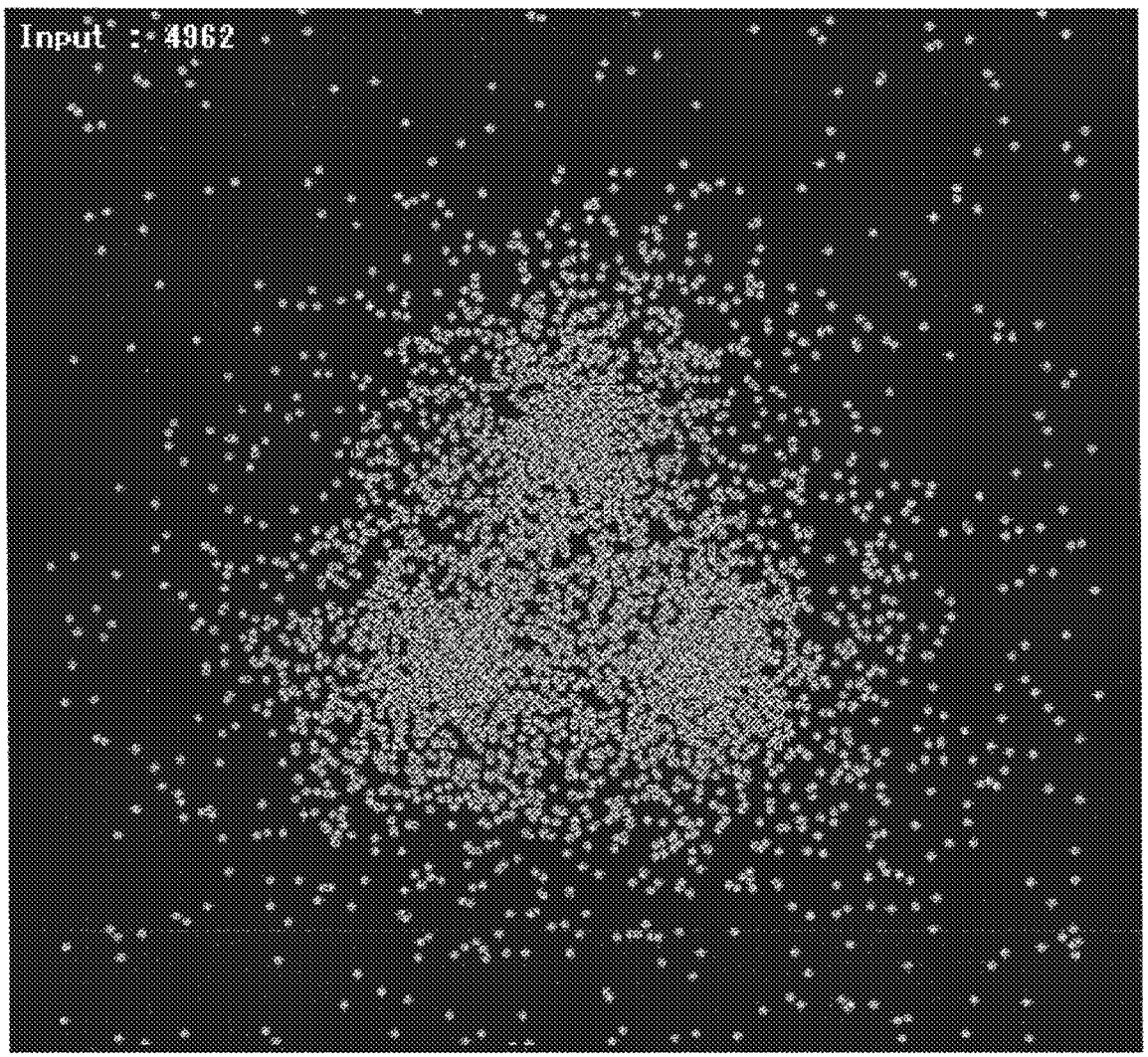
FIG. 11 is a diagram showing an artificial dataset II used for experiments according to this embodiment.
Figure 12A:
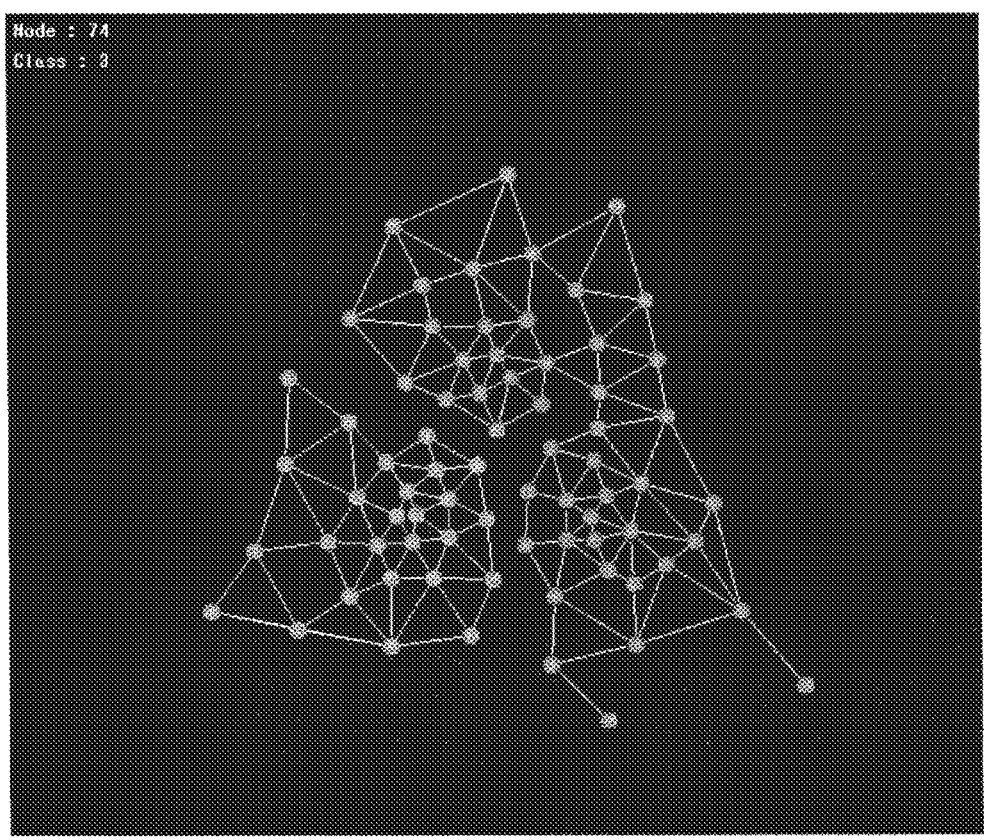
FIG. 12A is a diagram showing learning results of LBSOINN and E-SOINN for the artificial dataset II.
Figure 12B:
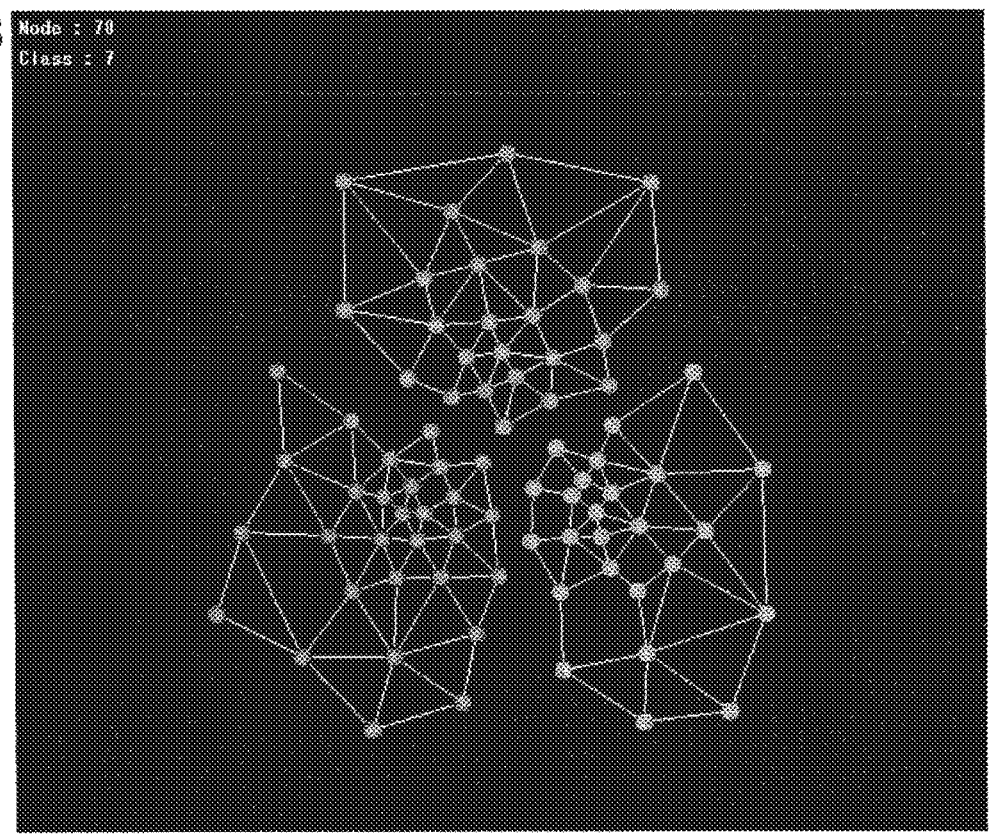
FIG. 12B is a diagram showing learning results of LBSOINN and E-SOINN for the artificial dataset II.
Figure 12C:
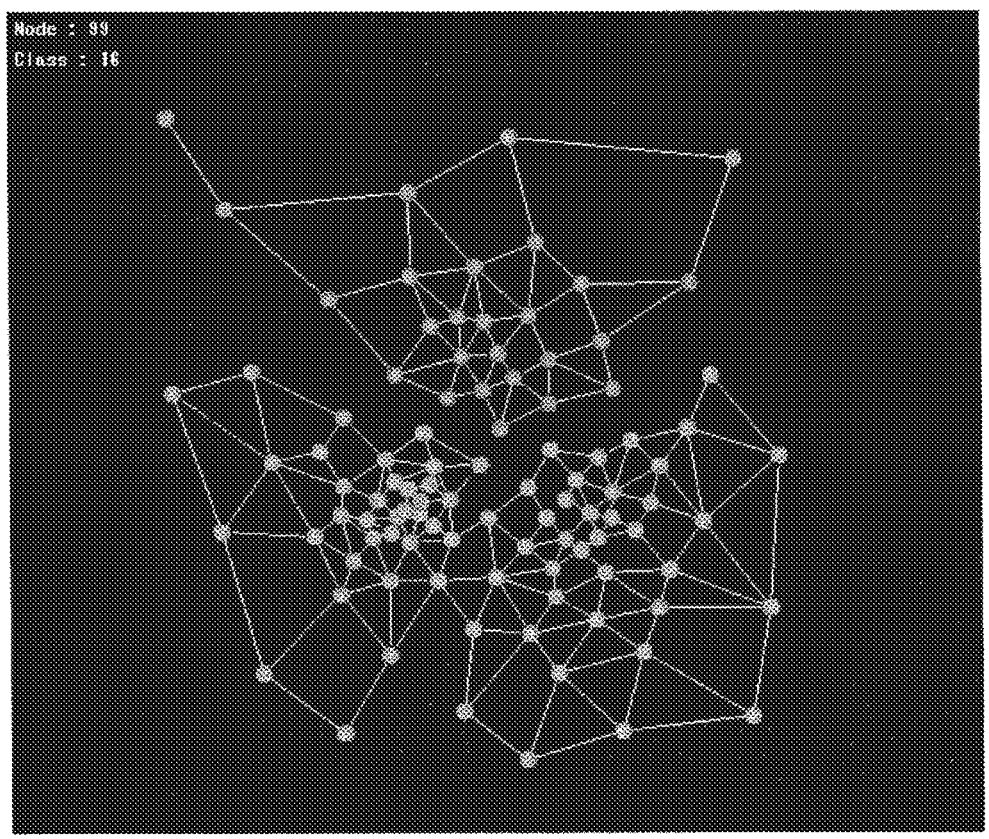
FIG. 12C is a diagram showing learning results of LBSOINN and E-SOINN for the artificial dataset II.
Figure 12D:
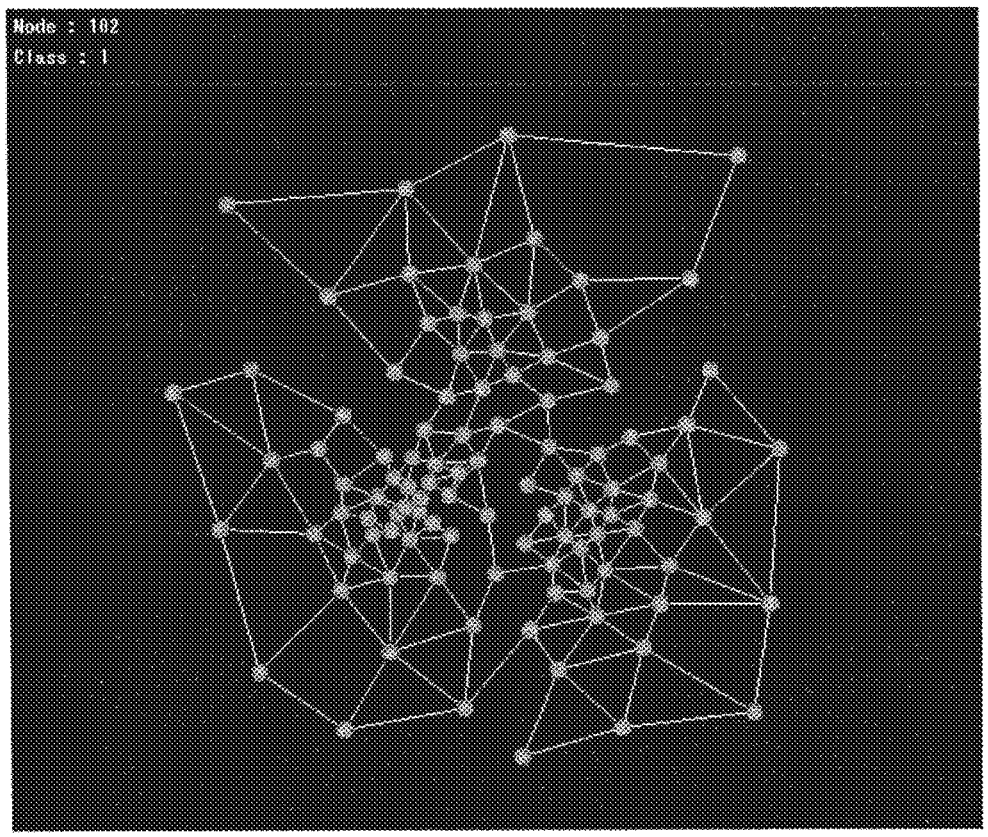
FIG. 12D is a diagram showing learning results of LBSOINN and E-SOINN for the artificial dataset II.
Figure 12E:
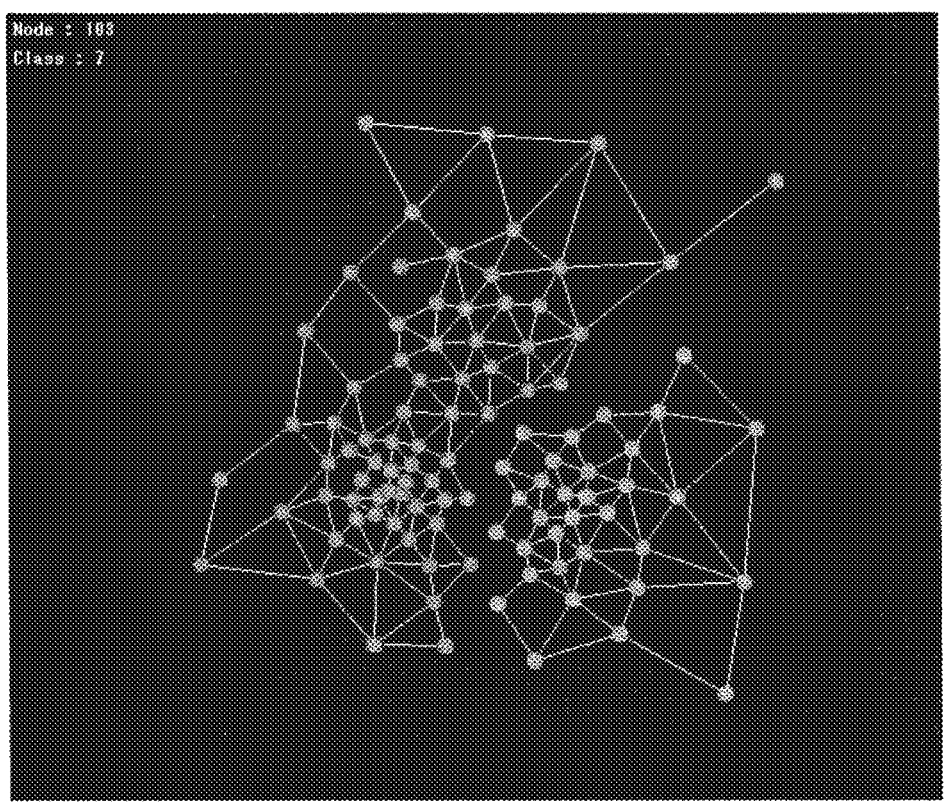
FIG. 12E is a diagram showing learning results of LBSOINN and E-SOINN for the artificial dataset II.
Figure 12F:
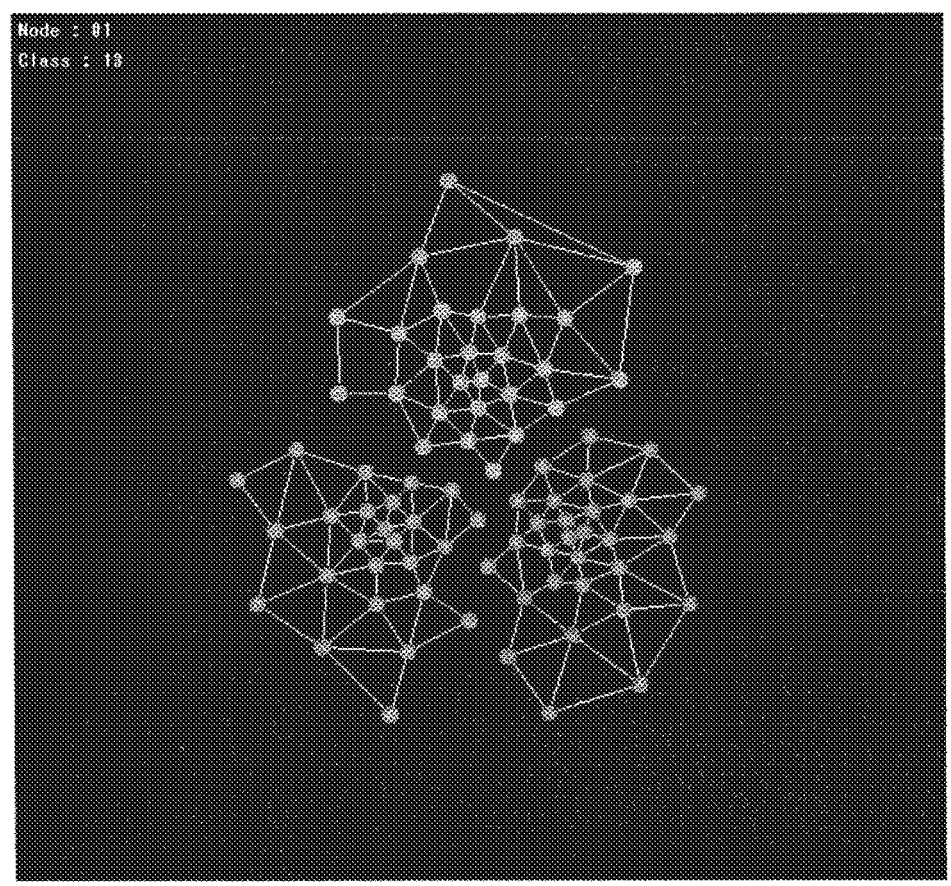
FIG. 12F is a diagram showing learning results of LBSOINN and E-SOINN for the artificial dataset II.
Figure 12G:
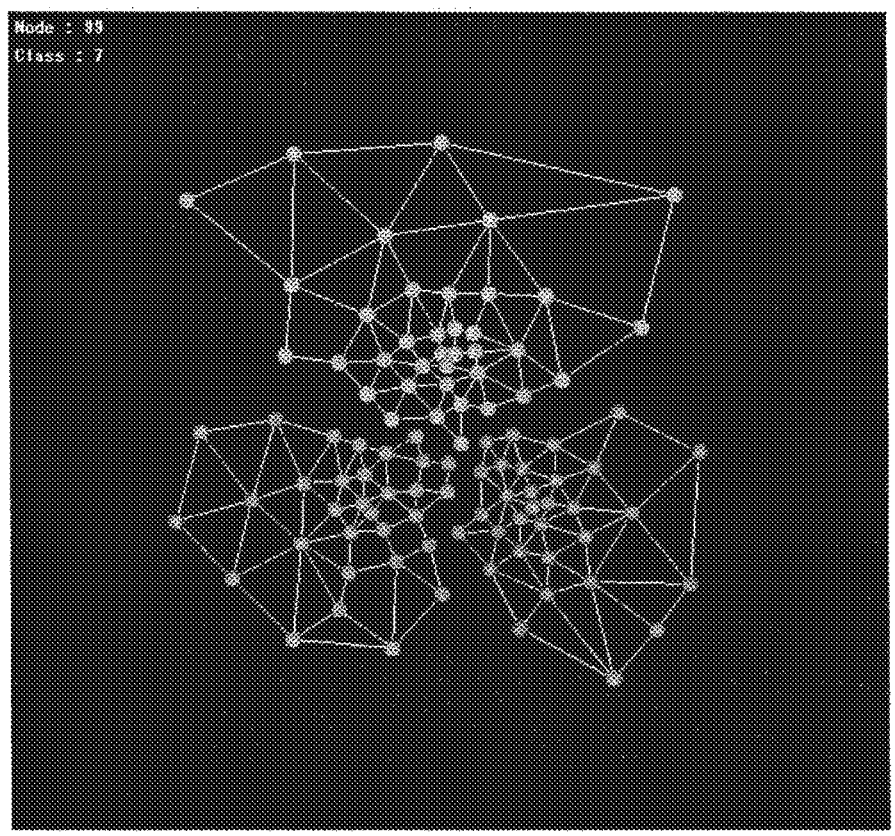
FIG. 12G is a diagram showing learning results of LBSOINN and E-SOINN for the artificial dataset II.
Figure 12H:
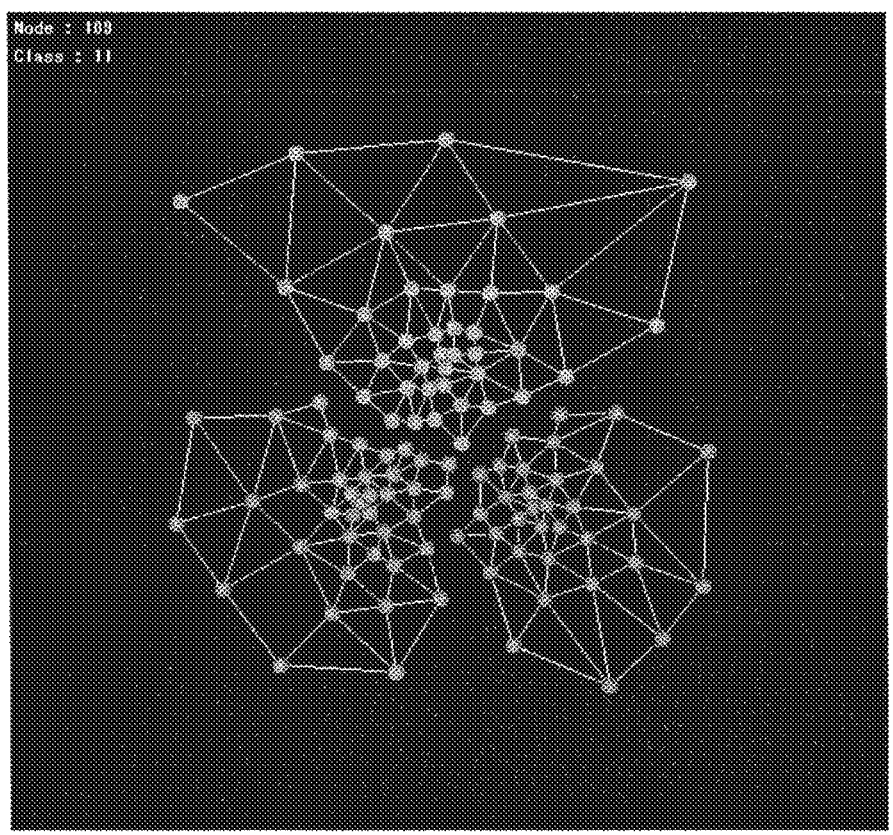
FIG. 12H is a diagram showing learning results of LBSOINN and E-SOINN for the artificial dataset II.
Figure 12I:
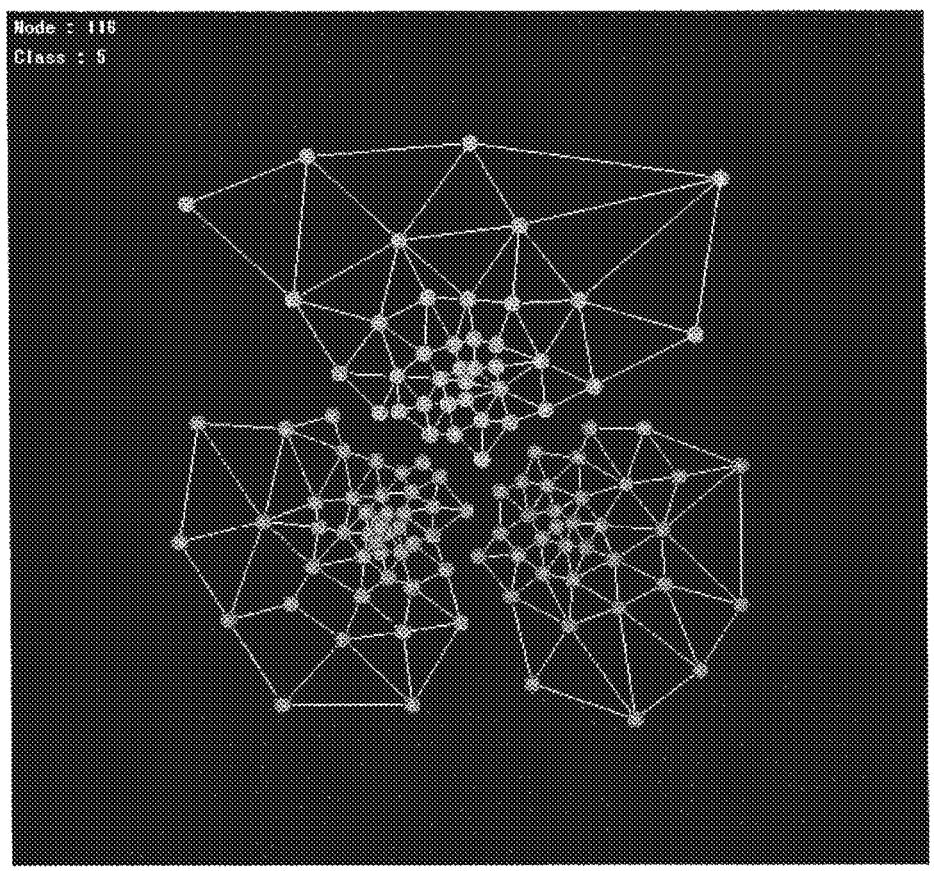
FIG. 12I is a diagram showing learning results of LBSOINN and E-SOINN for the artificial dataset II.
Figure 12J:
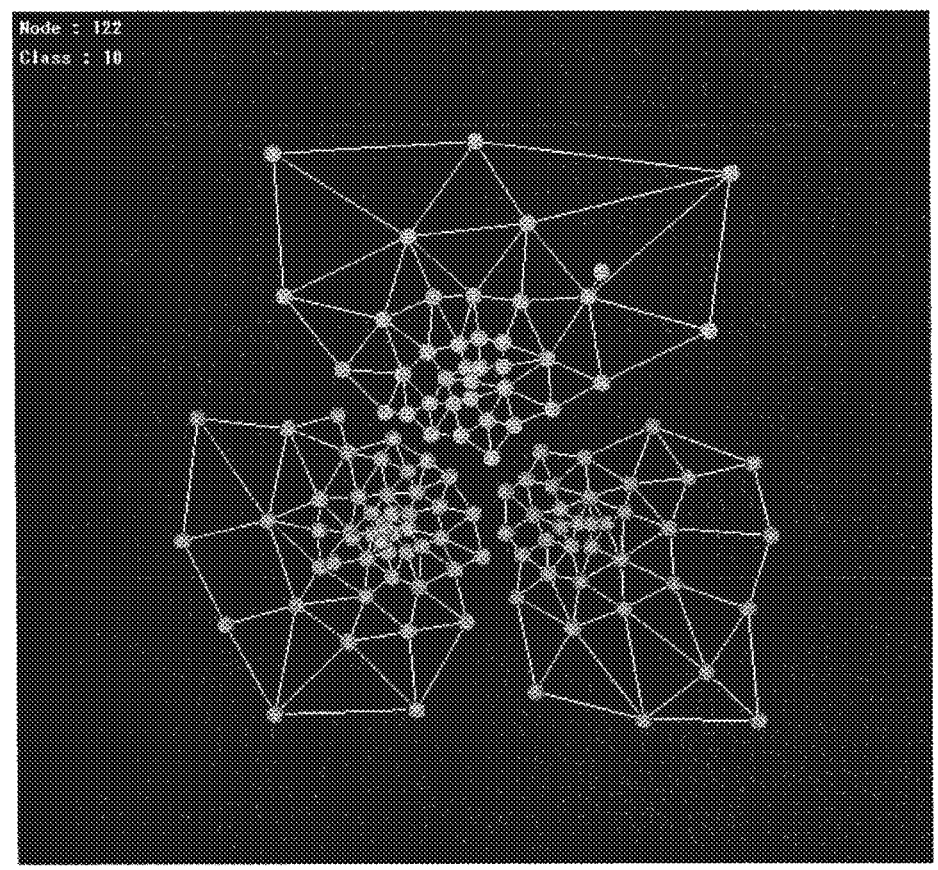
FIG. 12J is a diagram showing learning results of LBSOINN and E-SOINN for the artificial dataset II.

FIG. 11 shows an artificial dataset II. The artificial dataset II includes three Gaussian distributions having an overlapping region where the node density is high. Experiments regarding the stabilities of the information processing apparatus 1 (LBSOINN) and E-SOINN in the stationary environment are conducted using the artificial dataset II. In the experiments, an input pattern is randomly selected from the dataset and 10% noise is added to the input pattern. In E-SOINN, the parameter λ is set to 200, $age_{max}$ is set to 50, $c_1$ is set to 0.001, and $c_2$ is set to 1.0. In the information processing apparatus 1 (LBSOINN), λ, $age_{max}$, $c_1$, and $c_2$ are set to the values the same as those in E-SOINN and γ is set to 1.3, η is set to 1.001, and θ is set to 1.3.

FIGS. 12(A) to 12(J) show the learning results for the artificial dataset II when the network is learned in time series in the stationary environment. FIGS. 12(A) to (E) show the learning results of E-SOINN when the learning is iterated 100,000 times, 200,000 times, 300,000 times, 400,000 times, and 500000 times, respectively. FIGS. 12(F) to (J) show the learning results of the information processing apparatus 1 (LBSOINN) when the learning is iterated 100,000 times, 200,000 times, 300,000 times, 400,000 times, and 500,000 times, respectively. It is obvious that the connection structure of the nodes is disturbed and unstable in E-SOINN since different classes are constantly connected together.

The information processing apparatus 1 (LBSOINN) evades the occurrence of a node which becomes excessively locally maximum in the network using the above sub-cluster determination method. Therefore, the information processing apparatus 1 (LBSOINN) evades the disturbance of the connection structure of the nodes caused by the mixed class being divided into sub-clusters. The experiments for the artificial dataset II show that the information processing apparatus 1 (LBSOINN) has a greater stability than that of E-SOINN and is able to accurately separate the overlapping region where the node density is high. As will be described later, it is confirmed that the information processing apparatus 1 (LBSOINN) has a stability higher than that of E-SOINN using an AT&T image dataset, which is a real-world dataset in the non-stationary learning environment.

Figure 13:
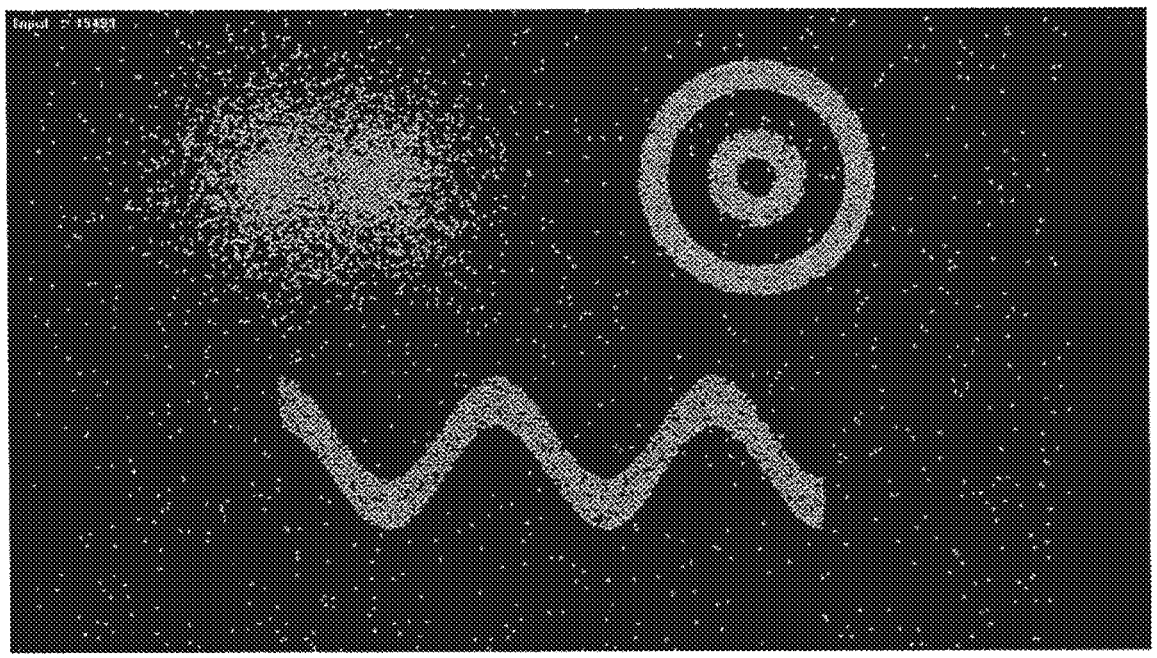
FIG. 13 is a diagram showing an artificial dataset III used for the experiments according to this embodiment.
Figure 14:
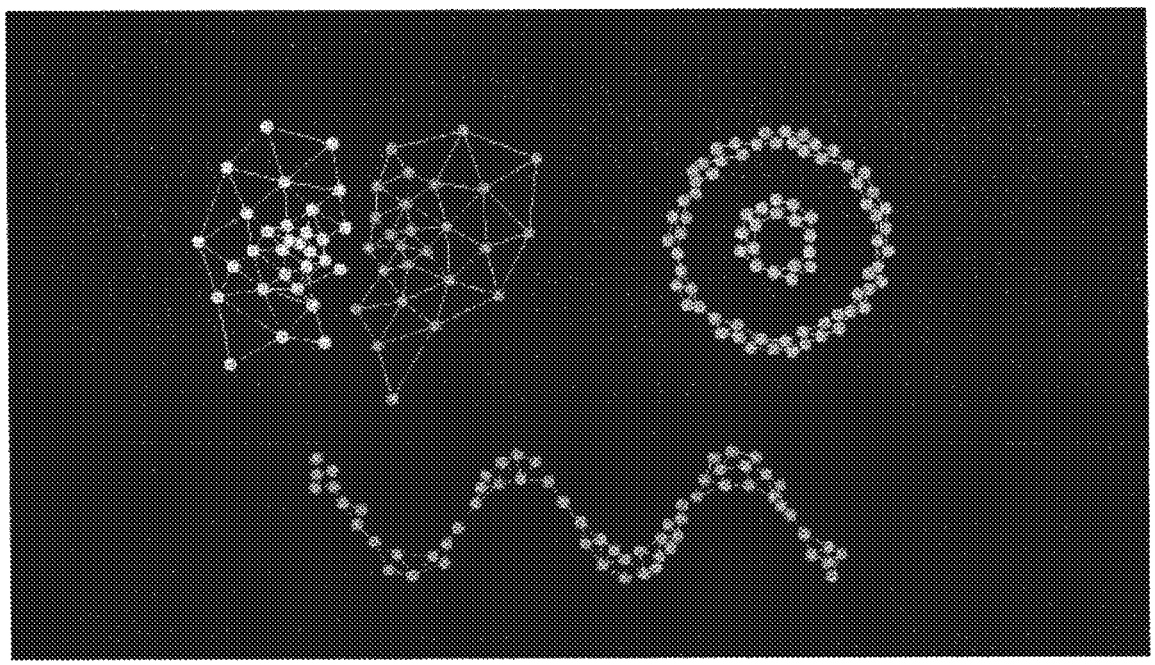
FIG. 14 is a diagram showing learning results of LBSOINN for the artificial dataset II under a stationary environment.
Figure 15:
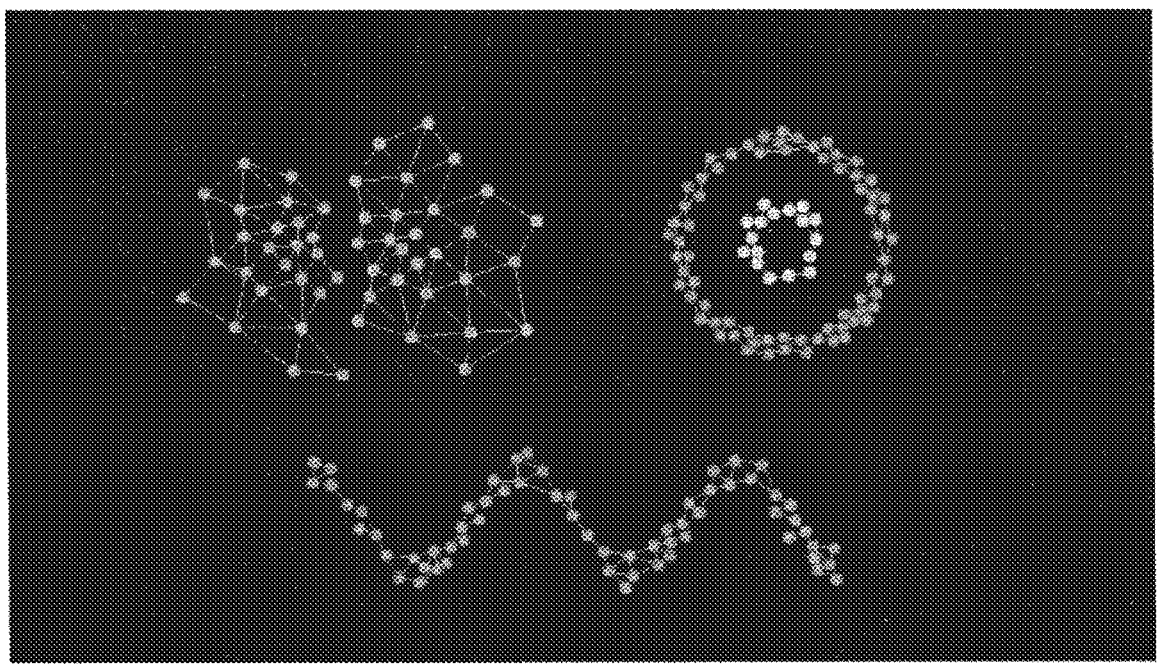
FIG. 15 is a diagram showing learning results of LBSOINN for the artificial dataset II under a non-stationary environment.

FIG. 13 shows another artificial dataset used in the evaluation of E-SOINN. This artificial dataset includes two Gaussian distributions, two ring-shaped distributions, and a sinusoidal function distribution. The input distribution includes random noise that reaches 10% of the total number of input samples. In the information processing apparatus 1 (LBSOINN), the parameter λ is set to 100, $age_{max}$ is set to 100, $c_1$ is set to 0.001, $c_2$ is set to 1.0, γ is set to 1.3, η is set to 1.001, and θ is set to 1.3. FIGS. 14 and 15 describe the results of clustering by the information processing apparatus 1 (LBSOINN) in the stationary environment and the non-stationary environment, respectively. It can be seen from the similarities between FIG. 14 and FIG. 15 that the information processing apparatus 1 (LBSOINN) does not depend on the input order of the input data and therefore has a stability greater than that of E-SOINN.

Figure 16:
FIG. 16 is original images of an AT&T face image dataset used for the experiments according to this embodiment.
Figure 17:
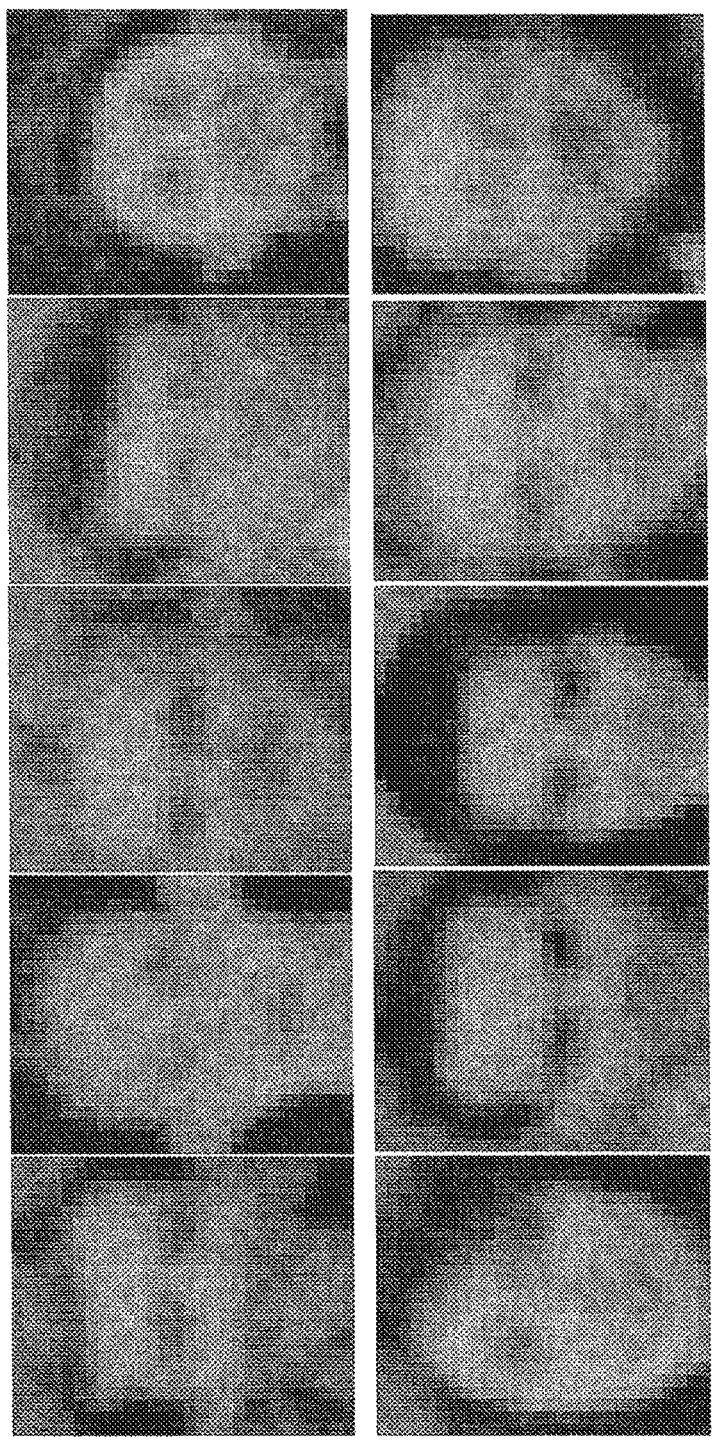
FIG. 17 shows images of feature vectors of the original images of the AT&T face image dataset.

In order to compare the information processing apparatus 1 (LBSOINN) with E-SOINN, as one of the experiments in the real world, the AT&T image dataset the same as the dataset used in E-SOINN is selected. This image dataset includes 40 different classes and ten different images for each class. These classes relate to different ages and different races. For some classes, the images are taken at different timings. There are variations in the facial expression (opened/closed eye, smiling/not smiling) and details of the face (with glasses/no glasses). All the images are taken from the upright frontal position (it has a tolerance against some lateral motions) under a black uniform background having classes. Ten classes are selected from this dataset (FIG. 16), and the images in the dataset are re-sampled to 23×28 from 92×112 using the nearest-neighbor interpolation. The images are smoothed using Gaussian where Width=4 and σ=2 using the Gaussian method to obtain the feature vectors (FIG. 17).

The performances of E-SOINN and the information processing apparatus 1 (LBSOINN) in the stationary and non-stationary environments will be experimented. In LBSOINN, the parameter $\lambda$ is set to 25, $age_{max}$ is set to 25, $c_1$ is set to 0.0, $c_2$ is set to 1.0, $\gamma$ is set to 1.3, $\eta$ is set to 1.001, and 0 is set to 1.3. Through the learning, the prototype vectors from the network can be obtained. The original face image and the calculated recognition rate are classified using these prototype vectors. In the information processing apparatus 1 (LBSOINN), the recognition rate is 96.3% in the stationary environment and 96.5% in the non-stationary environment. In E-SOINN, the recognition rate is 90.3% in the stationary environment and 96% in the non-stationary environment. That is, the recognition rate in the information processing apparatus 1 (LBSOINN) is much higher than that in E-SOINN. The similarities between the stationary environment and the non-stationary environment further indicate that the information processing apparatus 1 (LBSOINN) does not depend on the input order of the input data and LBSOINN has a stability higher than that in E-SOINN.

In order to compare the stability of E-SOINN and that of the information processing apparatus 1 (LBSOINN), the processing the same as that performed in E-SOINN is executed by the information processing apparatus 1 (LBSOINN). That is, (1) the learning is executed 1000 times for both E-SOINN and the information processing apparatus 1 (LBSOINN) and (2) the frequency of the number of classes is recorded. The frequency of the number of classes is, for example, the numerical value of 600 when the learning results of the information processing apparatus 1 (LBSOINN) after 1000 experiments show that the number of outputs when the number of classes is 10 is 600 or the numerical value of 90 when the learning results of the information processing apparatus 1 (LBSOINN) after 1000 experiments show that the number of outputs when the number of classes is 9 is 90.

Figure 18A:
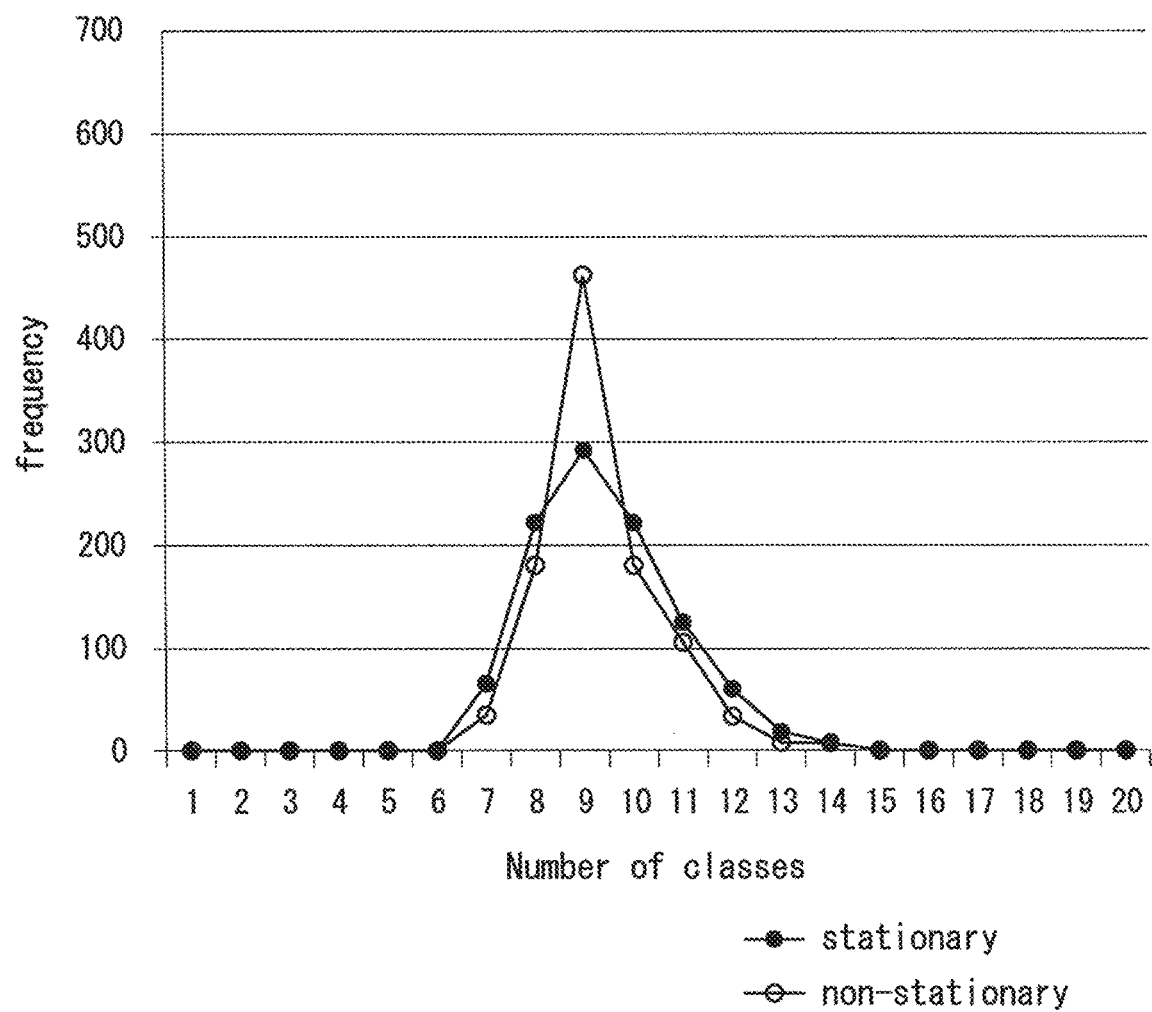
FIG. 18A is a graph showing distributions of the number of classes by E-SOINN for the AT&T face image dataset.
Figure 18B:
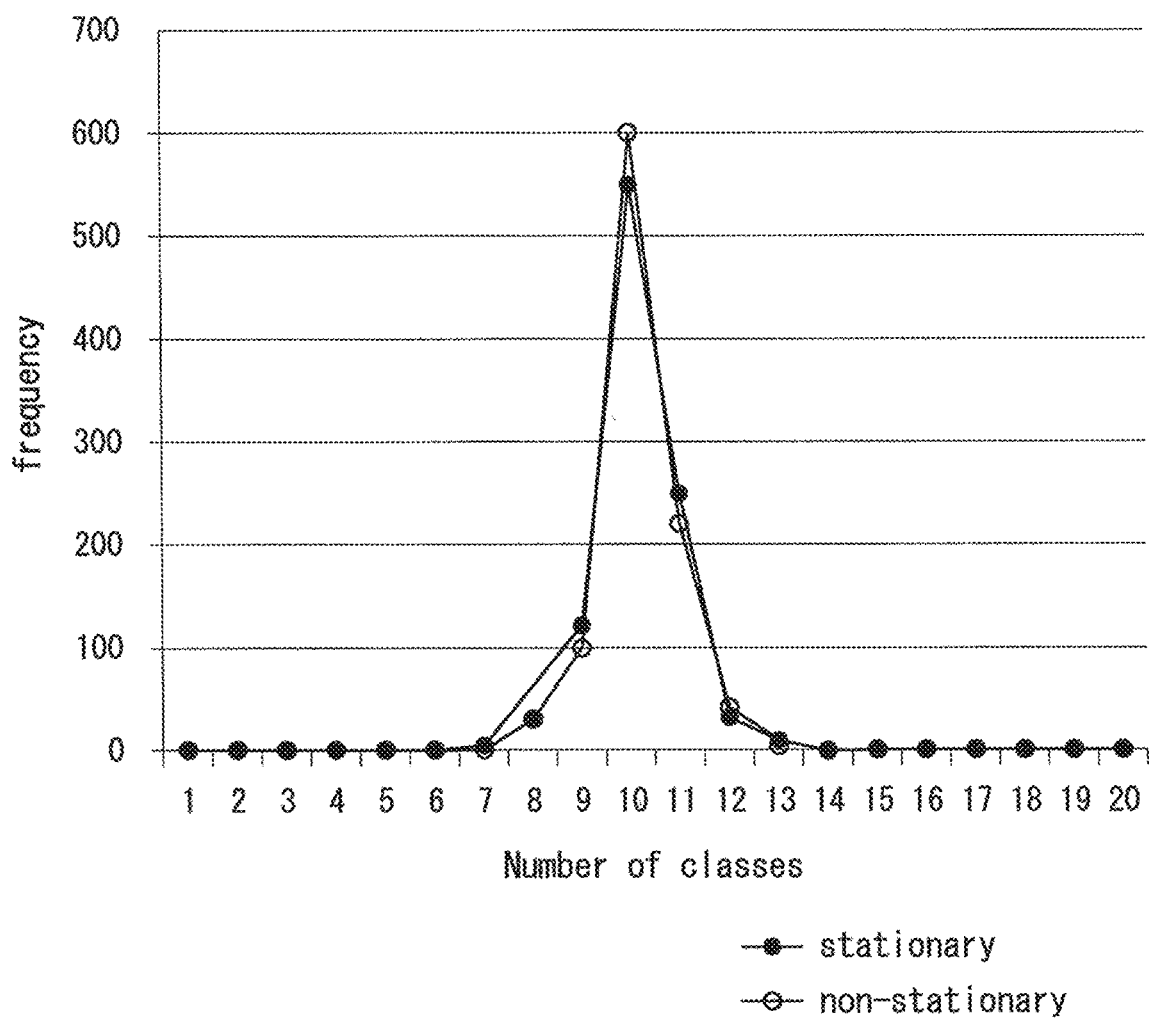
FIG. 18B is a graph showing distributions of the number of classes by LBSOINN for the AT&T face image dataset.

FIGS. 18(A) and 18(B) show distributions of the number of classes by E-SOINN and the information processing apparatus 1 (LBSOINN), respectively. In each of FIGS. 18(A) and 18(B), the vertical axis indicates the frequency of the number of classes and the horizontal axis indicates the number of classes. The distribution of the number of classes with respect to the information processing apparatus 1 (LBSOINN) is much larger than that in E-SOINN. The distribution of the information processing apparatus 1 (LBSOINN) is much larger than that in E-SOINN when the number of classes is about ten. Further, the distribution of the number of classes with respect to the information processing apparatus 1 (LBSOINN) in the stationary environment is quite similar to the distribution of the class in the non-stationary environment. All the experimental results stated above show that the information processing apparatus 1 (LBSOINN) has a stability higher than that of E-SOINN.

Next, two text datasets (WebKb dataset and R8 dataset) are selected to check the performances of E-SOINN and the information processing apparatus 1 (LBSOINN) in the high-dimensional space. WebKb includes WWW pages collected by the worldwide knowledge base project of the CMU text learning group from the computer science section of various universities in January, 1997. Page 8282 is categorized into student, faculty, staff, department, course, project, and other by a human. In this experiment, only the categories of student, faculty, and course are selected. The R8 dataset simply considers a document including one topic and the class of the topic (including at least one learning and one experimental example). In both of WebKb and R8, filtering processing (see Non-Patent Literature: Khaled M. Hammouda and Mohamed S. Kamel, "Efficient Phrase-Based Document Indexing for Web Document Clustering," IEEE Transactions on Knowledge and Data Engineering, Vol. 16, No. 10, pp. 1279-1296, 2004) and processing for removing, pruning, and stemming stop words (see Non-Patent Literature: R. Baeza-Yates and B. Ribeiro-Neto, "Modern Information Retrieval," Addison-Wesley, 1999) are carried out in advance.

Figure 19:
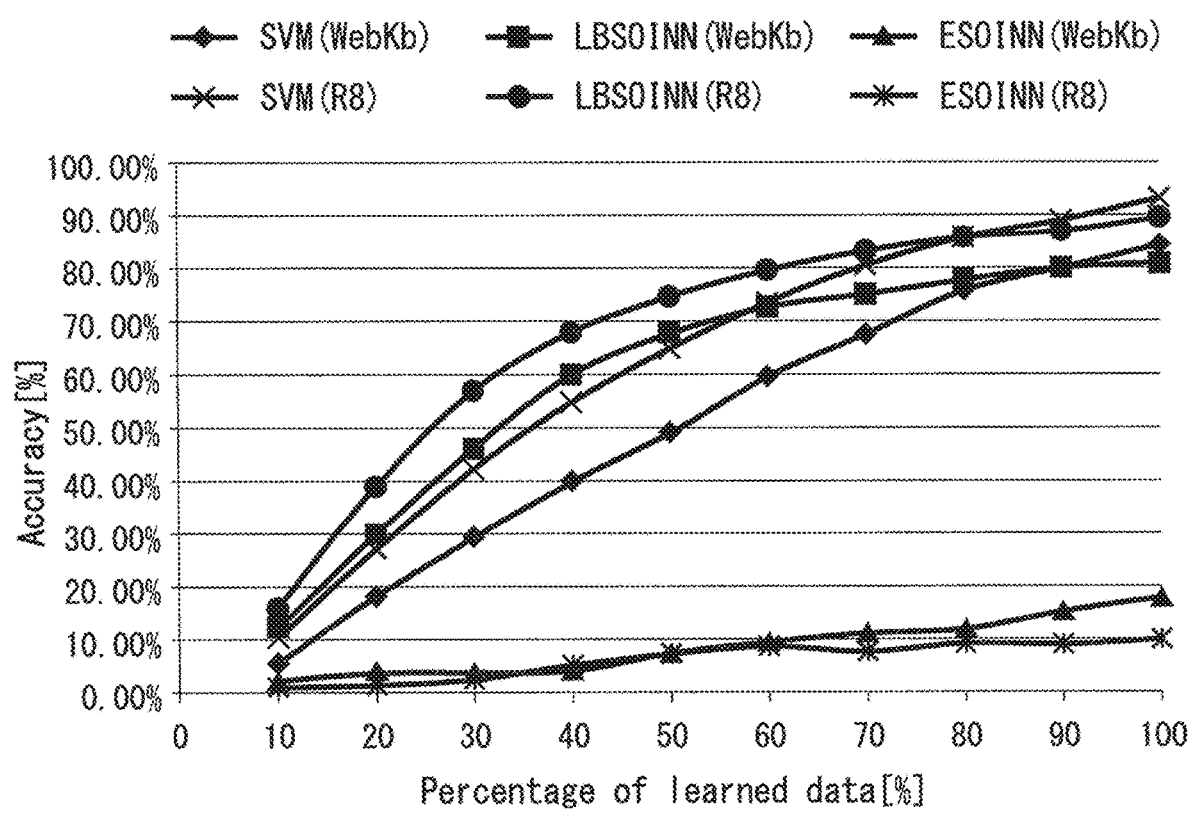
FIG. 19 shows an accuracy when different percentages are input to the respective classes.

FIG. 19 shows the accuracy when different percentages are input to the respective class. In the information processing apparatus 1 (LBSOINN), the parameter $\lambda$ is set to 25, $age_{max}$ is set to 25, $c_1$ is set to 0.0, $c_2$ is set to 1.0, $\gamma$ is set to 1.3, $\eta$ is set to 1.001, and $\theta$ is set to 1.3. Further, for the purpose of comparison, the performance of the support vector machine (SVM) that uses the linear function is also shown.

For the WebKb dataset, the accuracy of the information processing apparatus 1 (LBSOINN) and that of the SVM reach 81.21% and 84.21%, respectively. For the R8 dataset, the accuracy of the information processing apparatus 1 (LBSOINN) and that of the SVM reach 89.71% and 93.34%, respectively. The accuracy of the information processing apparatus 1 (LBSOINN) is not as high as that of the SVM. However, the information processing apparatus 1 (LBSOINN) belongs to the approach of learning without an online teacher. Another difference between the information processing apparatus 1 (LBSOINN) and the SVM is that the information processing apparatus 1 (LBSOINN) is able to obtain a satisfactory accuracy using a limited dataset. Because of this characteristic, the information processing apparatus 1 (LBSOINN) is more suitable for the tasks in the real world. Since E-SOINN is unable to deal with high-dimensional tasks, the performance of E-SOINN is quite poor. This experiment shows that the information processing apparatus 1 (LBSOINN) can be sufficiently used in the high-dimensional space.

The configurations and the operations of the information processing apparatus 1 according to this embodiment and the experiments for the information processing apparatus 1 and the effects of the information processing apparatus 1 have been described above. The clustering is one of the most important data analysis methods. In this embodiment, the load balancing self-propagating neural network (LBSOINN)

that belongs to the learning without online teachers has been proposed, which is able to separate the high-density overlapping class. The information processing apparatus 1 (LB-SOINN) has a stability higher than that of E-SOINN and also includes all the advantages of E-SOINN. The experiments in the artificial dataset and the real dataset have showed that the information processing apparatus 1 (LB-SOINN) is able to obtain accurate learning results when unlabeled knowledge with noise is clustered and can be efficiently executed also in the high-dimensional space. This means that the information processing apparatus 1 (LB-SOINN) is suitable for the online learning tasks in the real world.

The present invention is not limited to the above embodiment and may be changed as appropriate without departing from the spirit of the present invention. For example, while the case in which only the node having the maximum learning time in each sub-cluster is searched in the node load balancing processing has been described as an example in the above embodiment, the present invention is not limited to this example and a plurality of nodes having a relatively large learning time of the nodes in each sub-cluster may be searched and the following load balancing processing may be executed for the plurality of nodes that have been searched.

Further, for example, while the case in which the node having the maximum learning time is searched and the adjacent node having the maximum learning time among the adjacent nodes of the node that has been searched is determined in the node load balancing processing has been described as an example in the above embodiment, the present invention is not limited to this example and another adjacent node (e.g., adjacent node having the second longest learning time among the adjacent nodes of the node that has been searched) may be determined and the following load balancing processing may be executed on the adjacent node that has been determined.

Further, for example, regarding the distance measurement, while the case in which the cosine distance is combined with the Euclidean distance has been described as an example in the above embodiment, the present invention is not limited to this example and another distance measure (e.g., cosine distance, Manhattan distance, fractional distance) may be combined. Further, in place of an effective distance measure in the high-dimensional space, another distance measure according to the problem to be learned may be combined The information processing method described above may be implemented using a semiconductor processing device including an Application Specific Integrated Circuit (ASIC). Further, these processing may be implemented by causing a computer system including at least one processor (e.g., microprocessor, MPU, Digital Signal Processor (DSP)) to execute a program. Specifically, one or a plurality of programs including instructions for causing the computer system to perform the algorithm regarding the transmission signal processing or the reception signal processing may be prepared and this program may be supplied to the computer.

The programs can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

This application is based upon and claims the benefit of priority from Japanese Patent Application No. 2013-033176, filed on Feb. 22, 2013, the disclosure of which is incorporated herein in its entirety by reference.

REFERENCE SIGNS LIST

1 INFORMATION PROCESSING APPARATUS
10 COMPUTER
11 CPU
12 ROM
13 RAM
14 BUS
15 INPUT/OUTPUT INTERFACE
16 INPUT UNIT
17 OUTPUT UNIT
18 STORAGE UNIT
19 COMMUNICATION UNIT
20 DRIVE
201 MAGNETIC DISK
202 OPTICAL DISK
203 FLEXIBLE DISK
204 SEMICONDUCTOR MEMORY
21 INPUT INFORMATION ACQUISITION MEANS
22 NODE DENSITY UPDATE DETERMINATION MEANS
23 NODE DENSITY CALCULATION MEANS
24 WINNER NODE SEARCH MEANS
25 INTER-CLASS NODE INSERTION DETERMINATION MEANS
26 INTER-CLASS NODE INSERTION MEANS
27 EDGE CONNECTION DETERMINATION MEANS
28 EDGE CONNECTION MEANS
29 WINNER NODE LEARNING TIME CALCULATION MEANS
30 WEIGHT VECTOR UPDATE MEANS
31 AGED EDGE DELETION MEANS
32 INPUT NUMBER DETERMINATION MEANS
33 LOAD BALANCING MEANS
34 SUB-CLUSTER DETERMINATION MEANS
35 NOISE NODE DELETION MEANS
36 LEARNING END DETERMINATION MEANS
37 CLASS DETERMINATION MEANS
38 OUTPUT INFORMATION DISPLAY MEANS

The present invention has been described herein with regard to certain embodiments. However, it will be clear to persons skilled in the art that variations and modifications can be made without departing from the scope of the invention as described herein.

What is claimed is:

1. An information processing apparatus that has a network structure in which nodes described by multidimensional vectors and edges that connect the nodes are arranged and successively receives input vectors which belong to arbitrary classes and learns input distribution structures of the input vectors, the information processing apparatus comprises:

inter-class node insertion means for searching a node located at a position that is the closest to the input vector that is input as a first winner node and a node located at a position that is the second closest to the input vector that is input as a second winner node and inserting an inter-class insertion node having the input vector into the network based on a distance between the input vector and the first winner node and a distance between the input vector and the second winner node;

winner node learning time calculation means for incrementing learning time of the node for the first winner node by a predetermined value;

weight vector update means for updating the weight vector of the first winner node and the weight vector of an adjacent node that is directly connected to the first winner node to make them further closer to the input vector;

load balancing means for detecting a node where the value of the learning time is relatively large and unbalanced, inserting a new node having a weight vector based on the weight vector of the node that has been detected and the adjacent node of the node that has been detected into the network, reducing the learning time of the node that has been detected and the learning time of the adjacent node of the node that has been detected, deleting an edge between the node that has been detected and the adjacent node of the node that has been detected, connecting an edge between the node that has been newly inserted and the node that has been detected, and connecting an edge between the node that has been newly inserted and the adjacent node of the node that has been detected; and edge connection determination means for determining, when it is determined in the inter-class node insertion determination means that the inter-class node insertion should not be executed, a sub-cluster to which the first winner node belongs and a sub-cluster to which the second winner node belongs based on a sub-cluster label of the node that is given, and when the result of the determination shows that the first winner node and the second winner node belong to sub-clusters different from each other, further determining, regarding the node densities of the first winner node and the second winner node, whether at least one of a condition of the node density for the first winner node based on an average node density of the sub-cluster including the first winner node and a condition of the node density for the second winner node based on an average node density of the sub-cluster including the second winner node is satisfied;

edge connection means for (1) connecting, when the result of the determination in the edge connection determination means shows that at least one of the first winner node and the second winner node does not belong to any sub-cluster or the first winner node and the second winner node belong to one sub-cluster, an edge between the first winner node and the second winner node or (2) connecting, when the result of the determination in the edge connection determination means shows that at least one of the conditions of the node densities of the first winner node and the second winner node is satisfied, an edge between the first winner node and the second winner node and not connecting, when at least one of the conditions of the node densities of the first winner node and the second winner node is not satisfied, an edge between the first winner node and the second winner node;

node density calculation means for calculating, based on an average distance from a node to be noted and an adjacent node of the node to be noted, a node density of the node to be noted; and sub-cluster determination means for giving sub-cluster labels different from each other to an apex, which is a node that has a locally maximum node density, giving the sub-cluster label the same as the sub-cluster label given to the adjacent node where the node density is maximum to all the nodes to which the sub-cluster labels have not been given, generating a Voronoi region based on a reference apex having a node density larger than a predetermined threshold among the apices, and when the sub-cluster including the reference apex and the sub-cluster including apices other than the reference apex have an overlapping region and the condition of the average node density of the nodes located in the overlapping region is satisfied in the Voronoi region that has been generated, giving a sub-cluster label of the sub-cluster including the reference apex as a sub-cluster label of the sub-cluster including other apices.

2. An information processing apparatus that has a network structure in which nodes described by multidimensional vectors and edges that connect the nodes are arranged and successively receives input vectors which belong to arbitrary classes and learns input distribution structures of the input vectors, the information processing apparatus comprises:

inter-class node insertion means for searching a node located at a position that is the closest to the input vector that is input as a first winner node and a node located at a position that is the second closest to the input vector that is input as a second winner node and inserting an inter-class insertion node having the input vector into the network based on a distance between the input vector and the first winner node and a distance between the input vector and the second winner node;

winner node learning time calculation means for incrementing learning time of the node for the first winner node by a predetermined value;

weight vector update means for updating the weight vector of the first winner node and the weight vector of an adjacent node that is directly connected to the first winner node to make them further closer to the input vector;

load balancing means for detecting a node where the value of the learning time is relatively large and unbalanced, inserting a new node having a weight vector based on the weight vector of the node that has been detected and the adjacent node of the node that has been detected into the network, reducing the learning time of the node that has been detected and the learning time of the adjacent node of the node that has been detected, deleting an edge between the node that has been detected and the adjacent node of the node that has been detected, connecting an edge between the node that has been newly inserted and the node that has been detected, and connecting an edge between the node that has been newly inserted and the adjacent node of the node that has been detected; and an inter-node distance calculation expression including a weighted first distance calculation expression that calculates a distance between nodes based on an Euclidean distance and a weighted second distance calculation expression that calculates a distance between nodes based on a distance measure other than the Euclidean distance, wherein:

the information processing apparatus normalizes the first distance calculation expression using a minimum distance value and a maximum distance value based on the Euclidean distance between arbitrary two nodes in the network;

the information processing apparatus normalizes the second distance calculation expression using a minimum distance value and a maximum distance value based on the other distance measure between arbitrary two nodes in the network;

the information processing apparatus decreases the weight of the first distance calculation expression as the number of dimensions of the input vector increases; and the information processing apparatus calculates the distance between the input vector and the node or the distance between arbitrary two nodes in the network using the inter-node distance calculation expression.

3. The information processing apparatus according to claim 2, wherein the second distance calculation expression calculates the distance between the nodes based on a cosine distance.

4. The information processing apparatus according to claim 2, further comprising node density update determination means for checking whether at least one value of the minimum distance value and the maximum distance value between the two nodes based on the Euclidean distance and the minimum distance value and the maximum distance value between the two nodes based on the other distance measure has been changed, and when the at least one value has been changed, determining to update the node density, wherein the node density calculation means (1) calculates each component of the vector of the distance of the first winner node from the adjacent node using each of the first distance calculation expression and the second distance calculation expression, (2) calculates a vector of a point value of the node density of the first winner node based on the vector of the distance of the first winner node that has been calculated from the adjacent node, (3) calculates a vector of an accumulated point value of the node density of the first winner node based on the vector of the point value of the node density of the first winner node that has been calculated, (4) calculates the node density of the first winner node based on the vector of the accumulated point value of the node density of the first winner node that has been calculated, (5) when the result of the determination in the node density update determination means shows that the node density should be updated, based on the minimum distance value and the maximum distance value between the two nodes based on the Euclidean distance before and after the changes and the minimum distance value and the maximum distance value between the two nodes based on the other distance measurement before and after the changes, for all the nodes that exist in the network, updates the vector of the accumulated point value of the node density of the node to be noted, and (6) re-calculates the node density of the node to be noted based on the vector of the accumulated point value of the node density of the node to be noted that has been updated.

5. An information processing method in an information processing apparatus that has a network structure in which nodes described by multidimensional vectors and edges that connect the nodes are arranged and successively receives input vectors which belong to arbitrary classes and learns input distribution structures of the input vectors, the information processing method executing the steps of:

searching a node located at a position that is the closest to the input vector that is input as a first winner node and a node located at a position that is the second closest to the input vector that is input as a second winner node and inserting an inter-class insertion node having the input vector into the network based on a distance between the input vector and the first winner node and a distance between the input vector and the second winner node;

incrementing, learning time of the node for the first winner node by a predetermined value;

updating the weight vector of the first winner node and the weight vector of an adjacent node that is directly connected to the first winner node to make them further closer to the input vector; and detecting a node where the value of the learning time is relatively large and unbalanced, inserting a new node having a weight vector based on the weight vector of the node that has been detected and the adjacent node of the node that has been detected into the network, reducing the learning time of the node that has been detected and the learning time of the adjacent node of the node that has been detected;

deleting an edge between the node that has been detected and the adjacent node of the node that has been detected;

connecting an edge between the node that has been newly inserted and the node that has been detected;

connecting an edge between the node that has been newly inserted and the adjacent node of the node that has been detected;

determining, when it is determined in the inter-class node insertion determination means that the inter-class node insertion should not be executed, a sub-cluster to which the first winner node belongs and a sub-cluster to which the second winner node belongs based on a sub-cluster label of the node that is given;

when the result of the determination shows that the first winner node and the second winner node belong to sub-clusters different from each other, further determining, regarding the node densities of the first winner node and the second winner node, whether at least one of a condition of the node density for the first winner node based on an average node density of the sub-cluster including the first winner node and a condition of the node density for the second winner node based on an average node density of the sub-cluster including the second winner node is satisfied;

connecting, when the result of the determination in the edge connection determination means shows that at least one of the first winner node and the second winner node does not belong to any sub-cluster or the first winner node and the second winner node belong to one sub-cluster, an edge between the first winner node and the second winner node or connecting, when the result of the determination in the edge connection determination means shows that at least one of the conditions of the node densities of the first winner node and the second winner node is satisfied, an edge between the first winner node and the second winner node and not connecting, when at least one of the conditions of the node densities of the first winner node and the second winner node is not satisfied, an edge between the first winner node and the second winner node;

calculating, based on an average distance from a node to be noted and an adjacent node of the node to be noted, a node density of the node to be noted; and giving sub-cluster labels different from each other to an apex, which is a node that has a locally maximum node density, giving the sub-cluster label the same as the sub-cluster label given to the adjacent node where the node density is maximum to all the nodes to which the sub-cluster labels have not been given, generating a Voronoi region based on a reference apex having a node density larger than a predetermined threshold among the apices, and when the sub-cluster including the reference apex and the sub-cluster including apices other than the reference apex have an overlapping region and the condition of the average node density of the nodes located in the overlapping region is satisfied in the Voronoi region that has been generated, giving a sub-cluster label of the sub-cluster including the reference apex as a sub-cluster label of the sub-cluster including other apices.

6. A non-transitory computer readable medium comprising instructions that upon execution by a processor causing a computer to execute the information processing method according to claim 5.

7. An information processing method in an information processing apparatus that has a network structure in which nodes described by multidimensional vectors and edges that connect the nodes are arranged and successively receives input vectors which belong to arbitrary classes and learns input distribution structures of the input vectors, the information processing method executing the steps of:

searching a node located at a position that is the closest to the input vector that is input as a first winner node and a node located at a position that is the second closest to the input vector that is input as a second winner node and inserting an inter-class insertion node having the input vector into the network based on a distance between the input vector and the first winner node and a distance between the input vector and the second winner node;

incrementing, learning time of the node for the first winner node by a predetermined value;

updating the weight vector of the first winner node and the weight vector of an adjacent node that is directly connected to the first winner node to make them further closer to the input vector; and detecting a node where the value of the learning time is relatively large and unbalanced, inserting a new node having a weight vector based on the weight vector of the node that has been detected and the adjacent node of the node that has been detected into the network, reducing the learning time of the node that has been detected and the learning time of the adjacent node of the node that has been detected;

deleting an edge between the node that has been detected and the adjacent node of the node that has been detected;

connecting an edge between the node that has been newly inserted and the node that has been detected;

connecting an edge between the node that has been newly inserted and the adjacent node of the node that has been detected;

normalizing a first distance calculation expression of a weighted first distance calculation expression using a minimum distance value and a maximum distance value based on an Euclidean distance between arbitrary two nodes in the network, the weighted first distance calculation expression calculating a distance between nodes based on the Euclidean distance;

normalizing a second distance calculation expression of a weighted second distance calculation expression using a minimum distance value and a maximum distance value based on a distance measure between arbitrary two nodes in the network other than the Euclidean distance, the weighted second distance calculation expression calculating a distance between nodes based on a distance measure other than the Euclidean distance;

decreasing the weight of the first distance calculation expression as the number of dimensions of the input vector increases; and calculating the distance between the input vector and the node or the distance between arbitrary two nodes in the network using an inter-node distance calculation expression that includes the weighted first distance calculation expression and the weighted second distance calculation expression.

8. The information processing method according to claim 7, wherein the second distance calculation expression calculates the distance between the nodes based on a cosine distance.

9. The information processing method according to claim 7, further executing the step of checking whether at least one value of the minimum distance value and the maximum distance value between the two nodes based on the Euclidean distance and the minimum distance value and the maximum distance value between the two nodes based on the other distance measure has been changed, and when the at least one value has been changed, determining to update the node density, wherein each component of the vector of the distance of the first winner node from the adjacent node is calculated using each of the first distance calculation expression and the second distance calculation expression, wherein a vector of a point value of the node density of the first winner node is calculated based on the vector of the distance of the first winner node that has been calculated from the adjacent node, wherein a vector of an accumulated point value of the node density of the first winner node is calculated based on the vector of the point value of the node density of the first winner node that has been calculated, wherein the node density of the first winner node is calculated based on the vector of the accumulated point value of the node density of the first winner node that has been calculated, wherein the vector of the accumulated point value of the node density of the node to be noted is updated when the result of the determination in the node density update determination means shows that the node density should be updated, based on the minimum distance value and the maximum distance value between the two nodes based on the Euclidean distance before and after the changes and the minimum distance value and the maximum distance value between the two nodes based on the other distance measurement before and after the changes, for all the nodes that exist in the network, and wherein the node density of the node to be noted is re-calculated based on the vector of the accumulated point value of the node density of the node to be noted that has been updated.

10. An information processing system that has a network structure in which nodes described by multidimensional vectors and edges that connect the nodes are arranged and successively receives input vectors which belong to arbitrary classes and learns input distribution structures of the input vectors, the information processing system comprises:
a processor; and
a computer-readable storage medium comprising instructions that upon execution by the processor cause the information processing system to perform operations, the operations comprising:
searching a node located at a position that is the closest to the input vector that is input as a first winner node and a node located at a position that is the second closest to the input vector that is input as a second winner node;
inserting an inter-class insertion node having the input vector into the network based on a distance between the input vector and the first winner node and a distance between the input vector and the second winner node;
incrementing learning time of the node for the first winner node by a predetermined value;
updating the weight vector of the first winner node and the weight vector of an adjacent node that is directly connected to the first winner node to make them further closer to the input vector;
detecting a node where the value of the learning time is relatively large and unbalanced;
inserting a new node having a weight vector based on the weight vector of the node that has been detected and the adjacent node of the node that has been detected into the network;
reducing the learning time of the node that has been detected and the learning time of the adjacent node of the node that has been detected;
deleting an edge between the node that has been detected and the adjacent node of the node that has been detected;
connecting an edge between the node that has been newly inserted and the node that has been detected; and
connecting an edge between the node that has been newly inserted and the adjacent node of the node that has been detected, wherein
the instructions, when executed, further cause the information processing system to perform additional operations, the additional operations comprising:
determining, when it is determined that the inter-class node insertion should not be executed, a sub-cluster to which the first winner node belongs and a sub-cluster to which the second winner node belongs based on a sub-cluster label of the node that is given, and when the result of the determination shows that the first winner node and the second winner node belong to sub-clusters different from each other;
determining, regarding the node densities of the first winner node and the second winner node, whether at least one of a condition of the node density for the first winner node based on an average node density of the sub-cluster including the first winner node and a condition of the node density for the second winner node based on an average node density of the sub-cluster including the second winner node is satisfied;
connecting an edge between the first winner node and the second winner node when at least one of the first winner node and the second winner node does not belong to any sub-cluster or the first winner node and the second winner node belong to one sub-cluster, or connecting, when the result of the determination in the edge connection determination means shows that at least one of the conditions of the node densities of the first winner node and the second winner node is satisfied, an edge between the first winner node and the second winner node and not connecting, when at least one of the conditions of the node densities of the first winner node and the second winner node is not satisfied, an edge between the first winner node and the second winner node;
calculating, based on an average distance from a node to be noted and an adjacent node of the node to be noted, a node density of the node to be noted;
giving sub-cluster labels different from each other to an apex, which is a node that has a locally maximum node density;
giving the sub-cluster label the same as the sub-cluster label given to the adjacent node where the node density is maximum to all the nodes to which the sub-cluster labels have not been given;
generating a Voronoi region based on a reference apex having a node density larger than a predetermined threshold among the apices; and
when the sub-cluster including the reference apex and the sub-cluster including apices other than the reference apex have an overlapping region and the condition of the average node density of the nodes located in the overlapping region is satisfied in the Voronoi region that has been generated, giving a sub-cluster label of the sub-cluster including the reference apex as a sub-cluster label of the sub-cluster including other apices.

11. An information processing system that has a network structure in which nodes described by multidimensional vectors and edges that connect the nodes are arranged and successively receives input vectors which belong to arbitrary classes and learns input distribution structures of the input vectors, the information processing system comprises:
a processor; and
a computer-readable storage medium comprising instructions that upon execution by the processor cause the information processing system to perform operations, the operations comprising:
searching a node located at a position that is the closest to the input vector that is input as a first winner node and a node located at a position that is the second closest to the input vector that is input as a second winner node;
inserting an inter-class insertion node having the input vector into the network based on a distance between the input vector and the first winner node and a distance between the input vector and the second winner node;
incrementing learning time of the node for the first winner node by a predetermined value;
updating the weight vector of the first winner node and the weight vector of an adjacent node that is directly connected to the first winner node to make them further closer to the input vector;
detecting a node where the value of the learning time is relatively large and unbalanced;
inserting a new node having a weight vector based on the weight vector of the node that has been detected and the adjacent node of the node that has been detected into the network;
reducing the learning time of the node that has been detected and the learning time of the adjacent node of the node that has been detected;
deleting an edge between the node that has been detected and the adjacent node of the node that has been detected;
connecting an edge between the node that has been newly inserted and the node that has been detected; and connecting an edge between the node that has been newly inserted and the adjacent node of the node that has been detected, wherein the instructions, when executed, further cause the information processing system to perform additional operations, the additional operations comprising:

normalizing a first distance calculation expression of a weighted first distance calculation expression using a minimum distance value and a maximum distance value based on an Euclidean distance between arbitrary two nodes in the network, the weighted first distance calculation expression calculating a distance between nodes based on the Euclidean distance;

normalizing a second distance calculation expression of a weighted second distance calculation expression using a minimum distance value and a maximum distance value based on a distance measure between arbitrary two nodes in the network other than the Euclidean distance, the weighted second distance calculation expression calculating a distance between nodes based on a distance measure other than the Euclidean distance;

decreasing a weight of the weighted first distance calculation expression as the number of dimensions of the input vector increases; and calculating the distance between the input vector and the node or the distance between arbitrary two nodes in the network using an inter-node distance calculation expression that includes the weighted first distance calculation expression and the weighted second distance calculation expression.

12. The information processing system of claim 11, wherein the second distance calculation expression calculates the distance between the nodes based on a cosine distance.

13. The information processing system of claim 11, wherein the instructions, when executed, further cause the information processing system to perform additional operations, the additional operations comprising:

checking whether at least one value of the minimum distance value and the maximum distance value between the two nodes based on the Euclidean distance and the minimum distance value and the maximum distance value between the two nodes based on the other distance measure has been changed; and updating the node density when the at least one value has been changed, wherein each component of the vector of the distance of the first winner node from the adjacent node is calculated using each of the first distance calculation expression and the second distance calculation expression, wherein a vector of a point value of the node density of the first winner node is calculated based on the vector of the distance of the first winner node that has been calculated from the adjacent node, wherein a vector of an accumulated point value of the node density of the first winner node is calculated based on the vector of the point value of the node density of the first winner node that has been calculated, wherein the node density of the first winner node is calculated based on the vector of the accumulated point value of the node density of the first winner node that has been calculated, wherein the vector of the accumulated point value of the node density of the node to be noted is updated when the result of the determination in the node density update determination means shows that the node density should be updated, based on the minimum distance value and the maximum distance value between the two nodes based on the Euclidean distance before and after the changes and the minimum distance value and the maximum distance value between the two nodes based on the other distance measurement before and after the changes, for all the nodes that exist in the network, and wherein the node density of the node to be noted is re-calculated based on the vector of the accumulated point value of the node density of the node to be noted that has been updated.

* * * * *